US012656709B2

(12) United States Patent
Umekubo et al.

(10) Patent No.: US 12,656,709 B2
(45) Date of Patent: Jun. 16, 2026

(54) IMAGE FORMING APPARATUS HAVING GAS FLOW PATH CONNECTED TO SUPPLYING DEVICE

(71) Applicant: FUJIFILM Business Innovation Corp., Tokyo (JP)

(72) Inventors: Kazuya Umekubo, Kanagawa (JP); Mizue Sekine, Kanagawa (JP); Kenji Suzuki, Kanagawa (JP); Atsushi Funada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/953,416

(22) Filed: Nov. 20, 2024

(65) Prior Publication Data

US 2025/0370377 A1 Dec. 4, 2025

(30) Foreign Application Priority Data

May 29, 2024 (JP) ................................ 2024-087345
May 29, 2024 (JP) ................................ 2024-087347

(51) Int. Cl.
*G03G 15/08* (2006.01)
*G03G 21/20* (2006.01)

(52) U.S. Cl.
CPC ..... *G03G 15/0877* (2013.01); *G03G 15/0879* (2013.01); *G03G 15/0891* (2013.01);
(Continued)

(58) Field of Classification Search
CPC ........... G03G 15/0877; G03G 15/0891; G03G 2215/083; G03G 15/0896; G03G 15/0898;
(Continued)

(56) References Cited

U.S. PATENT DOCUMENTS 5,012,289 A * 4/1991 Aldrich .............. G03G 15/0896
222/DIG. 1
6,151,471 A * 11/2000 Yahata ............... G03G 15/0822
399/258
(Continued)

FOREIGN PATENT DOCUMENTS

EP 4 530 739 A1 4/2025
EP 4 530 743 A1 4/2025
(Continued)

OTHER PUBLICATIONS

Aug. 5, 2025 Search Report issued in European Patent Application No. 24214424.4.

*Primary Examiner* — Stephanie E Bloss
*Assistant Examiner* — Laura Roth
(74) *Attorney, Agent, or Firm* — Oliff PLC

(57) ABSTRACT

An image forming apparatus includes an image carrier a developing device that applies a developer to the image carrier, and a supplying device that supplies a developer to the developing device. The supplying device has a developer flow path along which a developer passes. The image forming apparatus has a gas flow path along which a gas discharged from the developing device passes. The gas flow path is connected to the supplying device, in which the gas flow path is connected to a non-flow-path section of the supplying device. The non-flow-path section is a section that is not the developer flow path.

10 Claims, 32 Drawing Sheets

(52) U.S. Cl.
CPC ....... *G03G 21/206* (2013.01); *G03G 15/0898* (2013.01); *G03G 2215/083* (2013.01); *G03G 2221/1645* (2013.01)

(58) Field of Classification Search
CPC ............. G03G 15/0879; G03G 21/206; G03G 2221/1645
See application file for complete search history.

(56) References Cited

U.S. PATENT DOCUMENTS

| | | | | |
|---|---|---|---|---|
| 8,774,685 | B1 * | 7/2014 | Leemhuis .......... | G03G 15/0865 399/106 |
| 2012/0230733 | A1 * | 9/2012 | Kikuchi ............. | G03G 15/0844 399/254 |
| 2015/0220021 | A1 | 8/2015 | Leemhuis et al. | |
| 2018/0253027 | A1 * | 9/2018 | Tanaka ............... | G03G 15/0891 |
| 2020/0192247 | A1 * | 6/2020 | Park ................... | G03G 15/0844 |
| 2023/0288842 | A1 | 9/2023 | Urayama | |

FOREIGN PATENT DOCUMENTS

| | | | |
|---|---|---|---|
| JP | 2004-133187 | A | 4/2004 |
| JP | 2006-084487 | A | 3/2006 |
| JP | 4633419 | B2 | 2/2011 |

* cited by examiner

IMAGE FORMING APPARATUS HAVING GAS FLOW PATH CONNECTED TO SUPPLYING DEVICE

CROSS-REFERENCE TO RELATED APPLICATIONS

This application is based on and claims priority under 35 USC 119 from Japanese Patent Applications No. 2024-087345 filed May 29, 2024 and No. 2024-087347 filed May 29, 2024.

BACKGROUND

(i) Technical Field

The present disclosure relates to an image forming apparatus.

(ii) Related Art

Japanese Patent No. 4633419 discloses a configuration in which a developer storage portion of a developing device is provided with a partition plate that is disposed between a first screw and a second screw and that divides the developer storage portion into two parts and opening portions that are provided one each on two end portions of the partition plate.

SUMMARY

An image forming apparatus may be provided with a developing device that applies a developer to an image carrier and a supplying device that has a developer flow path along which a developer passes and that supplies a developer to the developing device.

Here, it is assumed that a gas discharged from the developing device flows to the supplying device and a gas flow path along which the gas passes is connected to the developer flow path provided in the supplying device. In this case, a developer located on the developer flow path may obstruct a flow of the gas and may cause the gas not to flow smoothly.

Aspects of non-limiting embodiments of the present disclosure relate to causing a gas discharged from a developing device to flow more smoothly than in a configuration in which a gas flow path along which a gas discharged from a developing device passes is connected to a developer flow path provided in a supplying device that supplies a developer to the developing device.

An image forming apparatus may be provided with a developing device that applies a developer to an image carrier and a supplying device that supplies a developer to the developing device.

Here, it is assumed that a gas flows from the developing device to the supplying device and the gas passes along a gas flow path provided in the supplying device. In this case, a developer may accumulate in the gas flow path and may cause the gas not to flow smoothly.

Other aspects of non-limiting embodiments of the present disclosure relate to causing a gas to flow from a developing device to a supplying device more smoothly than in a case where a movement member that moves a developer is not provided in a gas flow path provided in a supplying device that supplies a developer to a developing device.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including an image carrier; a developing device that applies a developer to the image carrier; and a supplying device that supplies a developer to the developing device, the supplying device having a developer flow path along which a developer passes, the image forming apparatus having a gas flow path along which a gas discharged from the developing device passes, the gas flow path being connected to the supplying device, in which the gas flow path is connected to a non-flow-path section of the supplying device, the non-flow-path section being a section that is not the developer flow path.

BRIEF DESCRIPTION OF THE DRAWINGS

Exemplary embodiments of the present disclosure will be described in detail based on the following figures, wherein.

DETAILED DESCRIPTION

Hereinafter, an exemplary embodiment according to the present disclosure will be described with reference to the accompanying drawings.

Figure 1:
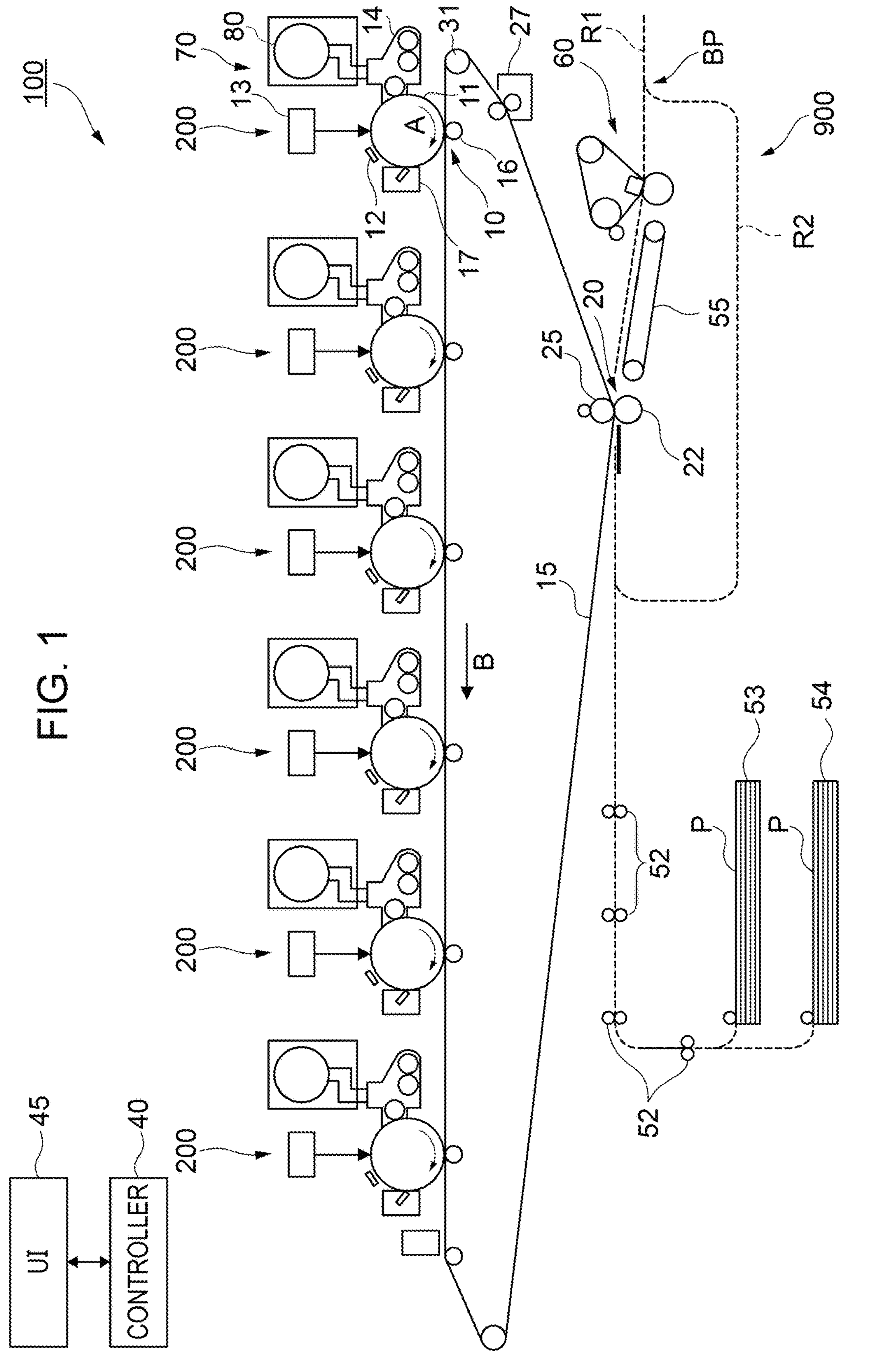
FIG. 1 illustrates an image forming apparatus.

FIG. 1 illustrates an image forming apparatus 100 according to the present exemplary embodiment. FIG. 1 illustrates a state in which the image forming apparatus 100 is viewed from the front side of the image forming apparatus 100.

The image forming apparatus 100 is an image forming apparatus of an intermediate transfer system called a tandem type.

The image forming apparatus 100 is provided with multiple image forming units 200. Each of the image forming units 200 forms an image that is to be transferred to a sheet P, as one example of a recording medium.

Each of the image forming units 200 includes a photoconductor drum 11, as one example of an image carrier.

Each of the image forming units 200 forms a toner image, which is an image to be transferred to the sheet P, on the photoconductor drum 11 by using a developer containing a toner. In other words, each of the image forming units 200 forms a toner image on the photoconductor drum 11 by using a powdery developer.

The developer in the present exemplary embodiment is constituted by a dry-type carrier and a dry-type toner. Each of the image forming units 200 forms a toner image on the photoconductor drum 11 by using a carrier and a toner.

The image forming units 200 include six image forming units 200 that each form a toner image on respective photoconductor drums 11 by using a developer of a type that differs from types of developers of the other image forming units 200.

The six image forming units 200 include four image forming units 200 that each form a toner image by using a basic-color developer. More specifically, each of the four image forming units 200 forms a toner image by using a corresponding one of a yellow developer, a magenta developer, a cyan developer, and a black developer.

The remaining two image forming units 200 each form a toner image by using a developer other than basic-color developers.

Each of the remaining two image forming units 200 forms a toner image by using, for example, a clear developer, a white developer, a gold developer, a silver developer, or the like. Alternatively, each of the remaining two image forming units 200 forms a toner image by using, for example, a pink developer, a green developer, an orange developer, or the like.

Other than the above developers, a developer containing a magnetic toner is one example of developers other than the basic-color developers. In addition, a developer containing a conductive toner is also one example of developers other than the basic-color developers. In addition, a developer containing a toner that emits light when irradiated with light, such as ultraviolet light or infrared light, is also one example of developers other than the basic-color developers.

A two-component developer, as it is called, in which a carrier and a toner are mixed together is used as a developer in the present exemplary embodiment. Other than the above, a one-component developer, as it is called, constituted by only a toner may be used as a developer.

The image forming apparatus 100 is also provided with an intermediate transfer belt 15. In addition, the image forming apparatus 100 is provided with a first transfer section 10. Toner images formed by a corresponding one of the image forming units 200 are transferred at the first transfer section 10 to the intermediate transfer belt 15.

The image forming apparatus 100 is further provided with a second transfer section 20. Toner images transferred on the intermediate transfer belt 15 are transferred at the second transfer section 20 to the sheet P.

The image forming apparatus 100 is also provided with a fixing device 60 that causes the toner images transferred to the sheet P to be fixed on the sheet P.

The image forming apparatus 100 is further provided with a controller 40 including a CPU that executes a program. The controller 40 controls components in the image forming apparatus 100.

In addition, the image forming apparatus 100 is provided with a user interface (UI) 45. The UI 45 is constituted by a display panel and the like. The UI 45 receives an instruction from a user. The UI 45 also displays information to a user.

Each of the image forming units 200 is provided with a developing device 14. Each of the image forming units 200 is also provided with a supplying device 70.

The developing device 14 applies a developer onto the photoconductor drum 11. The supplying device 70 supplies a developer to the developing device 14.

When a developer is applied onto the photoconductor drum 11 by the developing device 14, an electrostatic latent image on the photoconductor drum 11 is visualized by a toner. The developing device 14 performs development with respect to the photoconductor drum 11, which is an image carrier. Consequently, an image formed by the toner is formed on the photoconductor drum 11.

The supplying device 70 supplies a new developer to the developing device 14.

A developer storage container 80 is mounted on the image forming apparatus 100. The supplying device 70 transports a developer from the developer storage container 80 to the developing device 14. Consequently, the developer is supplied to the developing device 14.

As described above, the developer is constituted by a carrier and a toner. The supplying device 70 supplies, as the developer, the carrier and the toner to the developing device 14. The carrier has a positive charge polarity and the toner has a negative charge polarity in the present exemplary embodiment.

In each of the image forming units 200, the photoconductor drum 11, as one example of an image carrier, rotates in the arrow A direction.

Each of the image forming units 200 is provided with a charger 12. Each of the image forming units 200 is further provided with an exposure device 13.

The charger 12 charges the photoconductor drum 11 with electricity. The exposure device 13 forms an electrostatic latent image on the photoconductor drum 11.

The exposure device 13 includes a light source, such as an LED. The exposure device 13 forms an electrostatic latent image on the photoconductor drum 11 by irradiating the photoconductor drum 11 with light.

Each of the image forming units 200 is also provided with a first transfer roller 16. The first transfer roller 16 is provided in the first transfer section 10. The first transfer roller 16 is used to transfer a toner image from the photoconductor drum 11 to the intermediate transfer belt 15.

Each of the image forming units 200 is also provided with a drum cleaner 17 that removes a developer remaining on the photoconductor drum 11.

The intermediate transfer belt 15 is circularly moved at a predetermined speed in the arrow B direction in FIG. 1 by a driving roller 31. The driving roller 31 is driven by a motor (not illustrated) to rotate counterclockwise in FIG. 1.

The first transfer section 10 is configured to include the first transfer roller 16 that is disposed to face the photoconductor drum 11 with the intermediate transfer belt 15 interposed between the first transfer section 10 and the photoconductor drum 11. A toner image on the photoconductor drum 11 is transferred at the first transfer section 10 to the intermediate transfer belt 15. Consequently, a toner image is formed on the intermediate transfer belt 15.

A second transfer roller 22 that is disposed on the outer surface side of the intermediate transfer belt 15 is provided in the second transfer section 20 serving as one example of a transfer section. In addition, a backup roller 25 that is disposed on the inner surface side of the intermediate transfer belt 15 is provided in the second transfer section 20.

In the second transfer section 20, toner images formed on the intermediate transfer belt 15 are transferred to the sheet P that has been transported to the second transfer section 20.

In addition, a turning-over mechanism 900 that turns over the sheet P is further provided.

The turning-over mechanism 900 turns over the sheet P having one surface on which toner images have been transferred at the second transfer section 20. The turning-over mechanism 900 then supplies the sheet P that has been turned over to the second transfer section 20 again.

Consequently, toner images are formed on two surfaces of the sheet P.

The turning-over mechanism 900 delivers the sheet P that has passed through the fixing device 60 to a branch path R2 branched from a sheet transport path R1.

The turning-over mechanism 900 reversely transports the sheet P after the sheet P passes through a branching portion BP. Further, the turning-over mechanism 900 delivers the sheet P to the branch path R2.

The branch path R2 joins, on the upstream side of the second transfer section 20, the sheet transport path R1. Consequently, the sheet P delivered to the branch path R2 is supplied again to the second transfer section 20. The second transfer section 20 is supplied again with the sheet P in the turned over state.

In this case, toner images are formed on not only one surface of the sheet P but also on the other surface of the sheet P. Consequently, toner images are formed on two surfaces of the sheet P.

The flow of processing performed in the image forming apparatus 100 will be described.

The image forming apparatus 100 receives image data output from, for example, an image reading device or computer (not illustrated). Then, the image data are subjected to image processing in the image forming apparatus 100. Consequently, image data that are each associated with a corresponding one of the multiple image forming units 200 are generated.

Specifically, image data that are each associated with a corresponding one of four basic colors, including yellow, magenta, cyan, and black, are generated. In addition, image data that are each associated with a corresponding one of colors other than the basic colors are also generated.

The generated image data are output to the exposure device 13 provided in each of the image forming units 200.

In accordance with input image data, the exposure device 13 irradiates the photoconductor drum 11 with light emitted from the light source.

Before irradiation with light is performed by the exposure devices 13, surfaces of the photoconductor drums 11 are charged with electricity by the chargers 12. After this charging with electricity, the exposure devices 13 irradiate the surfaces with light. Consequently, an electrostatic latent image is formed on the surface of each of the photoconductor drums 11.

Next, development is performed by the developing devices 14, and a toner contained in a developer is applied onto each of the photoconductor drums 11. Consequently, a toner image is formed on each of the photoconductor drums 11. The toner images are transferred at the first transfer section 10 onto the intermediate transfer belt 15.

After the toner images are transferred onto the intermediate transfer belt 15, the toner images are moved to the second transfer section 20 by the movement of the intermediate transfer belt 15.

At this time, the sheet P from a first sheet storage unit 53 or a second sheet storage unit 54 is transported to the second transfer section 20 by a transport roller 52 and the like. Then, the toner images on the intermediate transfer belt 15 are collectively transferred at the second transfer section 20 onto the sheet P electrostatically.

The sheet P on which the toner images have been transferred is then separated from the intermediate transfer belt 15 and transported to a transport belt 55. The transport belt 55 transports the sheet P to the fixing device 60.

The sheet P transported to the fixing device 60 is heated and pressurized at the fixing device 60. Consequently, the toner images on the sheet P are fixed to the sheet P. The sheet P is then discharged from the image forming apparatus 100.

When toner images are to be formed on two surfaces of the sheet P, the sheet P that has passed through the fixing device 60 is transported to the branch path R2. At this time, the sheet P is in a state in which toner images have been formed on one surface of the sheet P. The sheet P then passes through the second transfer section 20 again.

Toner images are transferred at the second transfer section 20 to the other surface of the sheet P. The sheet P then passes through the fixing device 60 again, and the toner images transferred on the other surface are fixed to the sheet P.

The developing device 14 will be described.

Figure 2:
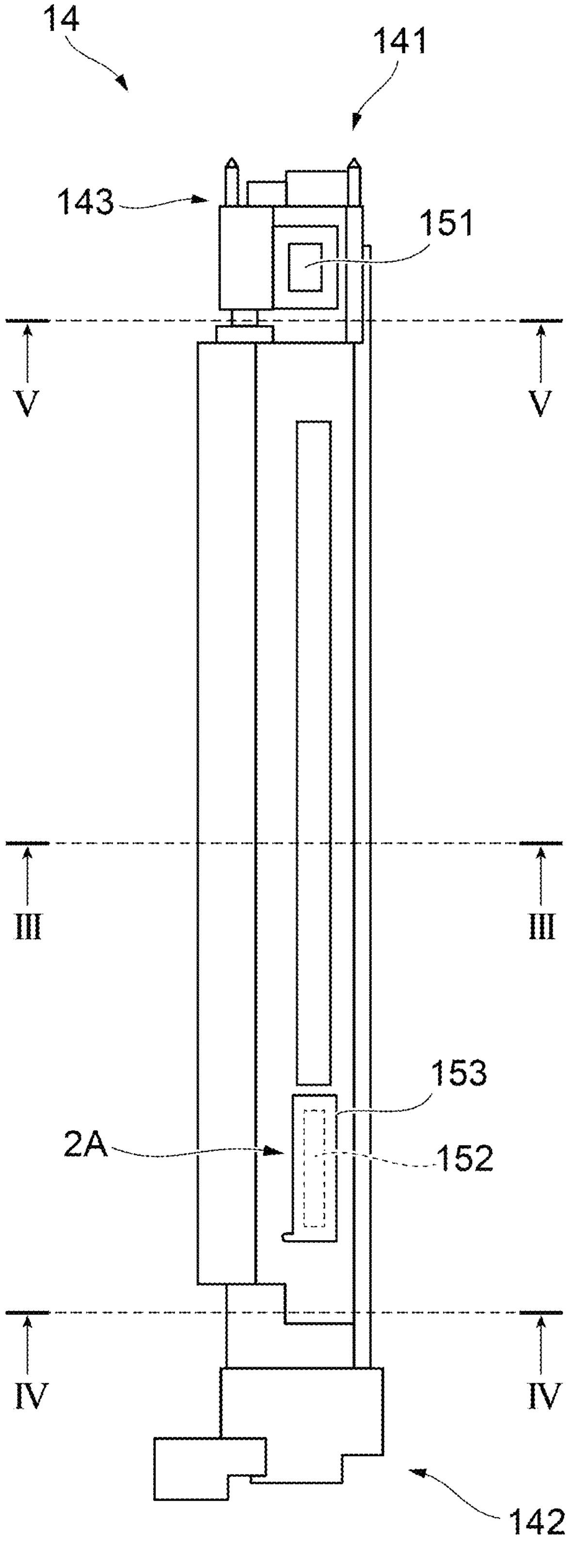
FIG. 2 is a top view of a developing device.

FIG. 2 is a top view of the developing device 14.

When installed in the image forming apparatus 100, the developing device 14 is disposed to extend in the depth direction of the image forming apparatus 100. The developing device 14 includes one end portion 141 and another end portion 142 that differ from each other in terms of positions in the longitudinal direction thereof.

When the developing device 14 is installed in the image forming apparatus 100, the one end portion 141 is located on the rear side of the image forming apparatus 100. The other end portion 142 is located on the front side of the image forming apparatus 100.

The one end portion 141 of the developing device 14 is provided with a driving-force receiver 143 that receives a driving force. A driving force from a driving source (not illustrated), such as a motor, provided on the body side of the image forming apparatus 100 is transmitted to the driving-force receiver 143.

The driving-force receiver 143 is interlocked with a transport member or the like (described later) provided inside the developing device 14. The transport member or the like rotates when a driving force from the driving source is transmitted to the driving-force receiver 143.

Figure 3:
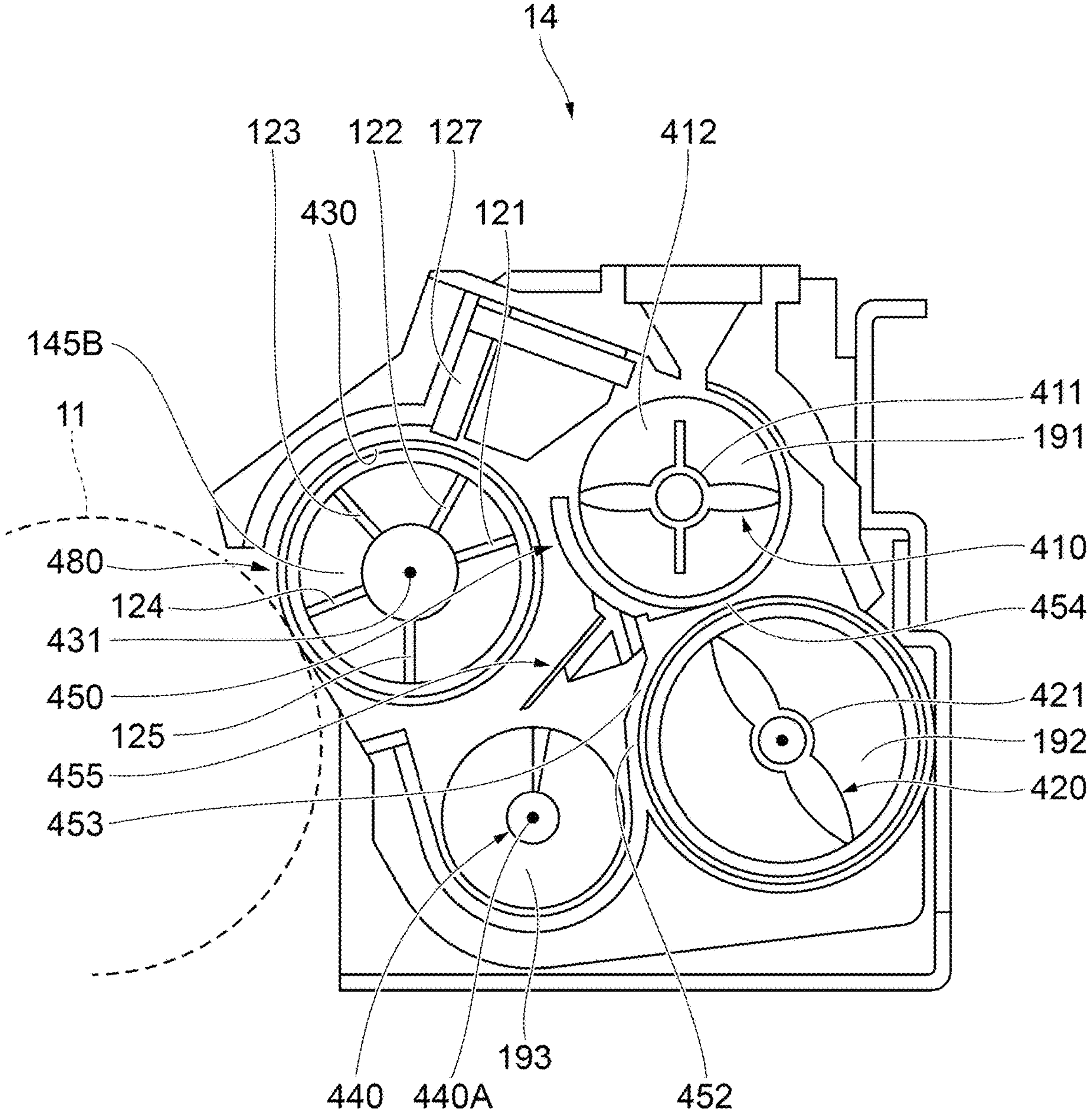
FIG. 3 is a sectional view of the developing device along the line III-III in FIG. 2.

FIG. 3 is a sectional view of the developing device 14 along the line III-III in FIG. 2. FIG. 3 illustrates a state of a cross-section of the developing device 14 at a central portion in the longitudinal direction.

The developing device 14 is provided with a one-direction movement path 191 along which a developer passes to move in one direction.

The developing device 14 is also provided with an opposite-direction movement path 192 along which a developer passes to move in a direction opposite to the one direction. The opposite-direction movement path 192 is disposed below the one-direction movement path 91.

In the one-direction movement path 191, a developer moves in a direction perpendicular to the sheet surface of FIG. 3 toward the back side in FIG. 3. In the opposite-direction movement path 192, a developer moves in the direction perpendicular to the sheet surface of FIG. 3 toward the front side in FIG. 3.

A one-direction transport member 410 that transports a developer is provided in the one-direction movement path 191.

The one-direction transport member 410 rotates about a rotary shaft 411 extending along the one-direction movement path 191. The rotation of the one-direction transport member 410 moves a developer toward the back side in FIG. 3.

An opposite-direction transport member 420 that transports a developer is provided in the opposite-direction movement path 192. The opposite-direction transport member 420 is disposed below the one-direction transport member 410.

The opposite-direction transport member 420 rotates about a rotary shaft 421 extending along the opposite-direction movement path 192. Consequently, the developer transported by the opposite-direction transport member 420 moves toward the front side in FIG. 3.

The opposite-direction transport member 420 transports a developer in a direction opposite to the one direction.

In addition, a rotating body 430 is provided on the left side of the one-direction transport member 410. The rotating body 430 is used to supply a developer to the photoconductor drum 11, which is one example of an image carrier.

In addition, the developing device 14 has a facing opening 480. The facing opening 480 is disposed at a position facing the photoconductor drum 11.

The rotating body 430 is installed at the facing opening 480. Part of the rotating body 430 is exposed through the facing opening 480 in the present exemplary embodiment.

The rotating body 430 supplies a developer, which is supplied to the rotating body 430 from the one-direction transport member 410, to the photoconductor drum 11. The rotating body 430 receives a developer supplied from the one-direction transport member 410 and supplies the developer to the photoconductor drum 11.

The rotating body 430 is constituted by a circular cylindrical body. The rotating body 430 is made of, for example, a metal such as SUS.

The rotating body 430 rotates counterclockwise in FIG. 3 with an axial center 431 as the center of the rotation. The rotating body 430 moves, to the photoconductor drum 11, the developer supplied from the one-direction transport member 410 and applied to the outer peripheral surface of the rotating body 430.

Consequently, the developer is supplied to the photoconductor drum 11, and a toner contained in the developer is applied to a surface of the photoconductor drum 11.

In addition, a first movement restricting portion 450 is provided between the rotating body 430 and the one-direction transport member 410. The first movement restricting portion 450 restricts the movement of part of a developer that attempts to move from the one-direction transport member 410 to the rotating body 430.

Part of the developer present on the one-direction movement path 191 moves over the first movement restricting portion 450 in the present exemplary embodiment. The developer that has moved over the first movement restricting portion 450 is supplied to the rotating body 430 in the present exemplary embodiment.

In addition, a lower transport member 440 is provided below the rotating body 430.

The lower transport member 440 is a rotary member that rotates about an axial center 440A extending in the one direction. The lower transport member 440 is disposed closer than the opposite-direction transport member 420 to the photoconductor drum 11.

The lower transport member 440 transports a developer separated from the rotating body 430 in the direction perpendicular to the sheet surface of the FIG. 3 toward the back side in FIG. 3.

The lower transport member 440 transports the developer separated from the rotating body 430 in the one direction. Consequently, the developer is supplied to the one end portion side of the opposite-direction transport member 420 (details will be described later).

In addition, a second movement restricting portion 452 is provided between the lower transport member 440 and opposite-direction transport member 420. The second movement restricting portion 452 restricts the movement of a developer from the opposite-direction transport member 420 to the lower transport member 440.

Further, a third movement restricting portion 453 is provided between the rotating body 430 and the opposite-direction transport member 420. The third movement restricting portion 453 restricts the movement of a developer from the opposite-direction transport member 420 to the rotating body 430.

In addition, a fourth movement restricting portion 454 is provided between the one-direction transport member 410 and the opposite-direction transport member 420.

The fourth movement restricting portion 454 restricts the movement of a developer from the one-direction transport member 410 to the opposite-direction transport member 420. The fourth movement restricting portion 454 also restricts the movement of a developer from the opposite-direction transport member 420 to the one-direction transport member 410.

Further, a fifth movement restricting portion 455 is provided between the rotating body 430 and the lower transport member 440. The fifth movement restricting portion 455 restricts the movement of a developer from the lower transport member 440 to the rotating body 430. A magnet roller 145B is provided inside the rotating body 430.

The magnet roller 145B is provided with five magnetic poles 121 to 125 that are arranged side by side in the circumferential direction of the magnet roller 145B.

The magnetic pole 121 is a pickup pole and attracts a developer that has been supplied from the one-direction movement path 191. Consequently, the developer is applied to a surface of the rotating body 430.

The magnetic poles 122 to 124 each have a function as a transport pole. The magnetic poles 122 to 124 move the developer on the surface of the rotating body 430 toward the downstream side in the rotation direction of the rotating body 430.

A facing restriction portion 127 is provided on the downstream side of the magnetic pole 122 and on the upstream side of the magnetic pole 123 in the rotation direction of the rotating body 430. The facing restriction portion 127 is disposed at a position facing the outer peripheral surface of the rotating body 430.

The facing restriction portion 127 is disposed with a gap interposed between the facing restriction portion 127 and the rotating body 430. The facing restriction portion 127 restricts the movement of part of the developer applied to the surface of the rotating body 430. Consequently, the thickness of the developer applied to the surface of the rotating body 430 becomes a predetermined thickness.

The developer on the surface of the rotating body 430 moves toward the downstream side in the rotation direction of the rotating body 430. The developer then moves to a surface of the photoconductor drum 11, and a toner contained in the developer is applied to the photoconductor drum 11.

Consequently, development is performed, and a toner image is formed on the surface of the photoconductor drum 11.

The toner image is in a state of being temporarily carried by the photoconductor drum 11. The toner image is then moved to the first transfer section 10 (refer to FIG. 1) by the photoconductor drum 11 that rotates. Then, the toner image is transferred to the intermediate transfer belt 15.

A magnetic pole 125 (refer to FIG. 3) has a function as a pickoff pole. The magnetic pole 125 forms a repulsive magnetic field and separates the developer applied to the surface of the rotating body 430 from the rotating body 430.

The magnetic pole 125 separates, from the rotating body 430, the developer that has not been transferred to the photoconductor drum 11.

The developer separated from the rotating body 430 moves downward and reaches a lower movement path 193.

The developer that has reached the lower movement path 193 is moved toward the one end portion 141 (refer to FIG. 2) of the developing device 14 by the lower transport member 440. The developer next moves to the opposite-direction movement path 192 (details will be described later).

Figure 4:
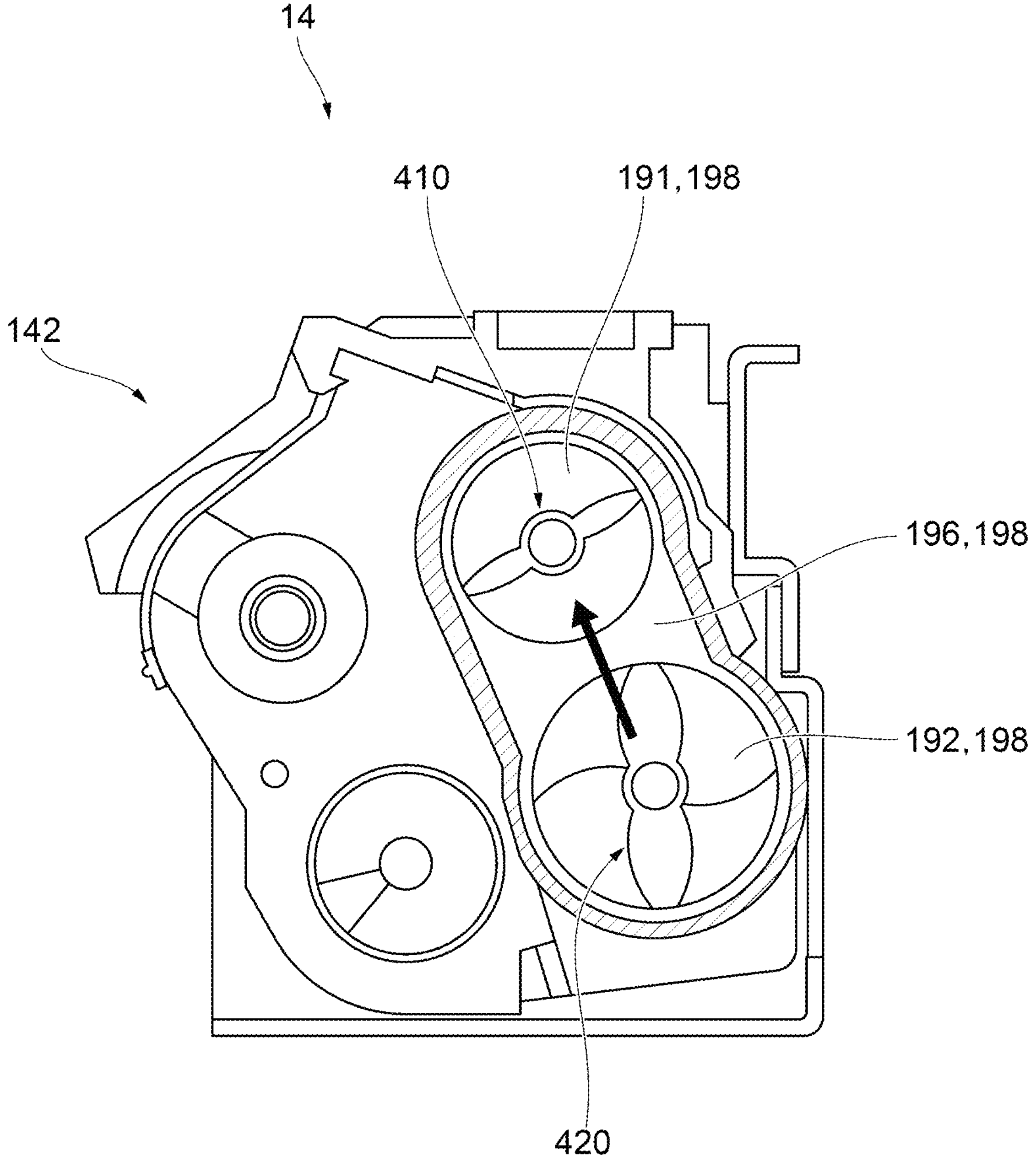
FIG. 4 is a sectional view of the developing device along the line IV-IV in FIG. 2.

FIG. 4 is a sectional view of the developing device 14 along the line IV-IV in FIG. 2.

FIG. 4 illustrates a state of a cross-section of the developing device 14 at the other end portion 142.

The other end portion 142 of the developing device 14 is provided with an upward movement path 196 that is disposed vertically. The developer that has moved along the opposite-direction movement path 192 moves along the upward movement path 196 toward the one-direction movement path 191.

In the present exemplary embodiment, a developer accumulates at an end portion of the opposite-direction movement path 192 located on the downstream side in the movement direction of the developer. The developer accumulating at the end portion is pressed by a developer that is successively transported from the upstream side in the present exemplary embodiment. Consequently, the developer accumulating at the end portion moves upward along the upward movement path 196.

As a result, the developer in the opposite-direction movement path 192 moves along the upward movement path 196 toward the one-direction movement path 191.

Figure 5:
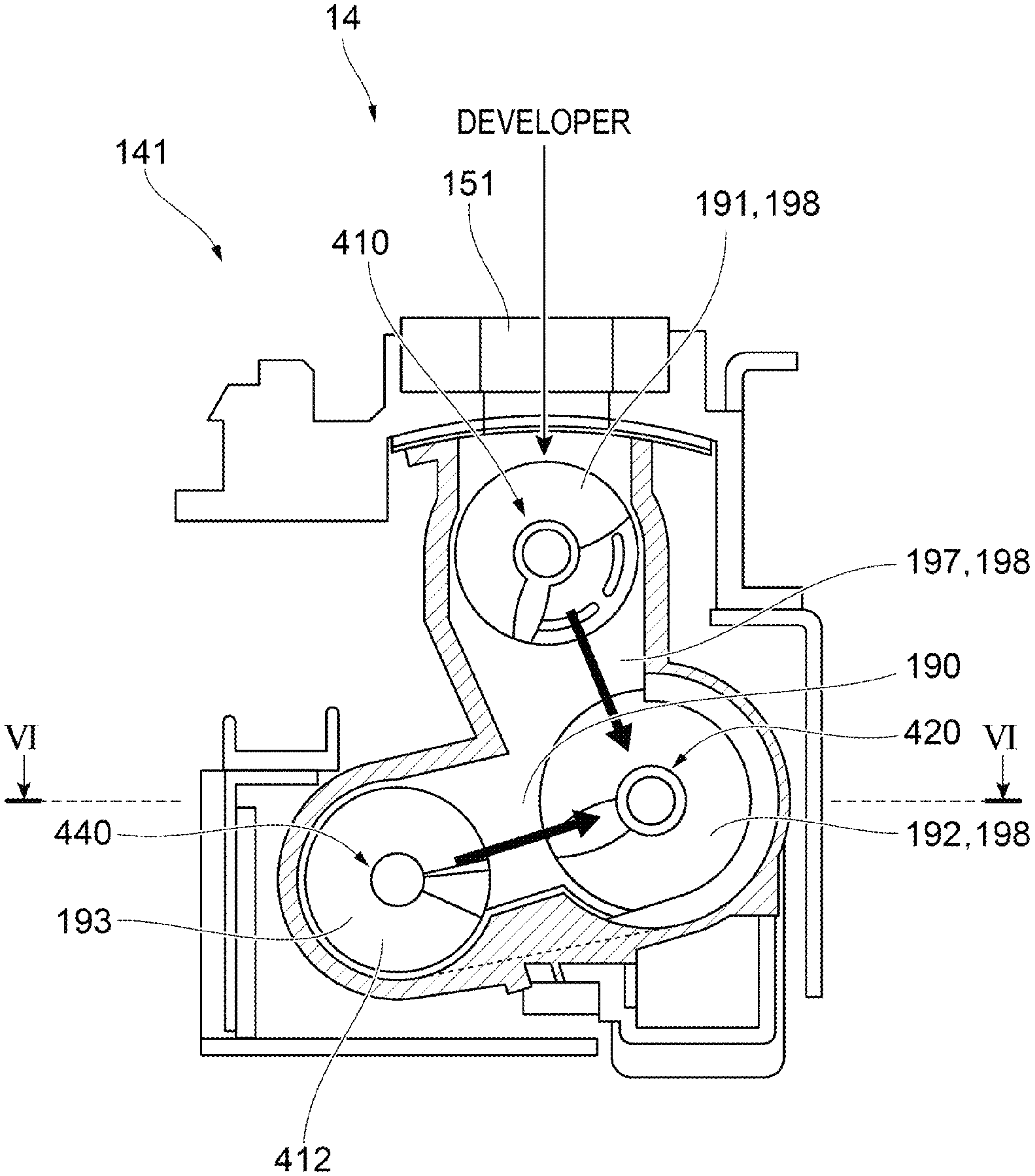
FIG. 5 is a sectional view of the developing device along the line V-V in FIG. 2.
Figure 6:
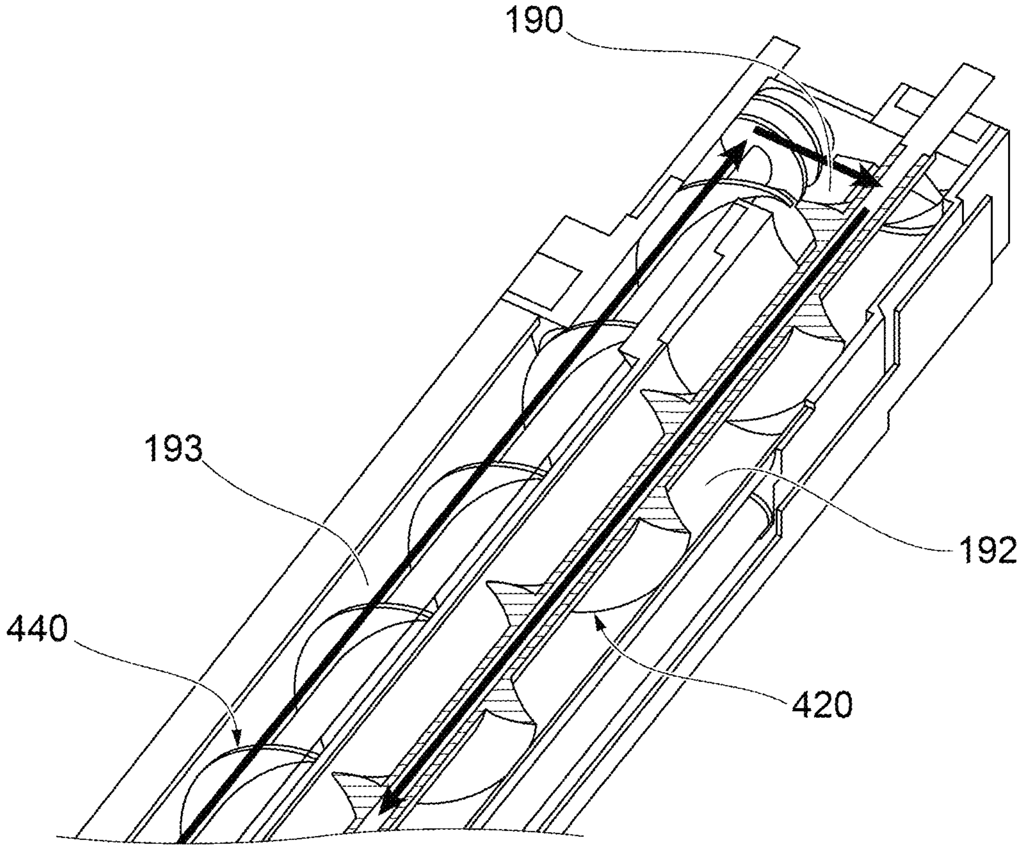
FIG. 6 is a sectional view of the developing device along the line VI-VI in FIG. 5.

FIG. 5 is a sectional view of the developing device 14 along the line V-V in FIG. 2. FIG. 6 is a sectional view of the developing device 14 along the line VI-VI in FIG. 5.

FIG. 5 illustrates a state of a cross-section of the developing device 14 at the one end portion 141.

As illustrated in FIG. 5, a vertically disposed downward movement path 197 is provided in the one end portion 141 of the developing device 14.

The developer that has moved along the one-direction movement path 191 moves along the downward movement path 197 toward the opposite-direction movement path 192.

As illustrated in FIG. 5 and FIG. 6, a connection path 190 is further provided in the present exemplary embodiment. The connection path 190 extends laterally and connects the lower movement path 193 and the opposite-direction movement path 192 to each other.

A developer is moved along the lower movement path 193 by the lower transport member 440 in the present exemplary embodiment. The developer that has moved along the lower movement path 193 then moves along the connection path 190 to the opposite-direction movement path 192.

A developer accumulates at an end portion of the lower movement path 193 located on the downstream side in the movement direction of the developer in the present exemplary embodiment.

The developer accumulating at the end portion is pressed by a developer that is successively transported from the upstream side in the present exemplary embodiment. Consequently, the developer accumulating at the end portion moves along the connection path 190 to the opposite-direction movement path 192.

A developer moves along the one-direction movement path 191 (refer to FIG. 3) and the opposite-direction movement path 192 in the present exemplary embodiment. Consequently, the developer circularly moves in the present exemplary embodiment.

Part of the developer that moves along the one-direction movement path 191 is then supplied to the rotating body 430 in the present exemplary embodiment. The developer is supplied to the photoconductor drum 11 via the rotating body 430.

A developer that remains on the surface of the rotating body 430 without being supplied to the photoconductor drum 11 separates from the rotating body 430 and moves to the lower movement path 193. The developer then moves along the lower movement path 193 to the opposite-direction movement path 192.

As illustrated in FIG. 2, the developing device 14 has a first reception port 151 for receiving a developer in the present exemplary embodiment. Through the first reception port 151, the developing device 14 receives a developer that has been delivered from the supplying device 70.

As illustrated in FIG. 5, a developer that has been delivered from the supplying device 70 enters the inside of the developing device 14 through the first reception port 151.

In addition, a second reception port 152 is provided at a portion denoted by the sign 2A in FIG. 2 in the present exemplary embodiment. The second reception port 152 is closed by a closing member 153.

A user can manually supply a new developer to the developing device 14 by using a tool (not illustrated) in the present exemplary embodiment.

When a new developer is to be supplied by a user manually, the user first removes the closing member 153. The user then supplies a developer to the developing device 14 through the second reception port 152 that appears as a result of removal of the closing member 153.

As illustrated in FIG. 3, the developing device 14 in the present exemplary embodiment has the facing opening 480 at which the rotating body 430 is installed.

The first reception port 151, the second reception port 152, and the facing opening 480 are provided as openings in the present exemplary embodiment.

No other opening is provided in the developing device 14 in addition to the first reception port 151, the second reception port 152, and the facing opening 480 in the present exemplary embodiment.

The developing device 14 in the present exemplary embodiment is thus in a form provided with a connection opening, which is an opening through which the inside and the outside of the developing device 14 are in communication with each other. Such a connection opening is not provided in the developing device 14 in addition to the first reception port 151, the second reception port 152, and the facing opening 480 in the present exemplary embodiment.

An internal pressure of the developing device 14 is released through an opening provided in the supplying device 70, not through a connection opening provided in the developing device 14 in the present exemplary embodiment.

A developer applied to the surface of the rotating body 430 returns to the inside of the developing device 14 without being transferred to the photoconductor drum 11 in the present exemplary embodiment. At this time, the air outside the developing device 14 is taken into the inside of the developing device 14. Consequently, the internal pressure of the developing device 14 increases.

Due to an increase in the internal pressure of the developing device 14, a gas attempts to move from the inside to the outside of the developing device 14. The gas that attempts to move from the inside to the outside of the developing device 14 moves toward the supplying device 70 (refer to FIG. 1) in the present exemplary embodiment.

The gas is then discharged to the outside of the supplying device 70 through the opening (not illustrated in FIG. 1) provided in the supplying device 70. An example of the gas is air.

In a case where a gas is discharged through only a connection opening provided in the developing device 14, a gas in a high pressure state tends to be discharged.

In contrast, in the present exemplary embodiment, a gas is discharged through the opening provided in the supplying device 70 separated from the developing device 14. In this case, a gas in a state in which the pressure is alleviated is discharged through the opening.

In a case where a gas in a state in which the pressure is alleviated is discharged, the amount of a developer that attempts to move to the outside through the opening provided in the supplying device 70 decreases. In this case, a filter that is set at the opening may be less likely to be stained, and the life of the filter may be lengthened.

However, providing a connection opening in the developing device 14 is not excluded. A configuration in which a connection opening is provided in the developing device 14 and another opening is further provided in the supplying device 70 may be employed.

In this case, a gas inside the developing device 14 is discharged to the outside of the developing device 14 through the connection opening.

In this case, the gas inside the developing device 14 is also discharged to the outside of the developing device 14 through the opening provided in the supplying device 70.

Figure 7:
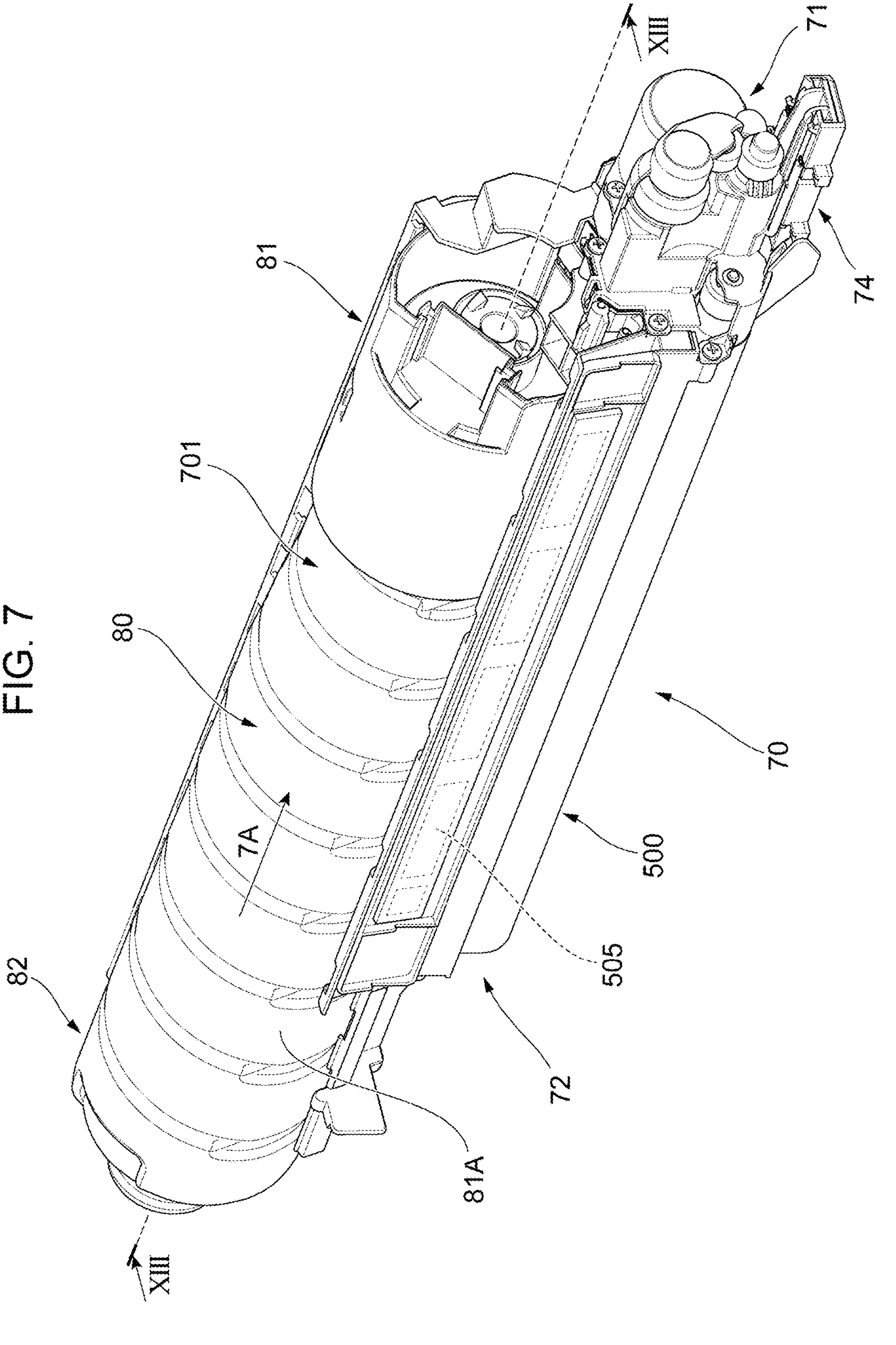
FIG. 7 is a perspective view of a supplying device viewed from the rear side of an image forming apparatus.

FIG. 7 is a perspective view of the supplying device 70 viewed from the rear side of the image forming apparatus 100. FIG. 7 illustrates a state in which the developer storage container 80 is mounted.

For example, an unused developer is stored in the developer storage container 80. The developer storage container 80 is attachable to and detachable from the image forming apparatus 100 (refer to FIG. 1) in the present exemplary embodiment. The developer storage container 80 is mounted on a mount portion 701 of the supplying device 70.

In mounting of the developer storage container 80 onto the image forming apparatus 100, the developer storage container 80 is moved in the direction indicated by the arrow 7A in FIG. 7.

The developer storage container 80 has a cylindrical shape. Specifically, the developer storage container 80 has a circular cylindrical shape. The shape of the developer storage container 80 is, however, not limited to a circular cylindrical shape. The developer storage container 80 may have a prismatic shape.

When the developer storage container 80 is mounted on the image forming apparatus 100, the supplying device 70 is located below the developer storage container 80. A developer from the developer storage container 80 is supplied to the developing device 14 (not illustrated in FIG. 7) by the supplying device 70 in the present exemplary embodiment.

The developer storage container 80 includes one end portion 81 that is located at the leading position in mounting of the developer storage container 80 onto the image forming apparatus 100. The developer storage container 80 also includes another end portion 82 located opposite to the one end portion 81.

An outlet for a developer is provided at the one end portion 81 and below the developer storage container 80. A developer in the developer storage container 80 moves through the outlet to the supplying device 70 located below.

The supplying device 70 includes one end portion 71 and another end portion 72.

The one end portion 71 of the supplying device 70 is located on the rear side of the image forming apparatus 100. The other end portion 72 of the supplying device 70 is located on the front side of the image forming apparatus 100.

A reception port (not illustrated FIG. 7) through which a developer from the developer storage container 80 is received is provided on the one end portion 71 side of the supplying device 70.

In the present exemplary embodiment, a developer is transported to the supplying device 70 from the upstream side of the supplying device 70 in a transport direction of the developer. The supplying device 70 has a reception port through which the developer transported from the upstream side of the supplying device 70 is received.

The developer storage container 80 has a function of delivering a developer inside the developer storage container 80 to the outside. A member for delivering a developer to the outside of the developer storage container 80 is provided inside the developer storage container 80.

The developer storage container 80 is located on the upstream side of the supplying device 70 in the transport direction of the developer. The reception port of the supplying device 70 receives a developer supplied from the developer storage container 80 located on the upstream side.

The supplying device 70 is further provided with a developer accumulation unit 500 in which a developer that has entered the inside of the supplying device 70 through the reception port accumulates.

A developer supplied from the developer storage container 80 to the supplying device 70 is once stored in the developer accumulation unit 500.

The developer temporarily accumulates in the developer accumulation unit 500.

After moving through the inside of the developer accumulation unit 500, the developer is discharged through a discharge port 74 provided in the one end portion 71 of the supplying device 70.

The supplying device 70 is provided with the discharge port 74 that is used to discharge a developer received through the reception port. A developer discharged through the discharge port 74 is supplied to the developing device 14 (not illustrated in FIG. 7) located below the discharge port 74.

The first reception port 151 (refer to FIG. 2) provided in the developing device 14 is disposed directly under the discharge port 74 of the supplying device 70 in the present exemplary embodiment.

A developer discharged through the discharge port 74 moves to the inside of the developing device 14 through the first reception port 151. Consequently, the developer is supplied from the supplying device 70 to the developing device 14.

A developer is once stored in the developer accumulation unit 500.

Consequently, it is possible, even when the developer storage container 80 is detached, to supply a developer from the supplying device 70 to the developing device 14.

When the developer storage container 80 is emptied, the developer storage container 80 is detached.

The developer in the developer accumulation unit 500 is supplied to the developing device 14, even when the developer storage container 80 is detached, in the present exemplary embodiment.

Consequently, it is possible, even when the developer storage container 80 is detached, to supply a developer from the supplying device 70 to the developing device 14.

In this case, even when the developer storage container 80 is detached, an immediate stoppage of an image formation operation may be avoided. In this case, it may be possible to continue image formation until a new developer storage container 80 is mounted.

The supplying device 70 has an opening 505 through which the inside and the outside of the supplying device 70 are in communication with each other. The opening 505 is located at a position facing an outer peripheral surface 81A of the developer storage container 80 mounted on the mount portion 701.

The "located at a position facing" denotes a state in which the opening 505 is located in a space located at a position facing the outer peripheral surface 81A.

A state in which a member is present between the opening 505 and the outer peripheral surface 81A also corresponds to "located at a position facing". A state in which the opening 505 is directed to a side opposite to the side where the outer peripheral surface 81A is located also corresponds to "located at a position facing".

Figure 8:
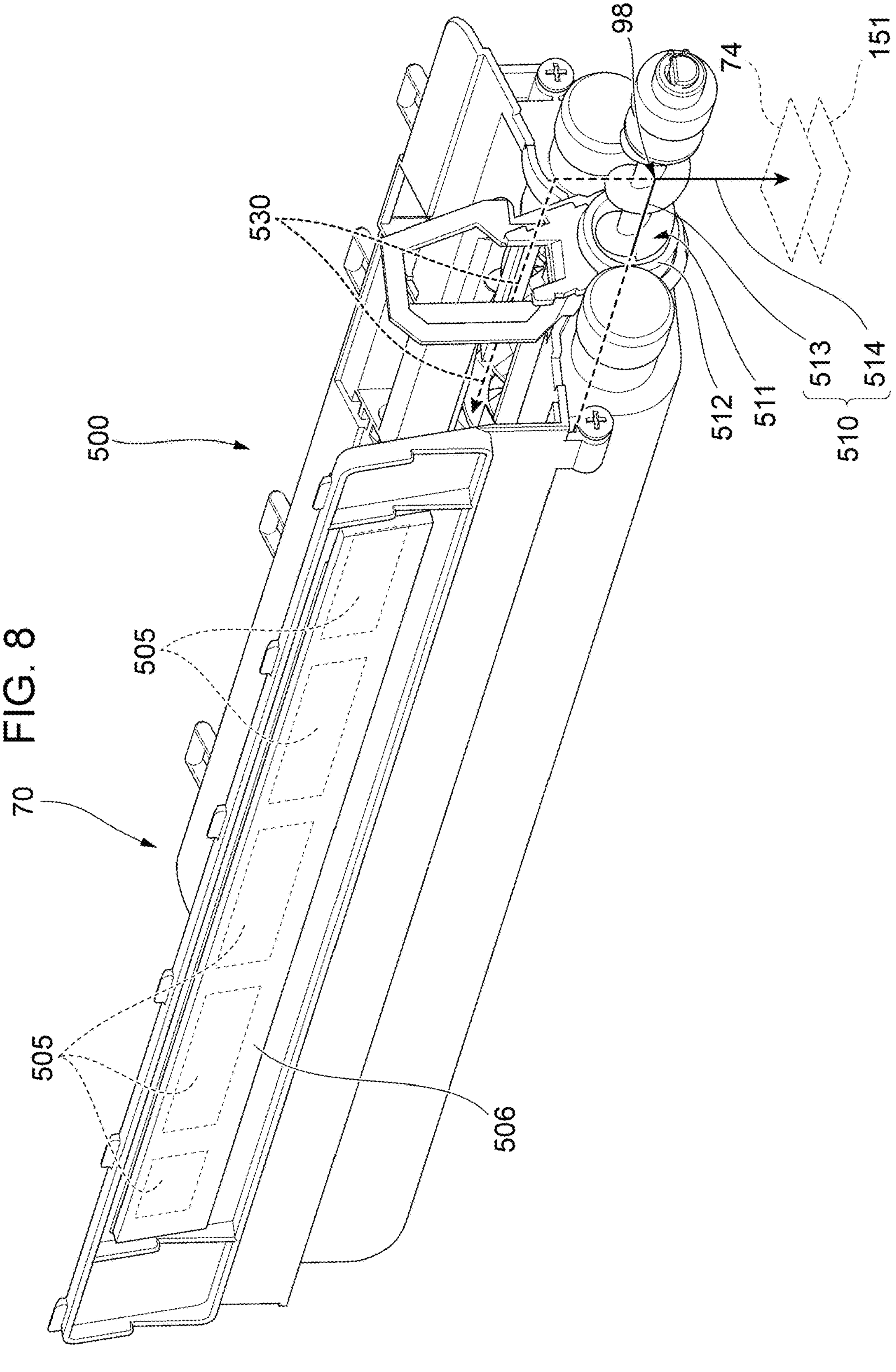
FIG. 8 is an explanatory view of a developer accumulation unit.

FIG. 8 is an explanatory view of the developer accumulation unit 500.

The developer accumulation unit 500 is provided with a developer flow path 510 along which a developer that moves toward the developing device 14 passes. The developer flow path 510 is provided in a form extending from the inside toward the outside of the developer accumulation unit 500.

A filled section 511 is present on the developer flow path 510. In the filled section 511, the entirety of a cross-section of the developer flow path 510 is filled with a developer.

In the present specification, the "cross-section" of the developer flow path 510 denotes a cross-section of the developer flow path 510 at a plane orthogonal to an extension direction of the developer flow path 510.

A cylindrical portion 512 is provided around the filled section 511. The inner side of the cylindrical portion 512 is the filled section 511 in the present exemplary embodiment.

On a cross-section orthogonal to an axial direction of the cylindrical portion 512, the entirety of the inner side of the cylindrical portion 512 is filled with a developer.

Consequently, the developer is in a dense state on the cross-section orthogonal to the axial direction of the cylindrical portion 512.

Thus, the filled section 511 in a state of being filled with a developer is generated on the inner side of the cylindrical portion 512 in the present exemplary embodiment.

In a configuration in which the filled section 511 is generated, the amount of a developer supplied per unit time from the supplying device 70 to the developing device 14 is stabilized.

If the filled section 511 is not present, the developer that moves toward the developing device 14 tends to be sparse. In this case, the amount of the developer supplied per unit time from the supplying device 70 to the developing device 14 tends to fluctuate.

On the downstream side of the filled section 511 in the transport direction of the developer, the developer flow path 510 turns to extend downward.

The developer flow path 510 includes a lateral flow path 513 extending laterally and a vertical flow path 514 extending vertically.

A developer that has passed through the filled section 511 moves along the lateral flow path 513 in a direction away from the filled section 511. The developer then moves downward along the vertical flow path 514. The developer drops in the vertical flow path 514.

The discharge port 74 of the supplying device 70 and the first reception port 151 of the developing device 14 are provided below the vertical flow path 514. A developer that moves downward along the vertical flow path 514 is supplied to the developing device 14.

There is further provided a gas flow path 530 that is a flow path along which a gas that has flowed from the developing device 14 to the supplying device 70 passes. The gas flow path 530 is provided separately from the developer flow path 510.

As described above, a gas flows from the developing device 14 toward the supplying device 70 with an increase in the internal pressure of the developing device 14 in the present exemplary embodiment.

A gas that has flowed from the developing device 14 to the supplying device 70 enters the inside of the supplying device 70 through the discharge port 74 of the supplying device 70.

The gas then moves upward along the vertical flow path 514, as one example of a drop portion. The gas next enters the gas flow path 530 provided in a form branching from the developer flow path 510.

The gas that has entered the gas flow path 530 moves toward the opening 505 provided in the supplying device 70 and is discharged through the opening 505. A filter 506 is installed at the opening 505. In FIG. 8, the opening 505 is provided at the rear of the filter 506.

Figure 9A:
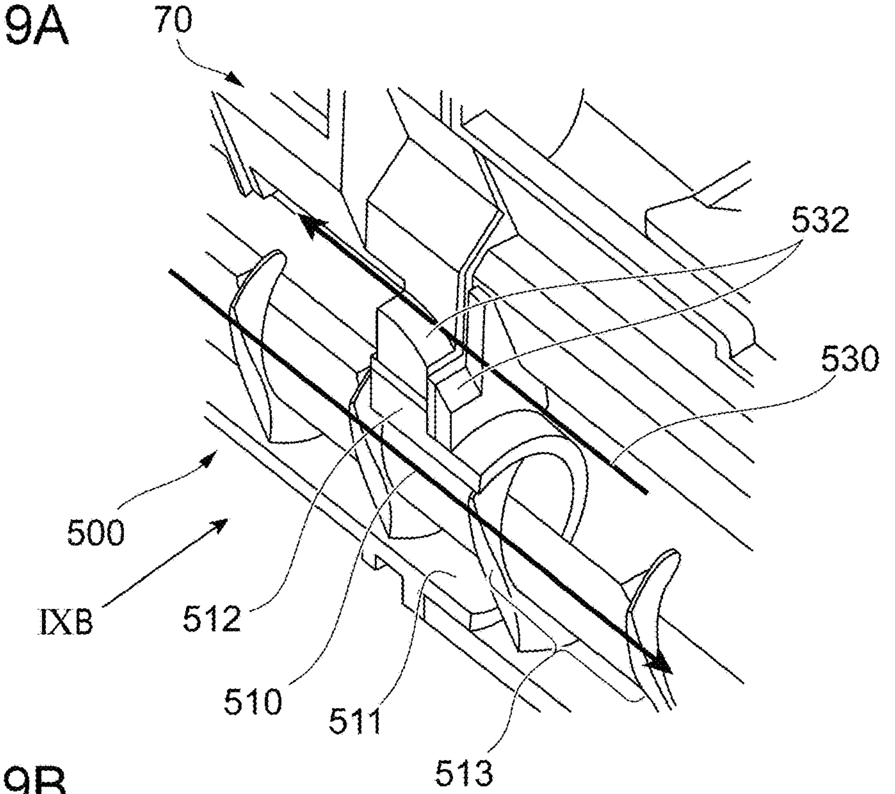
FIGS. 9A and 9B each illustrate a filled section and a gas flow path.
Figure 9B:
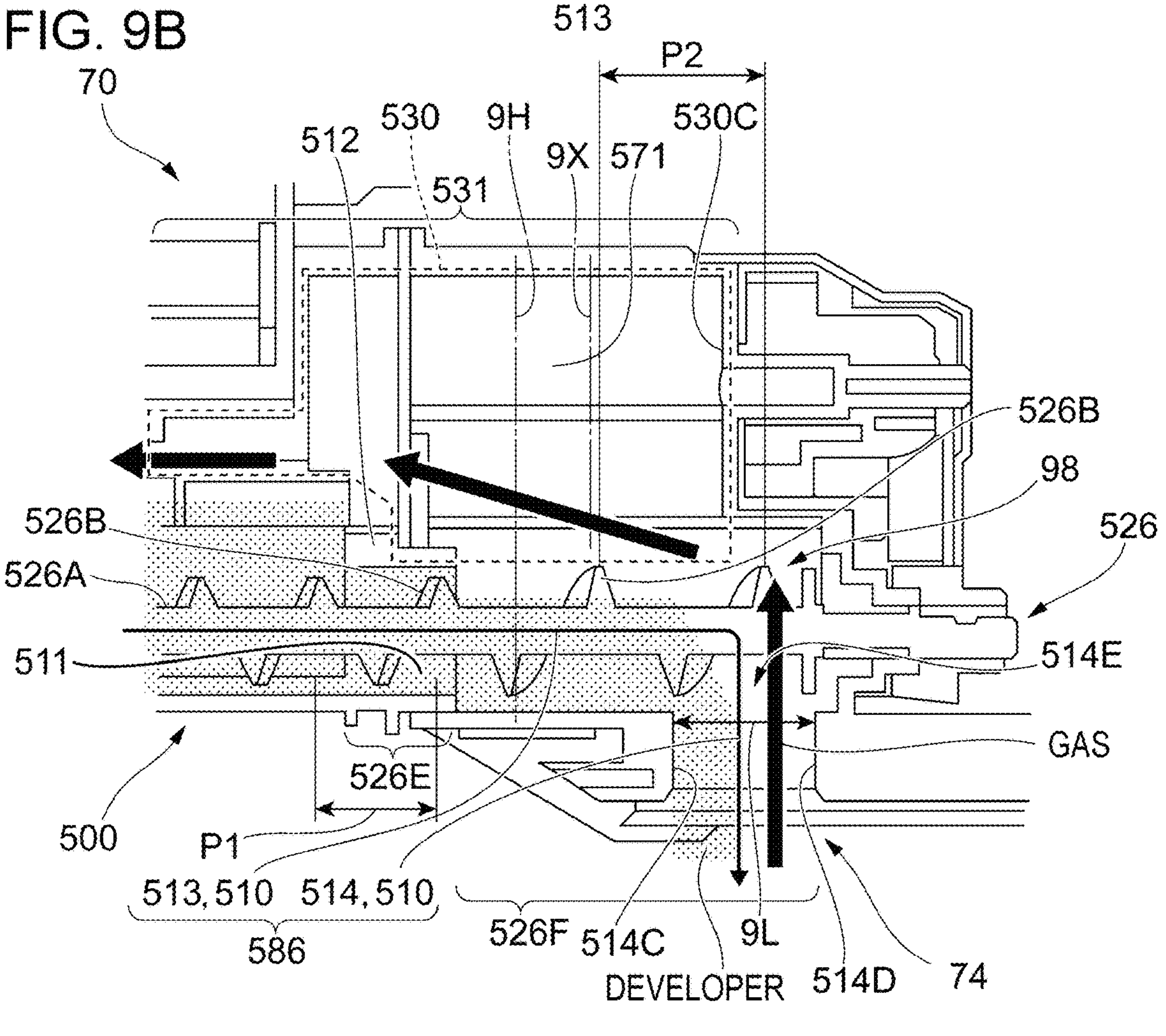

FIGS. 9A and 9B each illustrate the filled section 511 and the gas flow path 530.

FIG. 9A is a perspective view of the filled section 511 and the gas flow path 530. FIG. 9B illustrates the filled section 511 and the gas flow path 530 viewed in the direction indicated by the arrow IXB in FIG. 9A.

As described above and illustrated in FIG. 9A, the developer flow path 510 is provided in the present exemplary embodiment. The developer flow path 510 extends from the inside toward the outside of the developer accumulation unit 500.

The filled section 511 is present on the developer flow path 510 and on the inner side of the cylindrical portion 512. Further, the gas flow path 530 is provided above the cylindrical portion 512 in FIGS. 9A and 9B. The gas flow path 530 is provided above the filled section 511.

As illustrated in FIG. 8, the gas flow path 530 is provided in a form branching from the developer flow path 510.

A branch portion 98, as one example of a branch portion at which the gas flow path 530 branches from the developer flow path 510, is present. The branch portion 98 is located on the downstream side of the filled section 511 in the transport direction of the developer.

The gas flow path 530 branches on the downstream side of the filled section 511 in the transport direction of the developer from the developer flow path 510.

As illustrated in FIG. 9A, the gas flow path 530 passes above the filled section 511 after branching from the developer flow path 510.

A gas that passes along the gas flow path 530 passes above the filled section 511. The gas that passes along the gas flow path 530 passes through portions other than the filled section 511 and moves toward the upstream side in the movement direction of the developer.

A developer is in a dense state in the filled section 511, and a gas does not smoothly pass through the filled section 511. The gas flow path 530 along which a gas passes is thus provided at a portion other than the filled section 511 in the present exemplary embodiment.

As illustrated in FIG. 8, the gas flow path 530 extends from the branch portion 98 toward the side where the cylindrical portion 512 is provided. The gas flow path 530 further extends toward the upstream side in the movement direction of the developer by extending above the cylindrical portion 512.

The gas flow path 530 is then, as described later, connected again to an internal space of the supplying device 70. In other words, the gas flow path 530 enters the internal space of the supplying device 70.

The gas flow path 530 is connected again on the upstream side of the filled section 511 in the movement direction of the developer to the internal space of the supplying device 70.

The gas flow path 530 is connected again at a portion that differs from the branch portion 98 to the internal space of the supplying device 70.

The branch portion 98 at which the gas flow path 530 branches from the developer flow path 510 is present in the present exemplary embodiment. The gas flow path 530 is connected again at a portion that differs from the branch portion 98 to the internal space of the supplying device 70.

As illustrated in FIG. 9B, a gas from the developing device 14 first passes along the vertical flow path 514 provided as part of the developer flow path 510. The vertical flow path 514 provided as part of the developer flow path 510 is a drop portion in which the developer moves while dropping.

The gas from the developing device 14 passes along the vertical flow path 514, as one example of the drop portion. The gas moves along the vertical flow path 514 toward the upstream side in the movement direction of the developer.

The gas that has flowed from the developing device 14 to the supplying device 70 passes along the developer flow path 510. The gas that passes along the developer flow path 510 then moves toward the upstream side in the movement direction of the developer.

The filled section 511 is provided on the developer flow path 510. As described above, the entirety of the cross-section of the developer flow path 510 is filled with a developer in the filled section 511.

Further, the vertical flow path 514, as one example of a drop portion, is provided on the developer flow path 510.

The vertical flow path 514 is located on the downstream side of the filled section 511 in the movement direction of the developer.

Hereinafter, a direction intersecting the vertical direction may be referred to as "intersecting direction" in the present specification.

The filled section 511 and the vertical flow path 514 are disposed to differ from each other in terms of positions in the intersecting direction.

The developer that has passed through the filled section 511 moves in the intersecting direction and reaches the vertical flow path 514. The developer drops downward in the vertical flow path 514.

The gas that has flowed from the developing device 14 to the supplying device 70 first moves upward along the vertical flow path 514 illustrated in FIG. 9B.

Thereafter, the gas once enters the lateral flow path 513 and then enters the gas flow path 530 located above the lateral flow path 513. The gas then moves leftward in FIG. 9B along the gas flow path 530.

As illustrated in FIG. 9B, the gas flow path 530 extends laterally. In other words, the gas flow path 530 extends in the intersecting direction. The gas flow path 530 is provided with a lateral portion 531 that is a laterally extending portion.

As illustrated in FIG. 9A, a bottom surface of the lateral portion 531 has an inclination 532 inclining with respect to the horizontal direction. The inclination 532 inclines upward toward the upstream side in the movement direction of the gas that passes along the gas flow path 530.

Due to the bottom surface having the inclination 532, a developer may be less likely to accumulate on the bottom surface. A developer that is placed, on the bottom surface of the gas flow path 530, at a portion having the inclination 532 moves by sliding. Consequently, the developer moves in a right downward direction in FIG. 9A.

The lateral flow path 513 is located on the downstream side in the right downward direction. The developer placed on the bottom surface of the gas flow path 530 moves to the lateral flow path 513.

The cross-sectional area of the vertical flow path 514, as one example of a drop portion, is larger than the cross-sectional area of the filled section 511 illustrated in FIG. 9B in the present exemplary embodiment. The cross-sectional area of the vertical flow path 514 is larger than or equal to 1.1 times the cross-sectional area of the filled section 511 in the present exemplary embodiment.

Consequently, a gas from the developing device 14 may pass along the vertical flow path 514 smoothly.

When the cross-sectional area of the vertical flow path 514 is larger than the cross-sectional area of the filled section 511, the area of the developer occupying a cross-section of the vertical flow path 514 is small.

In this case, the area of the developer occupying the cross-section of the vertical flow path 514 is smaller than that in a case where the cross-sectional areas thereof are the same. In this case, the gas from the developing device 14 may pass along the vertical flow path 514 smoothly.

As illustrated in FIG. 9B, a space 571 is present between the filled section 511 and the vertical flow path 514 in the intersecting direction intersecting the vertical direction. The space 571 is a space through which both of a developer and a gas pass.

A developer that moves from the filled section 511 to the vertical flow path 514 passes through the space 571. A gas that moves from the vertical flow path 514 toward the filled section 511 also passes through the space 571.

The cross-sectional area of the space 571 is larger than the cross-sectional area of the filled section 511 in the present exemplary embodiment. The cross-sectional area of the space 571 is also larger than the cross-sectional area of the vertical flow path 514.

The cross-sectional area of the space 571 denotes the cross-sectional area at an imaginary plane 9H extending in the vertical direction.

The cross-sectional area of the filled section 511 denotes the cross-sectional area of an inner side region that is a region located on the inner side of the inner peripheral surface of the cylindrical portion 512. The cross-sectional area of the filled section 511 denotes the cross-sectional area of the inner side region at an imaginary plane orthogonal to the axial direction of the cylindrical portion 512.

A central transport member 526 that includes a rotary shaft 526A is provided in the filled section 511 in the present exemplary embodiment.

In this case, a value that is obtained as a result of a subtraction of the cross-sectional area of the rotary shaft 526A is considered as the cross-sectional area of the filled section 511. A value that is obtained by subtracting the cross-sectional area of the rotary shaft 526A from the cross-sectional area of the inner side region is considered as the cross-sectional area of the filled section 511.

Details of the central transport member 526 will be described later.

Figure 21A:
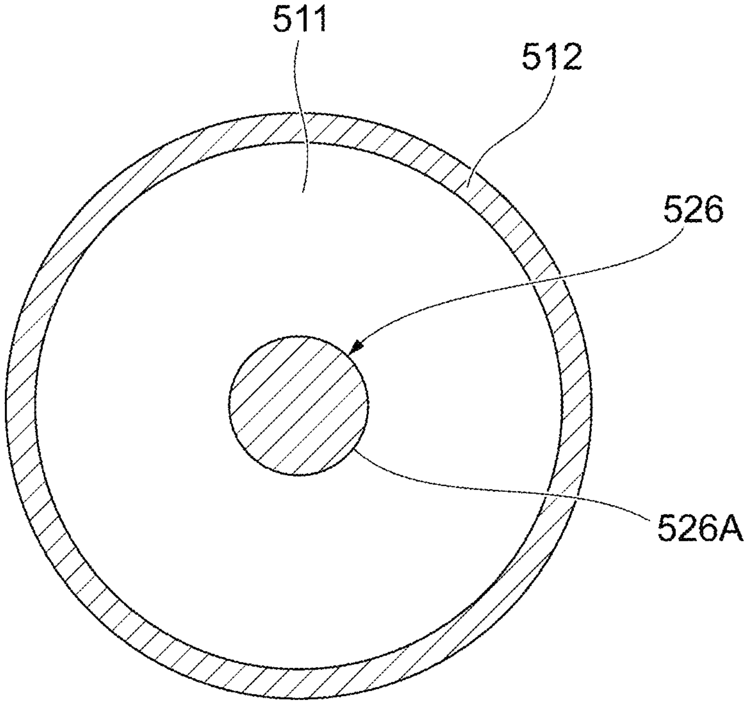
FIGS. 21A and 21B each illustrate a state of a cross-section.
Figure 21B:
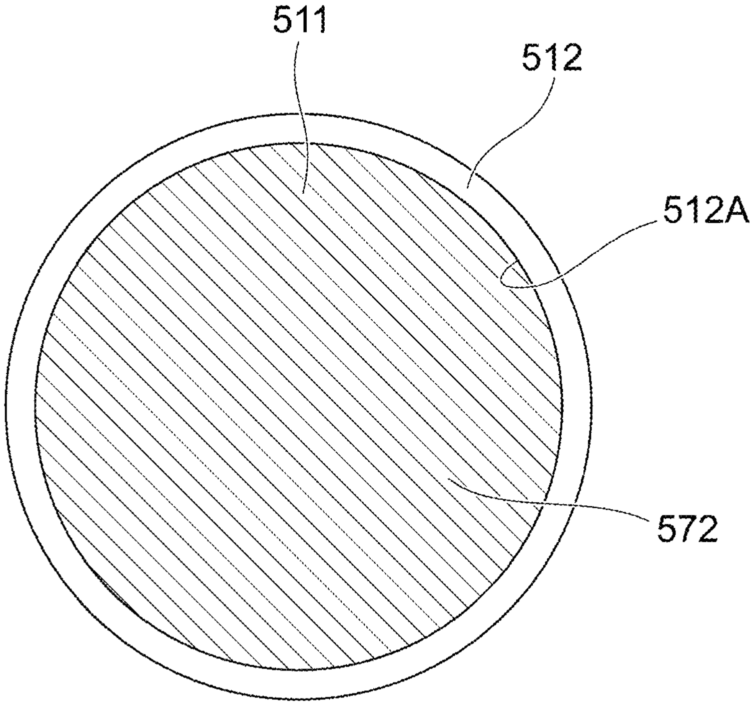

FIGS. 21A and 21B each illustrate a state of a cross-section.

FIG. 21A illustrates a state of a cross-section of the filled section 511. In FIG. 21A, a protrusion 526B of the central transport member 526 is not illustrated.

FIG. 21B illustrates a state of a cross-section in a case where the central transport member 526 is not provided.

The central transport member 526 may be not provided in the filled section 511. When the central transport member 526 is not provided in the filled section 511, the state of the cross-section of the filled section 511 is the state illustrated in FIG. 21B.

As illustrated in FIG. 21B, the "cross-sectional area of the filled section 511" basically denotes the cross-sectional area of an inner side region 572. Specifically, the "cross-sectional area of the filled section 511" denotes the cross-sectional area of the inner side region 572 at an imaginary plane orthogonal to the axial direction of the cylindrical portion 512.

The inner side region 572 is a region that is located on the inner side of an inner peripheral surface 512A of the cylindrical portion 512 and that is surrounded by the inner peripheral surface 512A.

Meanwhile, when the central transport member 526 is provided as illustrated in FIG. 21A, the cross-sectional area of the rotary shaft 526A is also taken into consideration.

When the central transport member 526 is provided, the cross-sectional area of the rotary shaft 526A is subtracted from the area of the inner side region 572 (refer to FIG. 21B). Then, a value obtained as a result of the subtraction of the cross-sectional area of the rotary shaft 526A is considered as the cross-sectional area of the filled section 511.

The cross-sectional area of the vertical flow path 514 is larger than the cross-sectional area of the filled section 511 obtained as described above in the present exemplary embodiment.

The cross-sectional area of the vertical flow path 514 (refer to FIG. 9B) denotes the cross-sectional area thereof at an imaginary plane orthogonal to an extension direction of the vertical flow path 514. The imaginary plane orthogonal to the extension direction of the vertical flow path 514 is a horizontal plane in the present exemplary embodiment. The cross-sectional area of the vertical flow path 514 denotes the cross-sectional area thereof at the horizontal plane in the present exemplary embodiment.

In other words, the cross-sectional area of the vertical flow path 514 denotes the cross-sectional area thereof at an imaginary plane orthogonal to the movement direction of the developer. The "movement direction" mentioned here denotes the movement direction of the developer that passes along the vertical flow path 514.

The vertical flow path 514 is a flow path extending in the vertical direction in the present exemplary embodiment. The vertical flow path 514 is, however, not limited thereto and may be inclined with respect to the vertical direction. A flow path that is disposed in a state of being inclined with respect to the vertical direction is also included in the vertical flow path 514.

Figure 10:
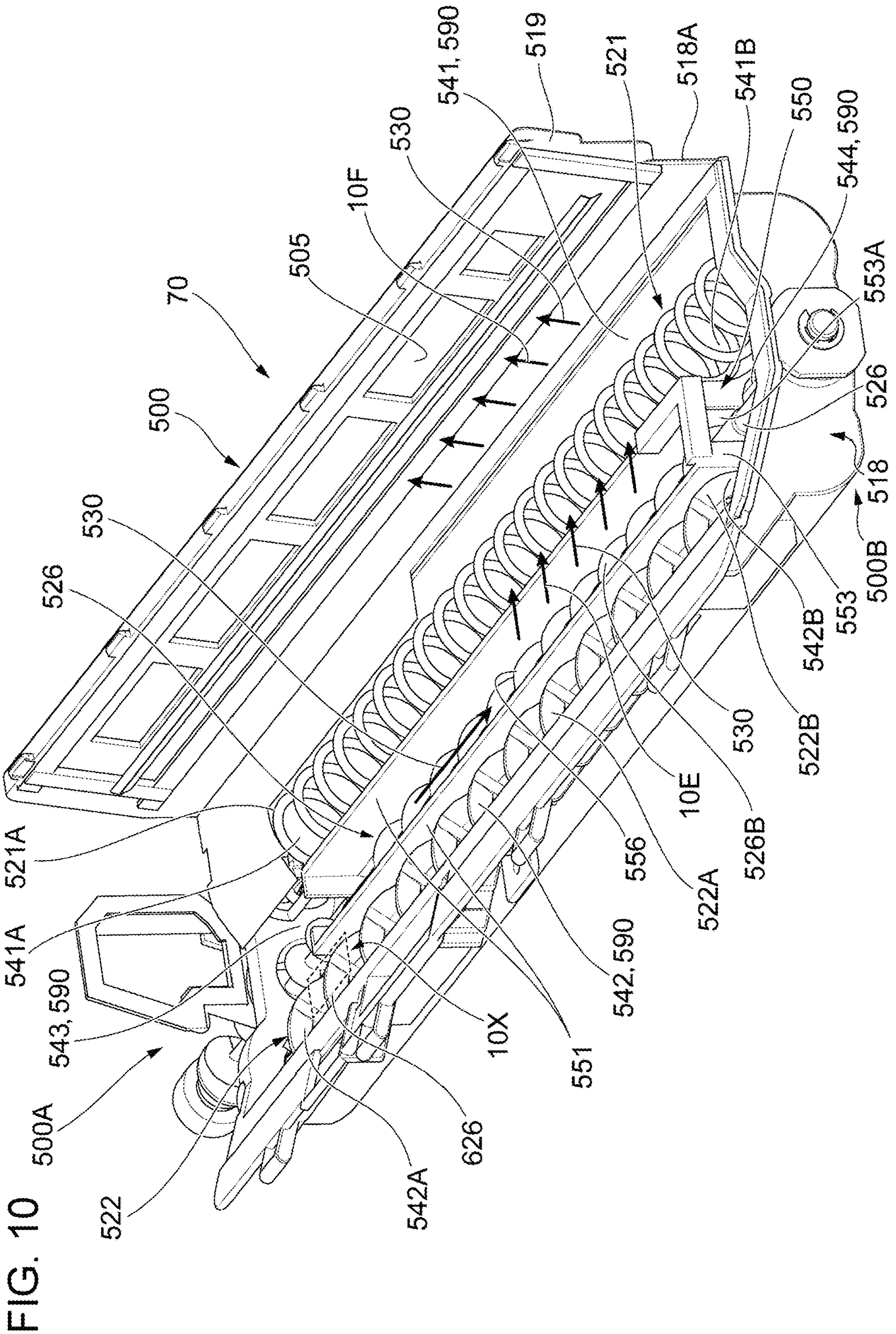
FIG. 10 is a top perspective view of a developer accumulation unit.
Figure 11:
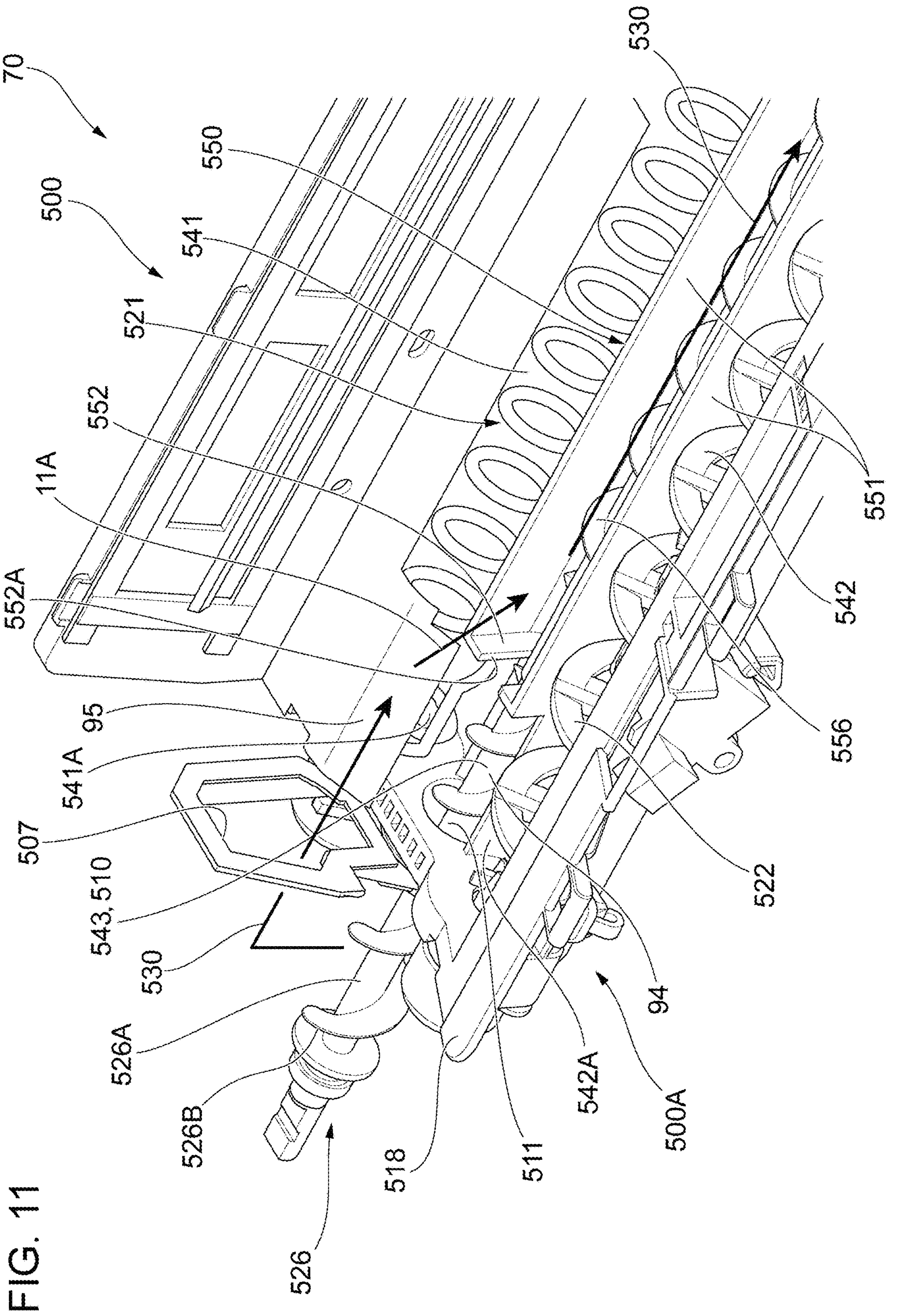
FIG. 11 is an enlarged view of one end portion A of a developer accumulation unit.

FIG. 10 is a top perspective view of the developer accumulation unit 500. FIG. 11 is an enlarged view of one end portion 500A of the developer accumulation unit 500.

FIG. 10 illustrates a state of the developer accumulation unit 500 viewed from the side of another end portion 500B of the developer accumulation unit 500.

As illustrated in FIG. 10, the developer accumulation unit 500 is provided with a lower-side container 518 having a rectangular parallelepiped shape. A developer supplied from the developer storage container 80 (not illustrated in FIG. 10) is first stored in the lower-side container 518.

A one-direction transport member 521 that transports a developer in one direction is provided inside the lower-side container 518. In addition, an opposite-direction transport member 522 that transports a developer in a direction opposite to the one direction is provided inside the lower-side container 518.

The one-direction transport member 521 and the opposite-direction transport member 522 are provided to be parallel to each other. Each of the one-direction transport member 521 and the opposite-direction transport member 522 is also provided in a form extending in a longitudinal direction of the lower-side container 518.

A driving source (not illustrated), such as a motor, that drives the one-direction transport member 521 is further provided. In addition, a driving source (not illustrated), such as a motor, that drives the opposite-direction transport member 522 is provided.

The one-direction transport member 521 is constituted by a coil. In other words, the one-direction transport member 521 is constituted by a wire material that is bent into a helical form.

The opposite-direction transport member 522 is provided with a rod-shaped rotary shaft (not illustrated). The rotary shaft is provided in a form extending in the longitudinal direction of the lower-side container 518.

The opposite-direction transport member 522 is also provided with a protrusion 522A that protrudes from the outer peripheral surface of the rotary shaft. The protrusion 522A is disposed around the rotary shaft and in a helical form.

The opposite-direction transport member 522 may be a transport member constituted by a coil, similarly to the one-direction transport member 521.

The one-direction transport member 521 may be a transport member that includes a rotary shaft and a protrusion in a helical form, similarly to the opposite-direction transport member 522.

Both of the one-direction transport member 521 and the opposite-direction transport member 522 may be a transport member constituted by a coil.

Both of the one-direction transport member 521 and the opposite-direction transport member 522 may be a transport member that includes a rotary shaft and a protrusion in a helical form.

The coil-shaped one-direction transport member 521 rotates about a rotary shaft thereof extending in an axial direction of the one-direction transport member 521 in the present exemplary embodiment. Consequently, a developer gradually moves in the axial direction of the one-direction transport member 521.

Specifically, the developer moves toward one end portion 521A of the one-direction transport member 521 in the axial direction.

The opposite-direction transport member 522 rotates about the rotary shaft thereof in the present exemplary embodiment.

Consequently, extrusion of a developer is performed by the protrusion 522A provided on the opposite-direction transport member 522. In response to this, the developer moves in an axial direction of the opposite-direction transport member 522.

Specifically, the developer moves toward another end portion 522B of the opposite-direction transport member 522 in the axial direction.

In addition, a one-direction flow path 541 that is a flow path along which a developer passes to move in one direction is provided inside the lower-side container 518.

Further, an opposite-direction flow path 542 that is a flow path along which a developer passes to move in a direction opposite to the one direction is provided inside the lower-side container 518.

The one-direction flow path 541 and the opposite-direction flow path 542 are provided in a form being parallel to each other. Each of the one-direction flow path 541 and the opposite-direction flow path 542 is provided in a form extending in the longitudinal direction of the lower-side container 518.

The one-direction transport member 521 is disposed in the one-direction flow path 541. A developer transported by the one-direction transport member 521 moves in the one-direction flow path 541.

The opposite-direction transport member 522 is disposed in the opposite-direction flow path 542. A developer transported by the opposite-direction transport member 522 moves in the opposite-direction flow path 542.

Further, a one-end-portion-side connection flow path 543 is provided.

The one-end-portion-side connection flow path 543 is provided at the one end portion 500A of the developer accumulation unit 500 and inside the lower-side container 518. The one-end-portion-side connection flow path 543 connects one end portion 541A of the one-direction flow path 541 and one end portion 542A of the opposite-direction flow path 542 to each other.

In addition, an other-end-portion-side connection flow path 544 is provided.

The other-end-portion-side connection flow path 544 is provided at the other end portion 500B of the developer accumulation unit 500 and inside the lower-side container 518. The other-end-portion-side connection flow path 544 connects another end portion 541B of the one-direction flow path 541 and another end portion 542B of the opposite-direction flow path 542 to each other.

Further, as illustrated in FIG. 10, an annular wall portion 550 that is an annularly provide wall portion is provided inside the lower-side container 518.

The annular wall portion 550 has an annular shape in a top view of the lower-side container 518. The annular wall portion 550 also has a rectangular shape in a top view of the lower-side container 518.

The annular wall portion 550 is provided between the one-direction flow path 541 and the opposite-direction flow path 542. The annular wall portion 550 is also provided between the one-end-portion-side connection flow path 543 and the other-end-portion-side connection flow path 544.

As illustrated in FIG. 10, the annular wall portion 550 is provided in a form protruding upward from the bottom surface of the lower-side container 518. The annular wall portion 550 is also provided in a form extending in the longitudinal direction of the lower-side container 518.

The one-direction flow path 541 and the opposite-direction flow path 542 are provided around the annular wall portion 550. In addition, the one-end-portion-side connection flow path 543 and the other-end-portion-side connection flow path 544 are provided around the annular wall portion 550.

A developer is transported by the one-direction transport member 521 and the opposite-direction transport member 522 in the present exemplary embodiment. The transported developer moves through, in an internal space of the lower-side container 518, a space located around the annular wall portion 550.

After passing along the one-direction flow path 541, the transported developer reaches the one-end-portion-side connection flow path 543. The developer then moves from the one-end-portion-side connection flow path 543 to the opposite-direction flow path 542. The developer next moves along the opposite-direction flow path 542 to the other-end-portion-side connection flow path 544. The developer then moves along the other-end-portion-side connection flow path 544 to the one-direction flow path 541.

The transported developer circularly moves by moving along the periphery of the annular wall portion 550. An annular circulation flow path 590 along which a developer circularly moves is provided around the annular wall portion 550 in the present exemplary embodiment.

The circulation flow path 590, as one example of an annular flow path, is formed by the one-direction flow path 541, the one-end-portion-side connection flow path 543, the opposite-direction flow path 542, and the other-end-portion-side connection flow path 544.

A developer transported by the one-direction transport member 521 moves toward the one end portion 541A of the one-direction flow path 541.

The developer then reaches the one end portion 541A. Further, a developer is successively transported to the one end portion 541A from the upstream side by the one-direction transport member 521.

The developer that has reached the one end portion 541A is pressed by the developer transported from the upstream side. Consequently, the developer that has reached the one end portion 541A moves to the one-end-portion-side connection flow path 543.

The developer then moves along the one-end-portion-side connection flow path 543 to the opposite-direction flow path 542.

The developer that has moved to the opposite-direction flow path 542 moves toward the other end portion 542B of the opposite-direction flow path 542.

The developer that has moved to the opposite-direction flow path 542 is moved by the opposite-direction transport member 522 toward the other end portion 542B. Consequently, the developer reaches the other end portion 542B.

The developer that has reached the other end portion 542B of the opposite-direction flow path 542 then moves toward the other-end-portion-side connection flow path 544.

The opposite-direction transport member 522 transports a developer successively to the other end portion 542B from the upstream side in the present exemplary embodiment. The developer that has reached the other end portion 542B is pressed by a developer that is successively transported to the other end portion 542B from the upstream side.

Consequently, the developer enters the other-end-portion-side connection flow path 544. The developer then reaches the one-direction flow path 541.

Consequently, the developer moves around the annular wall portion 550 in the present exemplary embodiment. In other words, the developer moves along the circulation flow path 590. As a result, the developer circularly moves in the present exemplary embodiment.

The annular wall portion 550 is constituted by four wall portions.

The annular wall portion 550 is provided with two axial wall portions 551.

The two axial wall portions 551 extend in the axial direction of the one-direction transport member 521. The two axial wall portions 551 also extend in the axial direction of the opposite-direction transport member 522.

The two axial wall portions 551 are disposed to face each other. The two axial wall portions 551 are also disposed in a form being parallel to each other.

As illustrated in FIG. 11, the annular wall portion 550 is further provided with one-end-portion-side wall portion 552. The one-end-portion-side wall portion 552 is located at one end portion of the annular wall portion 550 in the longitudinal direction. The one-end-portion-side wall portion 552 connects the two axial wall portions 551 to each other.

As illustrated in FIG. 10, the annular wall portion 550 is further provided with another-end-portion-side wall portion 553. The other-end-portion-side wall portion 553 is located at another end portion of the annular wall portion 550 in the longitudinal direction. The other-end-portion-side wall portion 553 connects the two axial wall portions 551 to each other.

As illustrated in FIG. 11, the one end portion 500A of the developer accumulation unit 500 has an opening 507 through which the gas flow path 530 extends. A gas that is from the developing device 14 and that passes along the gas flow path 530 passes through the opening 507.

As illustrated in FIG. 10, a wall portion 519 that extends upward is further provided.

The wall portion 519 is provided above one side wall 518A that extends in the longitudinal direction of the lower-side container 518.

The side wall 518A that extends in the longitudinal direction of the lower-side container 518 is provided as one of four side walls of the lower-side container 518. The wall portion 519 is provided above the side wall 518A that extends in the longitudinal direction of the lower-side container 518.

The wall portion 519 is provided in a form extending in the longitudinal direction of the lower-side container 518.

The wall portion 519 has the opening 505 that is used for discharge of a gas that has flowed from the developing device 14. The inside and the outside of the supplying device 70 are in communication with each other through the opening 505.

Multiple openings 505 are provided. The multiple openings 505 are arranged side by side in the longitudinal direction of the lower-side container 518.

Each of the openings 505 is provided in a form elongated in an axial direction of the developer storage container 80 mounted on the mount portion 701 (refer to FIG. 7).

A gas that has passed along the gas flow path 530 (refer to FIG. 11) is eventually discharged through the openings 505 to the outside of the supplying device 70.

As illustrated in FIG. 11, a wall-portion inner space 556 that is a space located on the inner side of the annular wall portion 550 is provided on the inner side of the annular wall portion 550.

A gas that has flowed along the gas flow path 530 then enters the wall-portion inner space 556 as indicated by the arrow 11A in the present exemplary embodiment.

The gas then moves through the wall-portion inner space 556 toward the other end portion 500B of the developer accumulation unit 500 (refer to FIG. 10).

The gas then moves as indicated by the arrows 10E in FIG. 10 toward the one-direction flow path 541.

The gas next moves along the wall portion 519 as indicated by the arrows 10F toward the openings 505 formed in the wall portion 519. The gas then moves to the outside of the supplying device 70 through the openings 505.

As illustrated in FIG. 11, the filled section 511 described above is provided at the one end portion 500A of the developer accumulation unit 500.

Further, the central transport member 526 extending through the filled section 511 is provided. The central transport member 526 is provided at a central portion of the lower-side container 518 in a transverse direction of the lower-side container 518.

The central transport member 526 is disposed between the one-direction transport member 521 and the opposite-direction transport member 522. The central transport member 526 is also provided in a form extending in the longitudinal direction of the lower-side container 518.

In addition, a driving source (not illustrated), such as a motor, that drives the central transport member 526 is provided.

The central transport member 526 includes the rod-shaped rotary shaft 526A and the protrusion 526B.

The protrusion 526B is disposed around the rotary shaft 526A and is provided in a helical form. The protrusion 526B is also provided in a form protruding from the outer peripheral surface of the rotary shaft 526A.

The central transport member 526 is rotated about the rotary shaft 526A by the driving source in the present exemplary embodiment. Consequently, a developer is extruded by the protrusion 526B, and the developer moves in an axial direction of the central transport member 526.

The developer in the one-end-portion-side connection flow path 543 is delivered to the filled section 511 by the central transport member 526 in the present exemplary embodiment.

The developer that has been transported by the one-direction transport member 521 accumulates at the one-end-portion-side connection flow path 543.

A space 94 (hereinafter referred to as "before filled space 94") is provided between the filled section 511 and the one-end-portion-side wall portion 552.

The one-end-portion-side connection flow path 543 extends through the before filled space 94. The developer that has been transported by the one-direction transport member 521 accumulates in the before filled space 94.

The developer that accumulates in the before filled space 94 is pushed into the filled section 511 by the central transport member 526 in the present exemplary embodiment.

Consequently, with the filled section 511 being filled with the developer, the developer is supplied toward the downstream side.

The developer that has passed through the filled section 511 moves toward the lateral flow path 513 (refer to FIG. 9B) located on the downstream side of the filled section 511. The developer then moves along the vertical flow path 514 toward the developing device 14.

As illustrated in FIG. 10, the central transport member 526 is provided to extend from one end portion to another end portion of the lower-side container 518 in the longitudinal direction.

The central transport member 526 is provided in a form extending through the inside of the annular wall portion 550. In other words, the central transport member 526 is provided in a form in which part of the central transport member 526 is located in the wall-portion inner space 556.

As illustrated in FIG. 11, the one-end-portion-side wall portion 552 of the annular wall portion 550 has a groove 552A. The central transport member 526 extends through the groove 552A.

The one-end-portion-side wall portion 552 may suppress entrance of a developer with respect to the wall-portion inner space 556. Specifically, entrance of the developer in the before filled space 94 with respect to the wall-portion inner space 556 may be suppressed.

As illustrated in FIG. 10, the other-end-portion-side wall portion 553 of the annular wall portion 550 has an opening 553A. The central transport member 526 is provided in a form extending through the opening 553A.

The other-end-portion-side wall portion 553 may suppress entrance of a developer with respect to the wall-portion inner space 556 in the present exemplary embodiment. Specifically, entrance of the developer in the other-end-portion-side connection flow path 544 with respect to the wall-portion inner space 556 may be suppressed.

Figure 12:
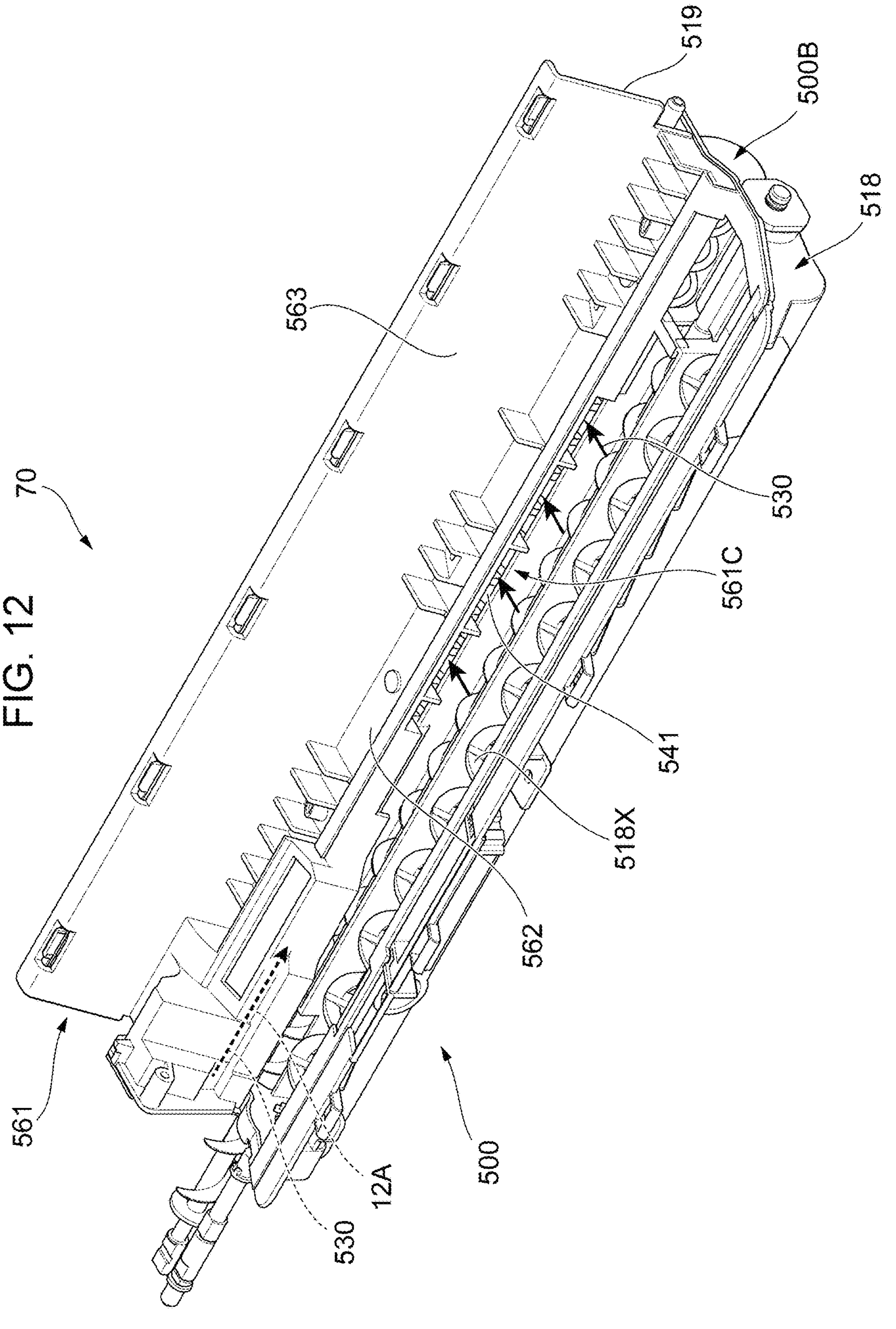
FIG. 12 illustrates a state in which an upper-side member is mounted on a lower-side container.

FIG. 12 illustrates a state in which an upper-side member 561 is mounted on the lower-side container 518.

In the supplying device 70, the upper-side member 561 is mounted on the lower-side container 518.

The upper-side member 561 includes a closing portion 562. The closing portion 562 is provided in a form extending horizontally. The closing portion 562 closes part of an opening 518X located at an upper portion of the lower-side container 518.

The upper-side member 561 further includes a wall portion 563.

The wall portion 563 is connected to the closing portion 562. The wall portion 563 is provided in a form extending upward from the closing portion 562.

The wall portion 563 is provided in a form facing the wall portion 519 provided at the lower-side container 518. A gap for passage of a gas is provided between the wall portion 563 and the wall portion 519.

In other words, a space (described later) for passage of a gas is provided between the wall portion 563 and the wall portion 519.

A gas passes through the opening 507 provided in the one end portion 500A of the developer accumulation unit 500 (refer to FIG. 11).

The gas that has passed through the opening 507 moves as indicated by the arrow 12A in FIG. 12.

The gas that has passed through the opening 507 passes through the gap between the lower-side container 518 and the upper-side member 561 as indicated by the arrow 12A. The gas further moves toward the other end portion 500B of the developer accumulation unit 500.

The gas flow path 530 (refer to FIG. 11) is provided between the lower-side container 518 and the upper-side member 561 (not illustrated in FIG. 11).

The gas that has passed through the opening 507 passes along the gas flow path 530 located between the lower-side container 518 and the upper-side member 561. The gas then moves as indicated by the arrow 12A in FIG. 12 toward the other end portion 500B of the developer accumulation unit 500.

The gas then enters the wall-portion inner space 556 as indicated by the arrow 11A in FIG. 11. The gas then moves toward the other end portion 500B (refer to FIG. 12) of the developer accumulation unit 500 through the wall-portion inner space 556.

The gas then moves toward the one-direction flow path 541 through a concave portion 561C provided on the lower surface of the upper-side member 561 (refer to FIG. 12).

The gas then passes above the one-direction flow path 541 and moves to the space located between the wall portion 563 and the wall portion 519.

The gas then moves upward through the space. The gas next moves to the outside of the supplying device 70 through the openings 505 (refer to FIG. 10) formed in the wall portion 519.

Figure 13:
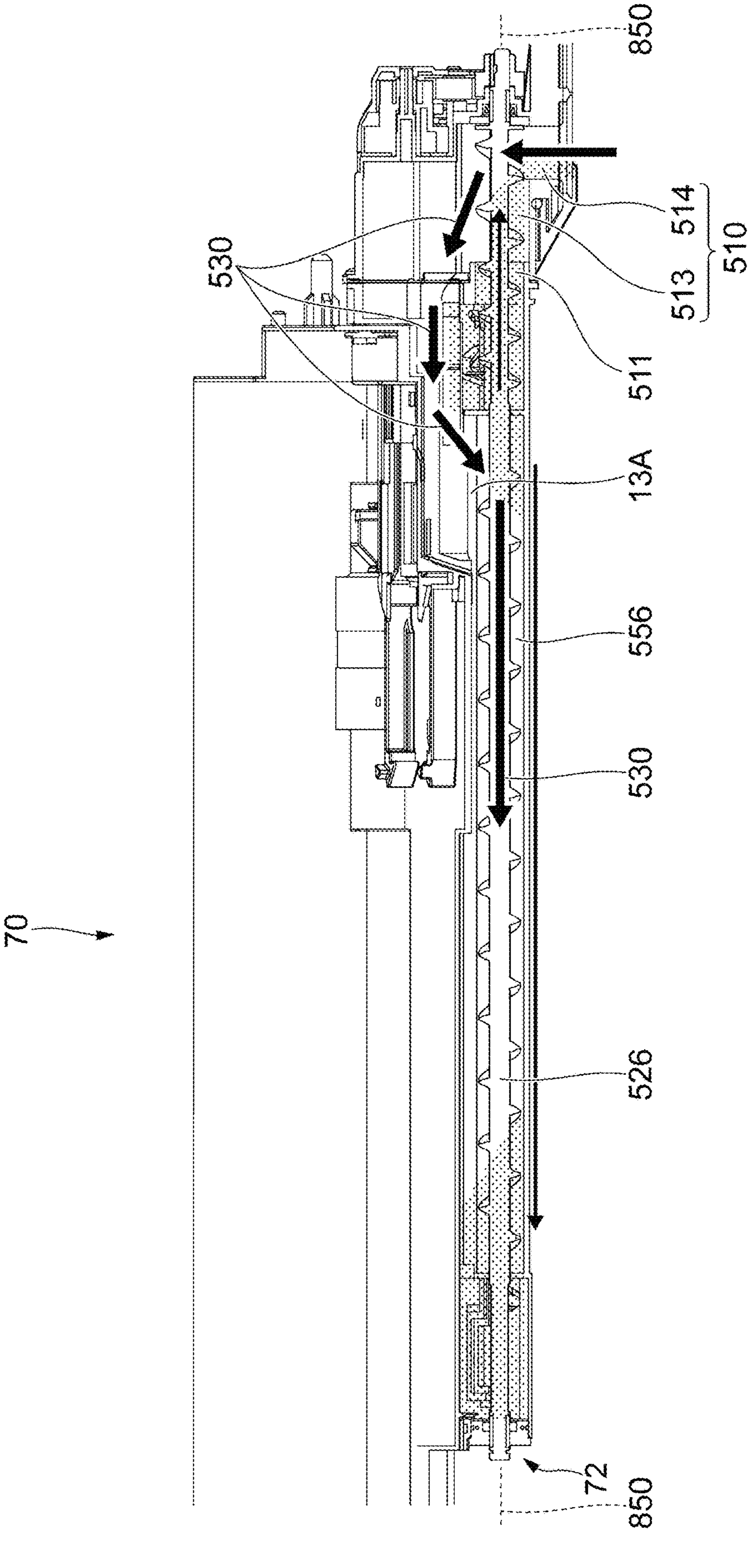
FIG. 13 is a sectional view of the supplying device along the line XIII-XIII in FIG. 7.

FIG. 13 is a sectional view of the supplying device 70 along the line XIII-XIII in FIG. 7. In FIG. 13, the developer storage container 80 illustrated in FIG. 7 is not illustrated.

With reference to FIG. 13, a flow of a gas in the supplying device 70 is further described.

The gas from the developing device 14 (not illustrated in FIG. 13) first enters the supplying device 70 in the present exemplary embodiment. The gas then moves upward along the vertical flow path 514 that constitutes part of the developer flow path 510.

The gas then moves along the gas flow path 530, which is provided in a form branching from the developer flow path 510, toward the other end portion 72 of the supplying device 70.

The gas flow path 530 is connected again at a portion indicated by the sign 13A to the internal space of the supplying device 70.

The wall-portion inner space 556 located on the inner side of the annular wall portion 550 (not illustrated in FIG. 13) is present below the portion indicated by the sign 13A.

The gas flow path 530 is connected at the portion indicated by the sign 13A to the wall-portion inner space 556 located on the inner side of the annular wall portion 550. The wall-portion inner space 556 is a space located inside the supplying device 70.

The gas flow path 530 then extends through the wall-portion inner space 556.

The wall-portion inner space 556 is a space that is not located on the developer flow path 510. The wall-portion inner space 556 is a space that is located at a portion away from the developer flow path 510.

The gas flow path 530 is connected, in the internal space of the supplying device 70, to the wall-portion inner space 556 that is a section that is not the developer flow path 510. The gas flow path 530 then extends through the wall-portion inner space 556.

The wall-portion inner space 556 can be regarded as a non-flow-path section, which is a section that is not the developer flow path 510.

In the supplying device 70, the gas flow path 530 is connected to the non-flow-path section, which is a section that is not the developer flow path 510. Then, the gas flow path 530 extends through the non-flow-path section.

As illustrated in FIG. 10, the circulation flow path 590 is provided as part of the developer flow path 510 in the present exemplary embodiment.

It can be said that the gas flow path 530 is connected to a surrounded space in the present exemplary embodiment. The gas flow path 530 extends through the surrounded space in the present exemplary embodiment.

The "surrounded space" denotes a space that is included in the internal space of the supplying device 70 and that is surrounded by the circulation flow path 590. The wall-portion inner space 556 corresponds to the surrounded space in the present exemplary embodiment.

The gas flow path 530 is connected to the wall-portion inner space 556, which is an internal space of the supplying device 70.

The circulation flow path 590 is disposed on an imaginary plane 850 (refer to FIG. 13) extending in the intersecting direction intersecting the vertical direction.

As indicated by the arrow 11A in FIG. 11, the gas flow path 530 is connected to the wall-portion inner space 556 from the upper side of the wall-portion inner space 556.

The gas that has entered the wall-portion inner space 556 moves in the longitudinal direction of the wall-portion inner space 556.

The gas flow path 530 extends through the wall-portion inner space 556. The gas flow path 530 is provided in a form extending in the longitudinal direction of the wall-portion inner space 556. Therefore, the gas that has entered the wall-portion inner space 556 moves in the longitudinal direction of the wall-portion inner space 556.

After extending through the wall-portion inner space 556, the gas flow path 530 extends toward the concave portion 561C (refer to FIG. 12). A gas that passes along the gas flow path 530 moves toward the concave portion 561C.

The gas flow path 530 then extends toward the openings 505 (refer to FIG. 10) via an upper portion of the one-direction flow path 541. After extending through the upper portion of the one-direction flow path 541, the gas flow path 530 extends between the wall portion 563 and the wall portion 519 toward the openings 505.

The gas in the wall-portion inner space 556 reaches the upper portion of the one-direction flow path 541 via the concave portion 561C (refer to FIG. 12). The gas then reaches the openings 505 formed in the wall portion 519 (refer to FIG. 10). The gas then moves to the outside of the supplying device 70 through the openings 505.

Figure 14:
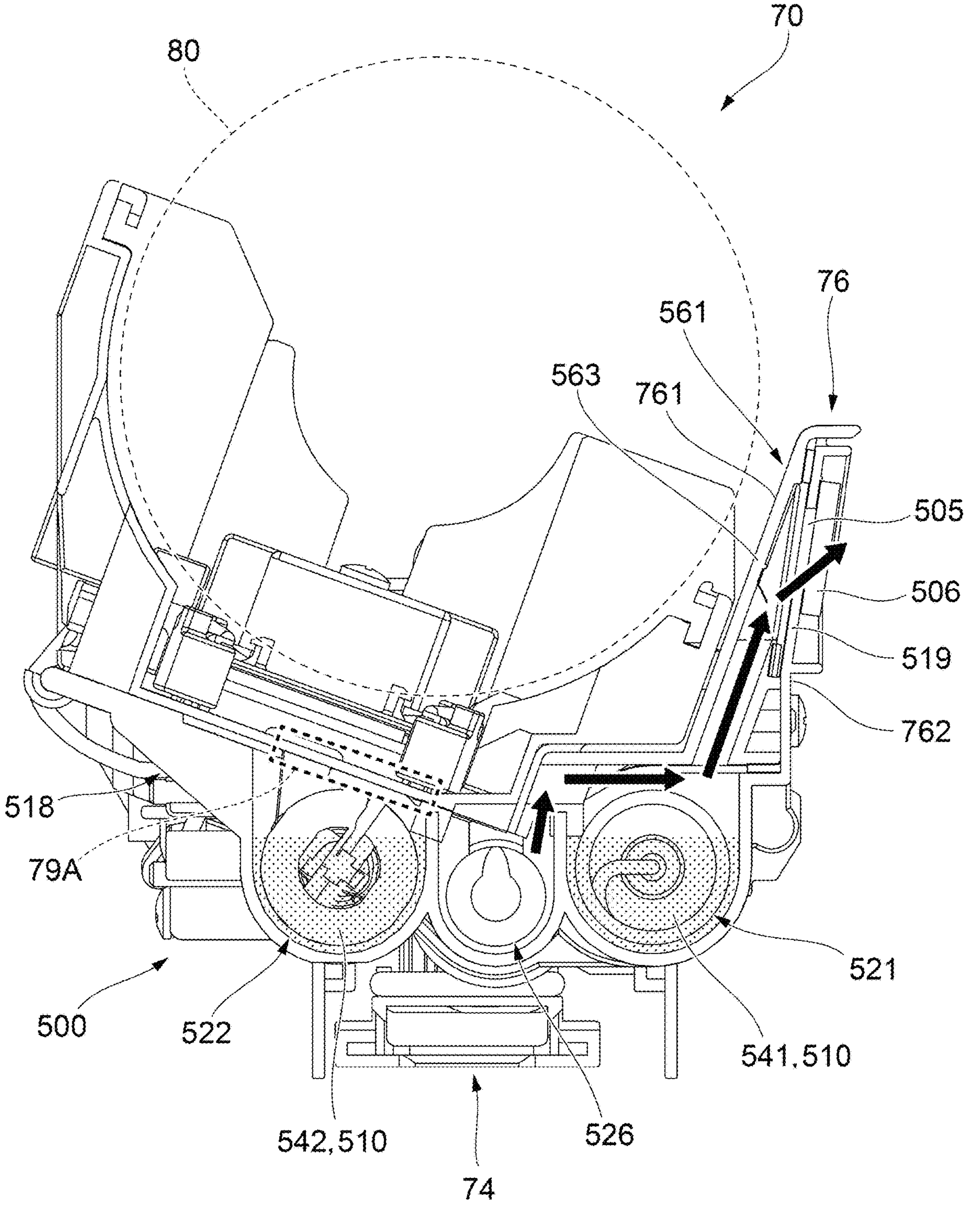
FIG. 14 is a sectional view of a supplying device at a surface orthogonal to a longitudinal direction of a developer storage container.

FIG. 14 is a sectional view of the supplying device 70 at a surface orthogonal to the longitudinal direction of the developer storage container 80. In FIG. 14, the developer storage container 80 is illustrated by a broken line.

The supplying device 70 is provided with a protrusion 76 extending obliquely upward and whose inside is hollow. The openings 505 are provided in the protrusion 76 in the present exemplary embodiment.

The wall portion 519 is provided at the lower-side container 518 in the present exemplary embodiment. In addition, the wall portion 563 is provided at the upper-side member 561.

The wall portion 519 and the wall portion 563 constitute the protrusion 76 in the present exemplary embodiment. The wall portion 563 and the wall portion 519 protrude upward. The wall portion 563 and the wall portion 519 are disposed to face each other.

Part of the protrusion 76 extending upward is located next to the developer storage container 80 in the present exemplary embodiment.

The protrusion 76 has a facing surface 761 that faces the developer storage container 80. The protrusion 76 also has an opposite surface 762 located opposite to the facing surface 761.

Among multiple surfaces of the protrusion 76, the opposite surface 762 has the openings 505. The openings 505 are provided in a form directed to a side opposite to the side where the developer storage container 80 is installed.

In this case, a gas may be discharged smoothly through the openings 505, compared with a case where the openings 505 are directed to the side where the developer storage container 80 is installed.

As described above, the filter 506 is installed at a position facing the openings 505.

The supplying device 70 has a reception port 79A through which a developer from the developer storage container 80 is received. The supplying device 70 also has the discharge port 74 used for discharge of a developer.

The openings 505 provided in the protrusion 76 are provided above the reception port 79A. Further, the openings 505 are provided above the discharge port 74 provided below the reception port 79A.

The openings 505 are each provided at a portion away from the developer flow path 510. The developer flow path 510 is provided in the developer accumulation unit 500. The openings 505 are each provided, in the developer accumulation unit 500, at a portion away from the developer flow path 510.

The filled section 511 (not illustrated in FIG. 14) also constitutes part of the developer flow path 510. In addition, a portion located on the downstream side of the filled section 511 in the movement direction of the developer also constitutes part of the developer flow path 510.

The openings 505 are each provided at a portion away from the developer flow path 510.

The openings 505 are provided above an uppermost portion of the developer flow path 510.

The one-direction flow path 541 is included in the uppermost portion of the developer flow path 510 in the present exemplary embodiment. The opposite-direction flow path 542 is also included in the uppermost portion of the developer flow path 510. The filled section 511 (not illustrated in FIG. 14) is also included in the uppermost portion of the developer flow path 510. In addition, the lateral flow path 513 (not illustrated in FIG. 14) is also included in the uppermost portion of the developer flow path 510.

The openings 505 are located above the uppermost portion of the developer flow path 510.

The openings 505 provided in the protrusion 76 are openings through which the inside and the outside of the supplying device 70 are in communicate with each other.

The supplying device 70 is provided with the openings 505 separately from the reception port 79A and the discharge port 74. A gas that has flowed from the developing device 14 is discharged to the outside of the supplying device 70 through the openings 505.

Figure 15:
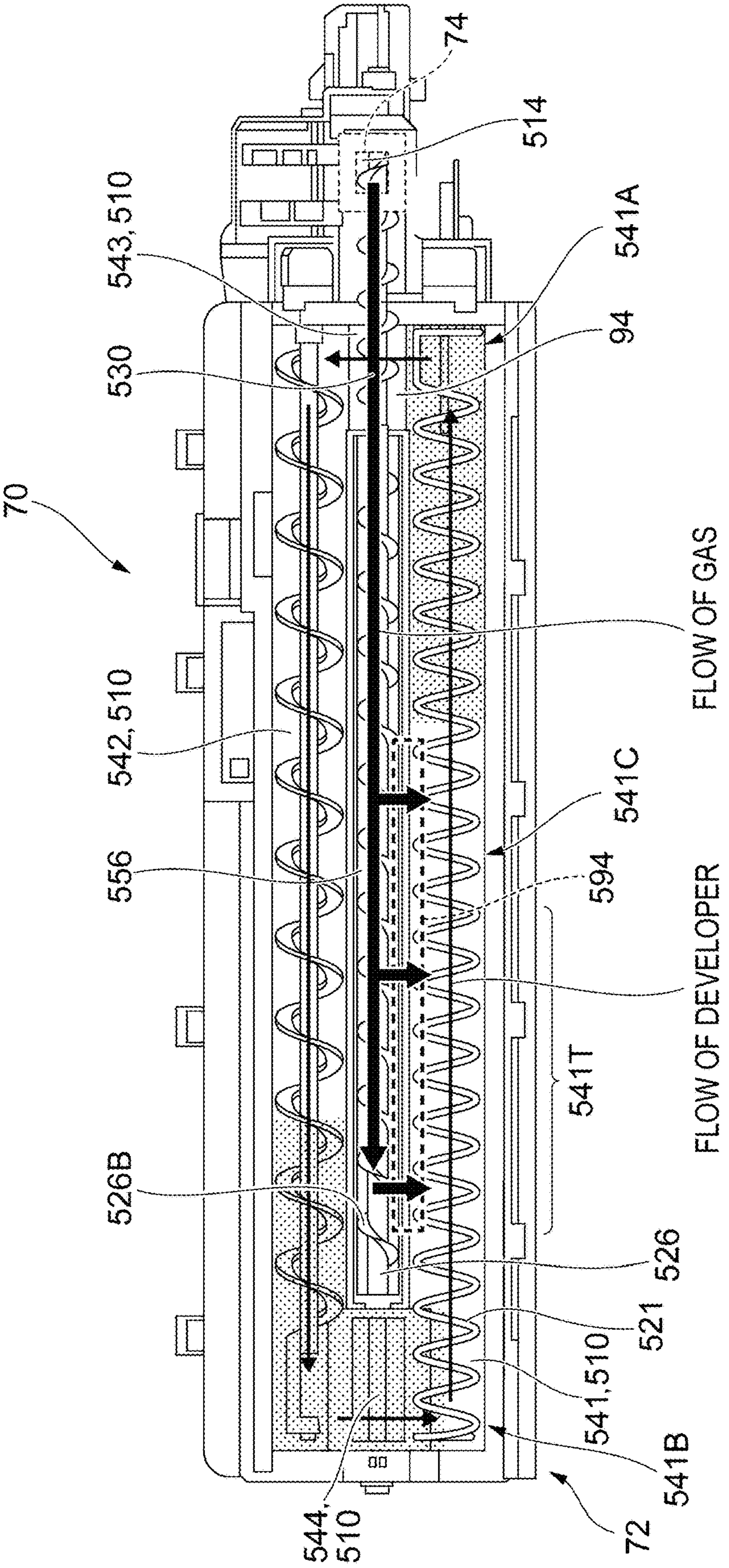
FIG. 15 illustrates a flow of a gas in a top view of a supplying device.

FIG. 15 illustrates a flow of a gas in a top view of the supplying device 70. In FIG. 15, the upper-side member 561 and the like are not illustrated.

A gas that has flowed from the developing device 14 enters the inside of the supplying device 70 through the discharge port 74 provided in the supplying device 70. The gas that has entered the inside of the supplying device 70 enters the gas flow path 530 via the vertical flow path 514.

The gas then moves along the gas flow path 530 toward the wall-portion inner space 556. The gas then moves toward the other end portion 72 of the supplying device 70 through the wall-portion inner space 556.

The gas flow path 530 is provided in a form extending through the wall-portion inner space 556. Therefore, the gas moves toward the other end portion 72 of the supplying device 70 through the inside of the wall-portion inner space 556.

Transport of a developer is not performed in the wall-portion inner space 556. Therefore, the amount of the developer in the wall-portion inner space 556 is small.

The gas next moves from the wall-portion inner space 556 toward the one-direction flow path 541. Specifically, the gas moves toward a portion of the one-direction flow path 541 other than the one end portion 541A.

The gas that moves toward the one-direction flow path 541 moves toward a portion of the one-direction flow path 541 located on the upstream side of the one end portion 541A. The "upstream side" denotes the upstream side in the movement direction of the developer in the one-direction flow path 541.

As illustrated in FIG. 12, the lower surface of the upper-side member 561 has the concave portion 561C in the present exemplary embodiment.

As illustrated in FIG. 15, a connection flow path 594 that constitutes part of the gas flow path 530 is provided at a portion where the concave portion 561C is provided. The connection flow path 594 is a flow path that connects the wall-portion inner space 556 and the one-direction flow path 541 to each other.

As illustrated in FIG. 15, the connection flow path 594 is connected to a central portion 541C of the one-direction flow path 541 in the longitudinal direction.

As illustrated in FIG. 15, the connection flow path 594 is also connected to an other-end-portion-side section 541T of the one-direction flow path 541. The other-end-portion-side section 541T is a portion that is located closer than the central portion 541C to the other end portion 541B.

Therefore, a gas that has passed through the inside of the wall-portion inner space 556 moves toward the central portion 541C to move toward the one-direction flow path 541. A gas that has passed through the inside of the wall-portion inner space 556 also moves toward the other-end-portion-side section 541T to move toward the one-direction flow path 541.

The gas then moves toward the openings 505 provided in the protrusion 76 through an internal space of the protrusion 76 (refer to FIG. 14).

A developer that has been transported by the one-direction transport member 521 accumulates at the one end portion 541A of the one-direction flow path 541 (refer to FIG. 15). As a result, the height of the upper surface of the developer is increased at the one end portion 541A.

A form in which the gas in the wall-portion inner space 556 is caused to pass above the one end portion 541A toward the openings 505 may be also conceivable. Meanwhile, a gas does not smoothly pass above the one end portion 541A in this case.

In contrast, a gas may flow smoothly when the gas passes above the central portion 541C or above the other-end-portion-side section 541T. In this case, the gas passes a portion where the height of the upper surface of the developer is low, and the gas may flow smoothly.

The central transport member 526 is also provided in the wall-portion inner space 556.

The central transport member 526, as one example of a movement member, moves a developer that accumulates in the wall-portion inner space 556.

A gas that passes along the gas flow path 530 is supplied to the inside of the wall-portion inner space 556. In this case, a developer contained in the gas accumulates in the wall-portion inner space 556.

The developer that accumulates in the wall-portion inner space 556 is transported to the before filled space 94 by the central transport member 526. The developer in the wall-portion inner space 556 is discharged from the wall-portion inner space 556.

The central transport member 526 transports the developer in the wall-portion inner space 556 toward the before filled space 94 located on the developer flow path 510.

The one-end-portion-side wall portion 552 (refer to FIG. 11) is provided at one end portion of the wall-portion inner space 556 in the longitudinal direction. The one-end-portion-side wall portion 552 has the groove 552A.

A developer transported by the central transport member 526 moves to the before filled space 94 through the groove 552A.

The developer in the wall-portion inner space 556 may be transported toward the side where the other-end-portion-side wall portion 553 illustrated in FIG. 10 is provided. In this case, the developer moves to the other-end-portion-side connection flow path 544 through the opening 553A provided in the other-end-portion-side wall portion 553.

The other developer in the wall-portion inner space 556 may be transported toward both of the one-end-portion-side wall portion 552 and the other-end-portion-side wall portion 553.

In this case, the central transport member 526 is provided with two types of the protrusions 526B that differ from each other in terms of turning directions.

The two types of the protrusions 526B will be described.

When the two types of the protrusions 526B are to be provided, one type of the protrusion 526B is first provided. The one type of the protrusion 526B is a protrusion that extends clockwise while extending in the axial direction of the central transport member 526 and in one direction.

Then, the other type of the protrusion 526B is provided. The other type of the protrusion 526B is a protrusion that extends counterclockwise while extending in the axial direction of the central transport member 526 and in one direction.

The one type of the protrusion 526B is provided on the side of the other-end-portion-side wall portion 553. The other type of the protrusion 526B is provided on the side of the one-end-portion-side wall portion 552 (refer to FIG. 11).

In this case, a developer is moved by the other type of the protrusion 526B toward the one-end-portion-side wall portion 552 (refer to FIG. 11).

A developer located at a portion where the other type of the protrusion 526B is provided moves toward the one-end-portion-side wall portion 552. The developer then moves to the developer flow path 510.

A developer is moved by the one type of the protrusion 526B toward the other-end-portion-side wall portion 553 (refer to FIG. 10). A developer located at a portion where the one type of the protrusion 526B is provided moves toward the other-end-portion-side wall portion 553. The developer then moves to the developer flow path 510.

The central transport member 526, as one example of a movement member, moves a developer in the wall-portion inner space 556 to the developer flow path 510. In other words, the central transport member 526 moves a developer in the gas flow path 530 to the developer flow path 510.

As illustrated in FIG. 13, the gas flow path 530 is connected after extending above the filled section 511 to the wall-portion inner space 556. The gas flow path 530 then extends through the inside of the wall-portion inner space 556.

In this case, a gas that contains a developer passes through the wall-portion inner space 556, and the developer accumulates in the wall-portion inner space 556.

The developer that accumulates in the wall-portion inner space 556 is moved by the central transport member 526 to the developer flow path 510.

The central transport member 526 is disposed not only in the developer flow path 510 but also in the gas flow path 530. Consequently, a developer in the gas flow path 530 is also moved.

As illustrated in FIG. 11, part of the central transport member 526 is provided in the one-end-portion-side connection flow path 543 that constitutes part of the developer flow path 510.

In other words, part of the central transport member 526 is provided in the before filled space 94 located on the developer flow path 510.

The developer in the developer flow path 510 is also moved by the part of the central transport member 526 in the present exemplary embodiment.

The central transport member 526 is provided to extend from the wall-portion inner space 556 to the developer flow path 510. The central transport member 526 is disposed in a form extending to the developer flow path 510.

The developer in the developer flow path 510 is moved by the central transport member 526 in the present exemplary embodiment. The central transport member 526 moves the developer in the developer flow path 510 toward the filled section 511.

Developers located at two locations are moved by the single central transport member 526 in the present exemplary embodiment.

The single central transport member 526 moves the developer in the wall-portion inner space 556 in the present exemplary embodiment. The single central transport member 526 also moves the developer in the before filled space 94.

The form of moving the developers is, however, not limited thereto.

For example, a dedicated movement member for moving the developer in the wall-portion inner space 556 may be provided. Then, separately from this movement member, another dedicated movement member for moving the developer in the before filled space 94 may be provided.

As illustrated in FIG. 10, the annular circulation flow path 590 is provided as part of the developer flow path 510 in the present exemplary embodiment.

The gas flow path 530 extends through, in the internal space of the supplying device 70, the surrounded space, which is the space surrounded by the circulation flow path 590. As described above, the wall-portion inner space 556 corresponds to the surrounded space.

The gas flow path 530 extends through a portion where the wall-portion inner space 556 is provided. The central transport member 526 is provided in the wall-portion inner space 556, as one example of the surrounded space, in the present exemplary embodiment.

The central transport member 526 will be further described with reference to FIG. 9B.

The central transport member 526 is provided with a cylindrical-portion inside portion 526E located inside the cylindrical portion 512. The central transport member 526 is also provided with an outside section 526F located outside the cylindrical portion 512.

The outside section 526F is located on the downstream side of the cylindrical-portion inside portion 526E in the transport direction of the developer. The outside section 526F is located in the lateral flow path 513 that constitutes part of the developer flow path 510.

The developer transporting capacity of the outside section 526F is larger than the developer transporting capacity of the cylindrical-portion inside portion 526E in the present exemplary embodiment.

An upstream-side transport portion that transports a developer toward the side where the vertical flow path 514 is located is provided in the filled section 511. The cylindrical-portion inside portion 526E corresponds to the upstream-side transport portion in the present exemplary embodiment.

In addition, a downstream-side transport portion that transports, toward the vertical flow path 514, a developer that has passed through the filled section 511 is provided on the downstream side of the filled section 511. The outside section 526F corresponds to the downstream-side transport portion in the present exemplary embodiment.

The developer transporting capacity of the outside section 526F is larger than the developer transporting capacity of the cylindrical-portion inside portion 526E in the present exemplary embodiment.

In other words, the developer transporting capacity of the downstream-side transport portion is larger than the developer transporting capacity of the upstream-side transport portion in the present exemplary embodiment.

The cylindrical-portion inside portion 526E that functions as the upstream-side transport portion is provided with the protrusion 526B. The outside section 526F that functions as the downstream-side transport portion is also provided with the protrusion 526B.

Hereinafter, the protrusion 526B provided at the cylindrical-portion inside portion 526E is referred to as "inside protrusion". In addition, the protrusion 526B provided at the outside section 526F is referred to as "outside protrusion".

In comparison of the outer diameters of the protrusions 526B, the outer diameter of the outside protrusion is larger than the outer diameter of the inside protrusion in the present exemplary embodiment.

Each of the cylindrical-portion inside portion 526E and the outside section 526F is provided with the rotary shaft 526A extending along the developer flow path 510.

Each of the cylindrical-portion inside portion 526E and the outside section 526F is further provided with an extrusion portion that extrudes a developer.

The extrusion portion provided at the cylindrical-portion inside portion 526E is constituted by the inside protrusion. The extrusion portion provided at the outside section 526F is constituted by the outside protrusion.

Each of the extrusion portions is provided around the rotary shaft 526A and in a helical form.

Each of the cylindrical-portion inside portion 526E and the outside section 526F extrudes a developer by using the protrusion 526B, as one example of the extrusion portion. The extrusion transports the developer.

Here, the size of an arrangement pitch of the inside protrusion provided at the cylindrical-portion inside portion 526E is referred to as an arrangement pitch P1. The size of an arrangement pitch of the outside protrusion provided at the outside section 526F is referred to as an arrangement pitch P2.

In the present specification, the "arrangement pitch" denotes a distance between protrusions adjacent to each other.

The arrangement pitch P2 is larger than the arrangement pitch P1 in the present exemplary embodiment. Specifically, the arrangement pitch P2 is more than or equal to 1.1 times the arrangement pitch P1 in the present exemplary embodiment.

Two inside protrusions adjacent to each other are not provided at the cylindrical-portion inside portion 526E in the present exemplary embodiment.

In this case, the arrangement pitch P1 is obtained by using the protrusion 526B located next to and on the upstream side of one inside protrusion located in the cylindrical-portion inside portion 526E.

In this case, a distance between the one inside protrusion and the protrusion 526B located next to and on the upstream side of the one inside protrusion is considered as the arrangement pitch P1.

The arrangement pitch P2 is larger than the arrangement pitch P1 in the present exemplary embodiment.

In this case, the developer transport speed in the lateral flow path 513 is higher than the developer transport speed in the cylindrical portion 512.

Here, the developer transport speed in the cylindrical portion 512 is referred to as "internal transport speed". In addition, the developer transport speed in the lateral flow path 513 is referred to as "external transport speed". The external transport speed is higher than the internal transport speed in the present exemplary embodiment.

The height of the upper surface of the developer located in the cylindrical portion 512 is referred to as "internal height". The height of the upper surface of the developer located in the lateral flow path 513 is referred to as "external height".

The external height is smaller than the internal height in the present exemplary embodiment.

When the external transport speed is higher than the internal transport speed, as in the present exemplary embodiment, the external height is smaller than the internal height.

When the external height is smaller than the internal height, the height of the upper surface of the developer is smaller than that in a case where the external height is not smaller than the internal height. Specifically, the height of the upper surface of the developer is small at a portion where the outside section 526F is provided.

In this case, it may be not easy for the developer located below the gas flow path 530 to enter the inside of the gas flow path 530. In this case, the cross-sectional area of the gas flow path 530 is increased.

In addition, when the external height is smaller than the internal height, a gas may smoothly flow along the vertical flow path 514 compared with that in a case where the external height is not smaller than the internal height.

When the external height is smaller than the internal height, an area occupied by the developer decreases compared with that in a case where the external height is not smaller than the internal height. Specifically, in a cross-section of the vertical flow path 514, the area occupied by the developer decreases.

In this case, the gas that moves upward along the vertical flow path 514 may flow smoothly.

A structure around the gas flow path 530 will be described further with reference to FIG. 9B.

The gas flow path 530 includes an upstream-side end portion 530C at a right end portion in FIG. 9B. The upstream-side end portion 530C is an end portion that is located on the most upstream side in the movement direction of a gas in the gas flow path 530.

The vertical flow path 514 includes an upstream-end end portion 514D and a downstream-side end portion 514C.

The position of the upstream-end end portion 514D and the position of the downstream-side end portion 514C differ from each other. The upstream-end end portion 514D and the downstream-side end portion 514C differ from each other in terms of positions in the movement direction of the gas in the gas flow path 530.

The upstream-end end portion 514D and the downstream-side end portion 514C differ from each other in terms of positions in the radial direction of the vertical flow path 514.

In the movement direction of the gas in the gas flow path 530, the upstream-side end portion 530C is located on the upstream side of the downstream-side end portion 514C.

Here, the position of the upstream-side end portion 530C of the gas flow path 530 and the position of the downstream-side end portion 514C of the vertical flow path 514 are compared.

The upstream-side end portion 530C is located on the upstream side of the downstream-side end portion 514C in the present exemplary embodiment. In the movement direction of the gas in the gas flow path 530, the upstream-side end portion 530C is located on the upstream side of the downstream-side end portion 514C.

In FIG. 9B, the movement direction of the gas in the gas flow path 530 is a direction from right to left in FIG. 9B.

When the upstream-side end portion 530C is located on the upstream side of the downstream-side end portion 514C, a gas may flow smoothly. A gas may smoothly flow compared with that in a case where the upstream-side end portion 530C is located on the downstream side of the downstream-side end portion 514C.

For example, it is assumed that the upstream-side end portion 530C of the gas flow path 530 is located at a portion indicated by the sign 9X. That is, it is assumed that the upstream-side end portion 530C is located on the downstream side of the downstream-side end portion 514C of the vertical flow path 514.

In this case, the flow path along which a gas flows is narrowed, and the gas does not flow smoothly.

In contrast, when the upstream-side end portion 530C is located on the upstream side of the downstream-side end portion 514C, the flow path along which a gas flows is widened. In this case, the gas may flow more smoothly.

One example in which the cylindrical-portion inside portion 526E and the outside section 526F are constituted by a single common member has been described above.

Specifically, one example in which the cylindrical-portion inside portion 526E and the outside section 526F are constituted by the single central transport member 526 has been described.

The cylindrical-portion inside portion 526E and the outside section 526F are, however, not limited thereto and may be individually provided. A member that serves as the cylindrical-portion inside portion 526E and a member that serves as the outside section 526F may be provided individually.

The size of the arrangement pitch P1 of the protrusion 526B provided at the cylindrical-portion inside portion 526E and a size 9L of an inlet portion 514E are compared. In other words, the size of the arrangement pitch P1 of the inside protrusion and the size 9L of the inlet portion 514E are compared.

The "inlet portion 514E" denotes an inlet portion of the vertical flow path 514. In addition, the "size 9L of the inlet portion 514E" denotes the size in the movement direction of the developer when the developer from the filled section 511 reaches the inlet portion 514E.

The size 9L of the inlet portion 514E is larger than the size of the arrangement pitch P1 of the inside protrusion in the present exemplary embodiment.

The size 9L of the inlet portion 514E is more than or equal to 1.1 times the size of the arrangement pitch P1 of the inside protrusion in the present exemplary embodiment.

A clearance between the downstream-side end portion 514C and the upstream-end end portion 514D coincides with the size 9L in the present exemplary embodiment.

As described above, the space 571 is present between the filled section 511 and the vertical flow path 514, as one example of a drop flow path. The space 571 is located between the filled section 511 and the vertical flow path 514 in the intersecting direction, which is a direction intersecting the vertical direction.

Both the developer and the gas pass through the space 571 in the present exemplary embodiment.

The developer that moves from the filled section 511 to the vertical flow path 514 passes through the space 571. In addition, the gas that moves from the vertical flow path 514 toward the filled section 511 passes through the space 571.

A cross-sectional area of the space 571, the cross-sectional area being at a plane 9H extending in the vertical direction, is referred to as a cross-sectional area S1.

The cross-sectional area S1 is larger than the cross-sectional area of the filled section 511. The cross-sectional area S1 of the space 571 also larger than the cross-sectional area of the vertical flow path 514.

In addition, the cross-sectional area S1 of the space 571 is larger than a total value of the cross-sectional area of the filled section 511 and the cross-sectional area of the vertical flow path 514.

Figure 16:
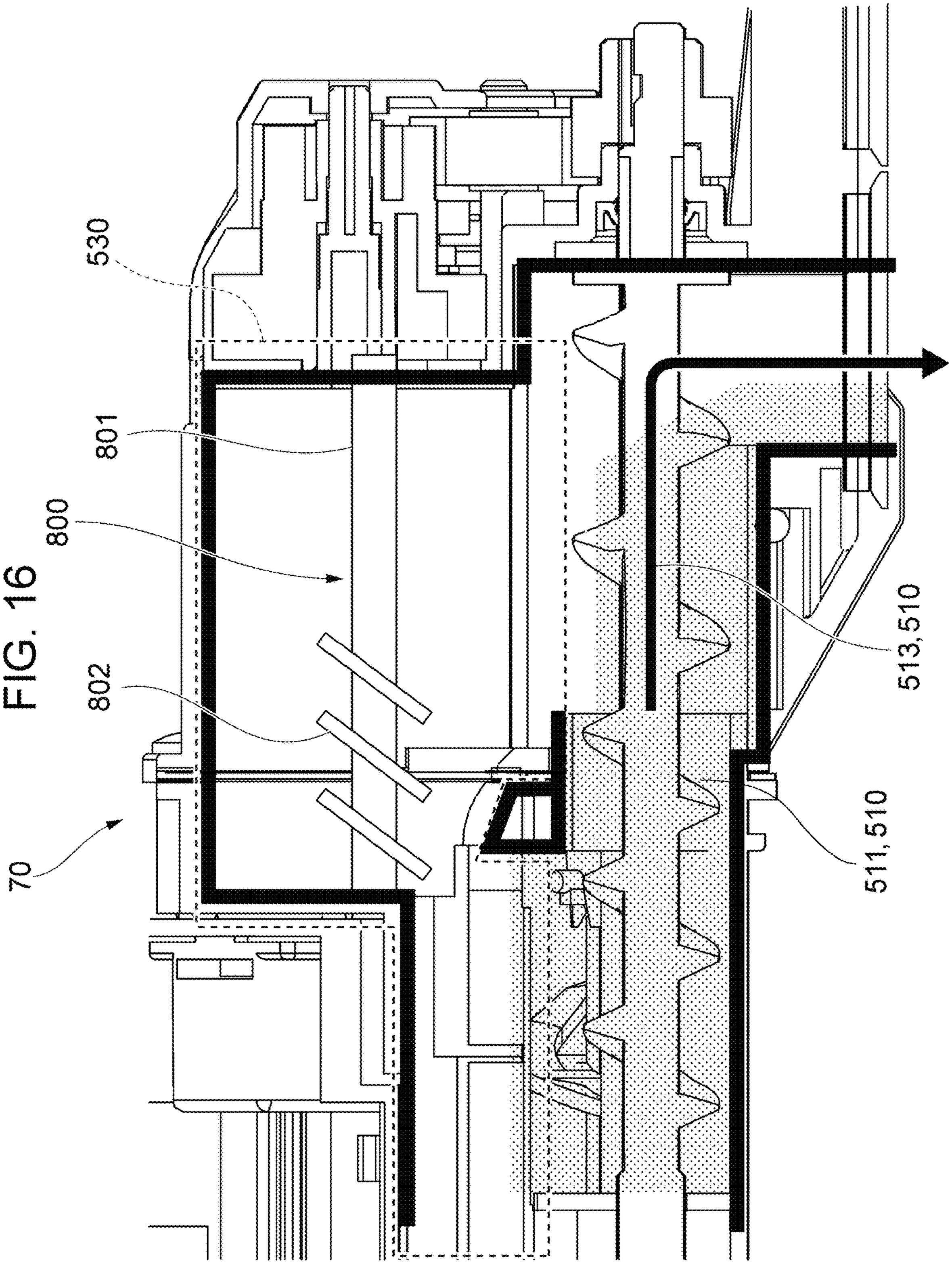
FIG. 16 illustrates another configuration example of a supplying device.

FIG. 16 illustrates another configuration example of the supplying device 70.

In the configuration example illustrated in FIG. 16, there is provided a movement member 800 that moves the developer that accumulates in the gas flow path 530.

As illustrated in FIG. 16, part of the gas flow path 530 is located above the filled section 511 and above the lateral flow path 513 in the present exemplary embodiment. The gas flow path 530 includes an upper portion that is a portion located above the filled section 511 and above the lateral flow path 513.

The movement member 800 moves the developer that accumulates in this upper portion of the gas flow path 530.

The movement member 800 is provided in this upper portion of the gas flow path 530.

The movement member 800 includes a rotary shaft 801 that is rotated by a driving source (not illustrated), such as a motor. The movement member 800 further includes a protrusion 802. The protrusion 802 protrudes from the outer peripheral surface of the rotary shaft 801 and is provided in a helical form.

The gas that passes through the upper portion of the gas flow path 530 contains a developer. Therefore, the developer accumulates at this upper portion of the gas flow path 530.

The movement member 800 rotates in the configuration example illustrated in FIG. 16. Consequently, the developer that accumulates at the upper portion of the gas flow path 530 moves rightward in FIG. 16. The developer that moves rightward in FIG. 16 drops downward and is supplied to the lateral flow path 513 located below.

The movement member 800 moves the developer in the upper portion to the lateral flow path 513 that constitutes part of the developer flow path 510.

The configuration of the one end portion 500A of the developer accumulation unit 500 will be described further with re-reference to FIG. 11.

A restriction portion 95 is provided above the one end portion 541A of the one-direction flow path 541. The restriction portion 95 is constituted by a plate-shaped member. The restriction portion 95 restricts the upward movement of the developer in the one-direction flow path 541.

A developer accumulates at the one end portion 541A of the one-direction flow path 541. As a result, the height of the upper surface of the developer increases in the one end portion 541A and in the before filled space 94.

In this case, the developer easily enters the gas flow path 530 located above the before filled space 94. In this case, there is a likelihood that a gas does not flow smoothly in the gas flow path 530.

In contrast, when the restriction portion 95 is provided, the upper surface of the developer in the before filled space 94 may be less likely to rise. In this case, entrance of the developer with respect to the inside of the gas flow path 530 may be suppressed. Consequently, the gas may flow along the gas flow path 530 smoothly.

The restriction portion 95 may be provided not only above the one end portion 541A of the one-direction flow path 541 but also above the before filled space 94. In this case, the gas flow path 530 is provided above the restriction portion 95.

Second Exemplary Embodiment

Figure 17:
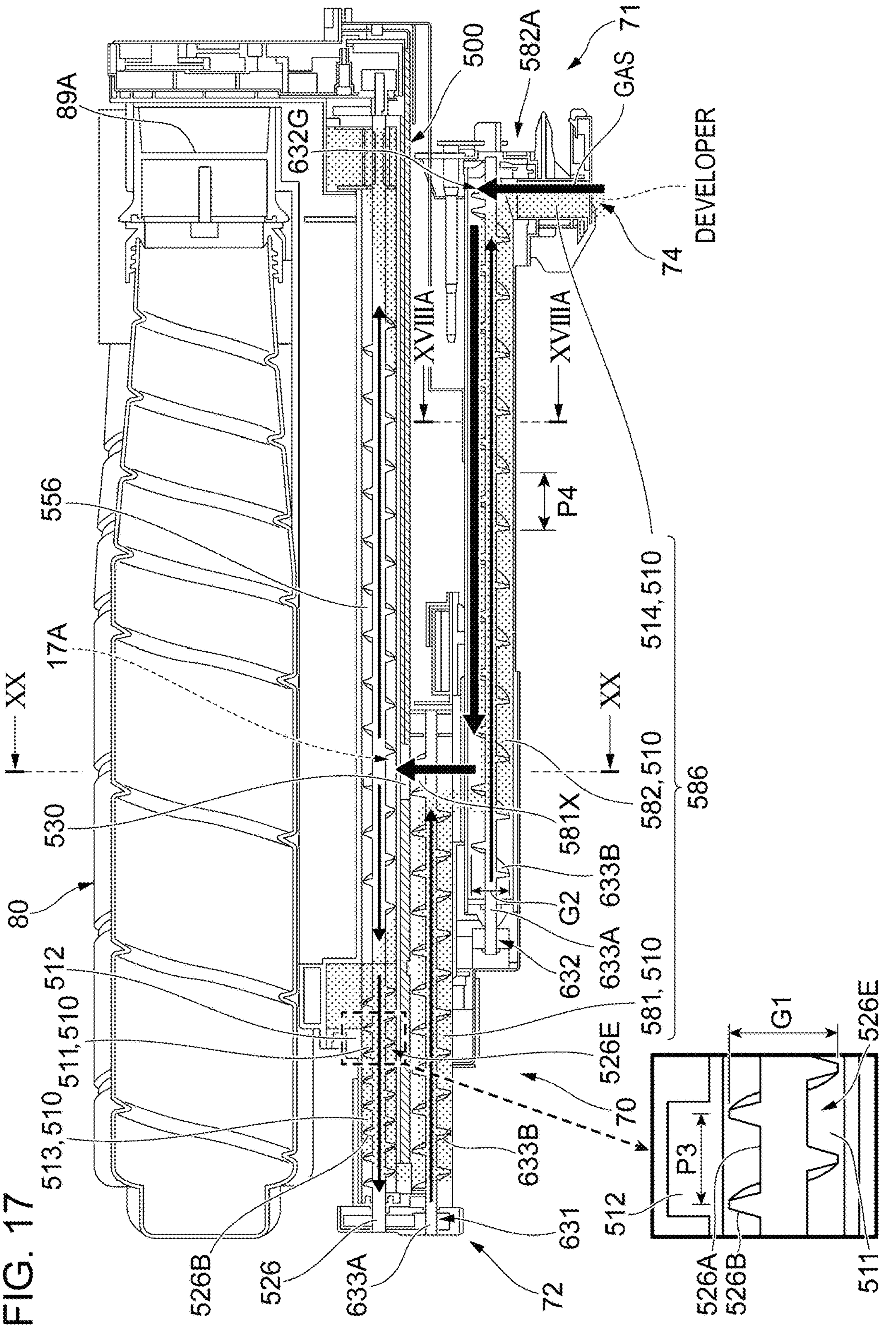
FIG. 17 is an explanatory view of a supplying device according to a second exemplary embodiment.

FIG. 17 is an explanatory view of the supplying device 70 according to a second exemplary embodiment.

Hereinafter, differences from the first exemplary embodiment, which is the exemplary embodiment illustrated in FIG. 7 to FIG. 16, will be described mainly.

In the supplying device 70 illustrated in FIG. 17, the filled section 511 is located on the side of the other end portion 72 of the supplying device 70. In other words, the filled section 511 is located on the front side of the image forming apparatus 100.

In the supplying device 70, an intermediate flow path 581 that constitutes part of the developer flow path 510 is further provided below the developer accumulation unit 500.

In addition, a lower-side flow path 582 that constitutes another part of the developer flow path 510 is provided below the intermediate flow path 581.

An intermediate transport member 631 that transports the developer in the intermediate flow path 581 is provided in the intermediate flow path 581. A lower-side transport member 632 that transports the developer in the lower-side flow path 582 is provided in the lower-side flow path 582.

Each of the intermediate transport member 631 and the lower-side transport member 632 includes a rotary shaft 633A. Each of the intermediate transport member 631 and the lower-side transport member 632 also includes a protrusion 633B.

The protrusion 633B protrudes from the outer peripheral surface of the rotary shaft 633A and is provided in a helical form. The protrusion 633B has a function as an extrusion portion that extrudes a developer.

The supplying device 70 is further provided with a driving source (not illustrated) for rotationally driving the intermediate transport member 631. In addition, a driving source (not illustrated) for rotationally driving the lower-side transport member 632 is provided.

A developer that has passed through the filled section 511 flows toward the lateral flow path 513 in the second exemplary embodiment. The developer then reaches the intermediate flow path 581 located below the developer accumulation unit 500. The developer then flows along the intermediate flow path 581 toward the lower-side flow path 582 located below the intermediate flow path 581.

The developer then flows along the lower-side flow path 582 toward one end portion 582A of the lower-side flow path 582.

The developer then flows along the vertical flow path 514, which extends downward from the one end portion 582A of the lower-side flow path 582, toward the discharge port 74.

The gas flow path 530 is provided at a portion indicated by the sign 17A in FIG. 17 in the second exemplary embodiment.

The gas flow path 530 is provided in a form branching from the developer flow path 510, as in the aforementioned exemplary embodiment.

Specifically, the gas flow path 530 is provided in a form branching from the intermediate flow path 581. The gas flow path 530 extends toward the developer accumulation unit 500 located above from a branch portion 581X branching from the intermediate flow path 581.

The gas flow path 530 is provided with a portion that extends in the vertical direction in the second exemplary embodiment. In other words, the gas flow path 530 is provided with a portion that extends vertically.

The gas flow path 530 may be disposed in a state of being inclined with respect to the vertical direction.

A gas enters the inside of the supplying device 70 through the discharge port 74 also in the second exemplary embodiment.

The gas then moves toward the upstream side in the movement direction of the developer through a downstream-side section 586 of the developer flow path 510.

The gas that has flowed to the supplying device 70 from the developing device 14 moves along the developer flow path 510 toward the upstream side in the movement direction of the developer.

Here, the "downstream-side section 586" denotes a section of the developer flow path 510 located on the downstream side of the filled section 511.

Here, a movement direction of the developer that moves along the developer flow path 510 is assumed.

The "downstream-side section 586" denotes a section located on the downstream side of the filled section 511 in this movement direction.

The downstream-side section 586 is constituted by the lateral flow path 513 and the intermediate flow path 581 in the second exemplary embodiment. The downstream-side section 586 is also constituted by the lower-side flow path 582 and the vertical flow path 514.

The gas that has entered the inside of the supplying device 70 through the discharge port 74 moves toward the upstream side in the movement direction of the developer. The gas moves toward the upstream side in the movement direction of the developer through the downstream-side section 586.

The gas then enters the gas flow path 530 provided in a form branching from the downstream-side section 586 and moves upward.

The gas flow path 530 is provided in a form branching from the intermediate flow path 581 that constitutes part of the downstream-side section 586. The gas enters the gas flow path 530 provided in a form branching from the intermediate flow path 581 and moves upward.

The gas then enters the wall-portion inner space 556 provided in the developer accumulation unit 500.

The gas flow path 530 is connected to the wall-portion inner space 556 from the bottom side of the wall-portion inner space 556, which is one example of the surrounded space. In other words, the gas flow path 530 enters the wall-portion inner space 556 from the bottom side.

The gas flow path 530 extends leftward in FIG. 17 after entering the wall-portion inner space 556. In addition, the gas flow path 530 extends rightward in FIG. 17 after entering the wall-portion inner space 556.

The developer transporting capacity in the downstream-side section 586 is larger than the developer transporting capacity in the filled section 511 in the second exemplary embodiment.

The filled section 511 is provided with the central transport member 526 extending through the filled section 511.

The developer transporting capacity of the intermediate transport member 631 is larger than the developer transporting capacity of the central transport member 526 in the second exemplary embodiment. In addition, the developer transporting capacity of the lower-side transport member 632 is larger than the developer transporting capacity of the central transport member 526.

Hereinafter, the protrusion 526B provided on a portion of the central transport member 526 located inside the filled section 511 is referred to as "inside protrusion".

The outside diameter of the protrusion 633B provided on the intermediate transport member 631 is larger than the outside diameter of the inside protrusion in the second exemplary embodiment. In addition, the outside diameter of the protrusion 633B provided on the lower-side transport member 632 is larger than the outside diameter of the inside protrusion.

Further, the arrangement pitch of the protrusion 633B provided on the intermediate transport member 631 is larger than the arrangement pitch of the inside protrusion. In addition, the arrangement pitch of the protrusion 633B provided on the lower-side transport member 632 is larger than the arrangement pitch of the inside protrusion.

Hereinafter, the moving speed of the developer that moves in the filled section 511 is referred to as "filled-section moving speed". In addition, the moving speed of the developer that moves in the downstream-side section 586 is referred to as "after-passage moving speed". The developer after passing through the filled section 511 moves at the after-passage moving speed in the downstream-side section 586.

In addition, the moving speed of the developer that moves along the intermediate flow path 581 is referred to as "intermediate-section moving speed" in the present specification. In addition, the moving speed of the developer that moves along the lower-side flow path 582 is referred to as "downstream-section moving speed".

The after-passage moving speed is higher than the filled-section moving speed in the second exemplary embodiment.

The intermediate-section moving speed is higher than the filled-section moving speed in the second exemplary embodiment. The downstream-section moving speed is higher than the filled-section moving speed.

Consequently, the height of the upper surface of the developer decreases in the downstream-side section 586 in the second exemplary embodiment. The gas that moves toward the upstream side through the downstream-side section 586 thus may flow smoothly. In a cross-section of the downstream-side section 586, a situation in which the entirety of the cross-section is filled with the developer may be avoided.

Further, the transporting capacity of the lower-side transport member 632 is larger than the transporting capacity of the intermediate transport member 631 in the second exemplary embodiment.

Here, the outside diameter of the protrusion 633B of the lower-side transport member 632 and the outside diameter of the protrusion 633B of the intermediate transport member 631 are compared.

The outside diameter of the protrusion 633B of the lower-side transport member 632 is larger than the outside diameter of the protrusion 633B of the intermediate transport member 631 in the second exemplary embodiment.

In addition, the arrangement pitch of the protrusion 633B of the lower-side transport member 632 and the arrangement pitch of the protrusion 633B of the intermediate transport member 631 are compared.

The arrangement pitch on the lower-side transport member 632 is larger than the arrangement pitch on the intermediate transport member 631 in the second exemplary embodiment.

In this case, the downstream-section moving speed is higher than the intermediate-section moving speed. In this case, the height of the upper surface of the developer further decreases in the lower-side flow path 582. In this case, the gas that passes along the lower-side flow path 582 toward the upstream side may flow more smoothly.

The moving speed of the developer that moves along the lower-side flow path 582 is higher than the moving speed of the developer that moves along the intermediate flow path 581 in the second exemplary embodiment. In addition, the moving speed of the developer that moves along the intermediate flow path 581 is higher than the moving speed of the developer that moves in the filled section 511.

Other than the above, the number of rotation of the intermediate transport member 631 and the number of rotation of the lower-side transport member 632 may be set to be larger than the number of rotation of the central transport member 526.

Further, the number of rotation of the lower-side transport member 632 may be set to be larger than the number of rotation of the intermediate transport member 631.

Both of following first setting and second setting may be performed.

First setting: The number of rotation of the lower-side transport member 632 is set to be larger than the number of rotation of the intermediate transport member 631.

Second setting: The number of rotation of the intermediate transport member 631 is set to be larger than the number of rotation of the central transport member 526.

The gas that has entered the inside of the supplying device 70 moves along the developer flow path 510 toward the upstream side in the movement direction of the developer in the second exemplary embodiment. The gas then enters the gas flow path 530 that branches from the developer flow path 510.

Specifically, the gas that has entered the inside of the supplying device 70 moves along the downstream-side section 586 toward the upstream side in the movement direction of the developer. The gas then enters the gas flow path 530 that branches from the downstream-side section 586.

The gas then, as in the aforementioned exemplary embodiment, passes through the wall-portion inner space 556 and an upper portion of the one-direction flow path 541 (not illustrated in FIG. 17). Further, the gas passes through the internal space of the protrusion 76 (not illustrated in FIG. 17). The gas then reaches the openings 505 (not illustrated in FIG. 17) and is discharged to the outside of the supplying device 70.

It can be said that the supplying device 70 is provided with a transport portion that transports the developer in the developer flow path 510 to the downstream side.

As part of the transport portion, the cylindrical-portion inside portion 526E, as one example of the upstream-side transport portion, is provided. As described above, the cylindrical-portion inside portion 526E denotes a portion of the central transport member 526 located in the cylindrical portion 512.

In addition, as another part of the transport portion, the lower-side transport member 632, as one example of the downstream-side transport portion, is provided.

The cylindrical-portion inside portion 526E is located on the upstream side in the transport direction of the developer. The lower-side transport member 632 is located on the downstream side of the cylindrical-portion inside portion 526E in the transport direction of the developer.

The developer transporting capacity of the cylindrical-portion inside portion 526E and the developer transporting capacity of the lower-side transport member 632 will be described.

Hereinafter, the speed of transport of a developer by the cylindrical-portion inside portion 526E is referred to as "upstream-side transport speed". In addition, the speed of transport of a developer by the lower-side transport member 632 is referred to as "downstream-side transport speed".

The developer transporting capacity of the lower-side transport member 632 is larger than the developer transporting capacity of the cylindrical-portion inside portion 526E in the present exemplary embodiment. In other words, the downstream-side transport speed is higher than the upstream-side transport speed in the present exemplary embodiment.

Each of the cylindrical-portion inside portion 526E and the lower-side transport member 632 rotates about a rotary shaft extending along the developer flow path 510 and thereby transports a developer.

The rotational speed of the lower-side transport member 632 is higher than the rotational speed of the cylindrical-portion inside portion 526E in the present exemplary embodiment. Consequently, the downstream-side transport speed is higher than the upstream-side transport speed in the present exemplary embodiment.

The cylindrical-portion inside portion 526E includes the rotary shaft 526A. The cylindrical-portion inside portion 526E includes, as a rotary shaft extending along the developer flow path 510, the rotary shaft 526A located in the filled section 511.

The rotary shaft 526A located in the filled section 511 is provided in a form extending along the filled section 511. In addition, the cylindrical-portion inside portion 526E includes the helical protrusion 526B provided around the rotary shaft 526A.

The cylindrical-portion inside portion 526E uses the protrusion 526B, as one example of the extrusion portion, to extrude a developer and transport the developer. The cylindrical-portion inside portion 526E uses the protrusion 526B to transport the developer in the filled section 511.

The lower-side transport member 632 also includes a rotary shaft extending along the developer flow path 510. Specifically, the lower-side transport member 632 includes the rotary shaft 633A extending along the lower-side flow path 582.

In addition, the lower-side transport member 632 includes the helical protrusion 633B provided around the rotary shaft 633A.

The lower-side transport member 632 also uses the protrusion 633B, as one example of the extrusion portion, to extrude a developer and transport the developer.

The arrangement pitch of the protrusion 526B of the cylindrical-portion inside portion 526E is referred to as an arrangement pitch P3.

In addition, the arrangement pitch of the protrusion 633B of the lower-side transport member 632 is referred to as an arrangement pitch P4.

The arrangement pitch P4 is larger than the arrangement pitch P3 in the present exemplary embodiment.

Further, the number of rotation of the lower-side transport member 632 is larger than the number of rotation of the cylindrical-portion inside portion 526E in the present exemplary embodiment.

The outside diameter of the protrusion 526B of the cylindrical-portion inside portion 526E is referred to as an outside diameter G1. In addition, the outside diameter of the protrusion 633B of the lower-side transport member 632 is referred to as the outside diameter G2.

The outside diameter G2 is larger than the outside diameter G1 in the present exemplary embodiment.

As a result, the developer transporting capacity of the lower-side transport member 632 is larger in the present exemplary embodiment.

Here, the developer transporting capacity of the cylindrical-portion inside portion 526E is referred to as a filled-section transporting capacity.

The developer transporting capacity of the lower-side transport member 632 is larger than the filled-section transporting capacity in the present exemplary embodiment.

The developer transporting capacity of the lower-side transport member 632 is more than or equal to 3.4 times the filled-section transporting capacity in the present exemplary embodiment.

When the developer transporting capacity of the lower-side transport member 632 is more than or equal to 3.4 times the filled-section transporting capacity, a space through which the gas passes may be easily formed in the lower-side flow path 582, compared with a case where the developer transporting capacity of the lower-side transport member 632 is less than 3.4 times the filled-section transporting capacity. When the developer transporting capacity of the lower-side transport member 632 is more than or equal to 3.4 times the filled-section transporting capacity, the area of the developer occupying the cross-sectional area of the lower-side flow path 582 is less than or equal to 60% in the present exemplary embodiment. In this case, the gas may pass along the lower-side flow path 582 smoothly.

The "more than or equal to 3.4 times" refers to a ratio of the amount of the developer transported per unit time.

Here, the amount of the developer transported per unit time by the cylindrical-portion inside portion 526E is defined as 1. The amount of the developer transported per unit time by the lower-side transport member 632 is 3.4 or more in the present exemplary embodiment.

The branch portion 581X is provided on the downstream side of a portion where the cylindrical-portion inside portion 526E is installed in the present exemplary embodiment. The downstream side denotes the downstream side in the transport direction of the developer.

The gas flow path 530 branches on the downstream side of the portion where the cylindrical-portion inside portion 526E is installed from the developer flow path 510.

A gas enters the inside of the supplying device 70 through the discharge port 74 in the present exemplary embodiment. The gas then moves along the developer flow path 510 toward the upstream side in the transport direction of the developer. The gas then passes along the gas flow path 530.

The lower-side transport member 632 includes a downstream-side end portion 632G that is an end portion located on the downstream side in the transport direction of the developer. The gas flow path 530 branches on the upstream side of the downstream-side end portion 632G in the transport direction of the developer from the developer flow path 510.

At the portion where the cylindrical-portion inside portion 526E is provided, the entirety of the cross-section of the developer flow path 510 is filled by the developer. The filled section 511 provided with the cylindrical-portion inside portion 526E is filled with the developer.

The gas flow path 530 branches on the downstream side of the portion where the cylindrical-portion inside portion 526E is located from the developer flow path 510 in the present exemplary embodiment.

In this case, the gas that has entered the inside of the supplying device 70 moves while avoiding the filled section 511 where it is not easy for the gas to pass therethrough.

A case where the member that constitutes the upstream-side transport portion and the member that constitutes the downstream-side transport portion are different from each other has been described above. The member that constitutes the cylindrical-portion inside portion 526E, which is the upstream-side transport portion, is the central transport member 526. The member that constitutes the downstream-side transport portion is the lower-side transport member 632.

The central transport member 526 and the lower-side transport member 632 are different members in the present exemplary embodiment.

The above form is, however, a non-limiting example, and a form in which the upstream-side transport portion and the downstream-side transport portion are constituted by a single member may be conceivable.

A form in which the downstream-side transport portion is installed on an extension of the upstream-side transport portion may be also conceived. In this case, the upstream-side transport portion and the downstream-side transport portion may be constituted by a single member.

When the upstream-side transport portion and the downstream-side transport portion are constituted by a single member, the arrangement pitch of the protrusion of the downstream-side transport portion is set to be larger than the arrangement pitch of the protrusion of the upstream-side transport portion. In addition or alternatively, the outside diameter of the protrusion of the downstream-side transport portion is set to be larger than the outside diameter of the protrusion of the upstream-side transport portion.

In this case, the developer transporting capacity of the downstream-side transport portion may increase. In addition, a gas may pass through the downstream-side transport portion smoothly also in this case.

Here, it can be said that the first exemplary embodiment illustrated in FIG. 9B is also an embodiment in which the upstream-side transport portion and the downstream-side transport portion are provided. In addition, it can be said that the first exemplary embodiment is an embodiment in which the upstream-side transport portion and the downstream-side transport portion are constituted by a single member.

In the first exemplary embodiment illustrated in FIG. 9B, the cylindrical-portion inside portion 526E corresponds to the upstream-side transport portion. In addition, the outside section 526F corresponds to the downstream-side transport portion.

The developer transporting capacity of the downstream-side transport portion is larger than the developer transporting capacity of the upstream-side transport portion also in the first exemplary embodiment illustrated in FIG. 9B.

In the first exemplary embodiment illustrated in FIG. 9B, the upstream-side transport portion and the downstream-side transport portion are constituted by a single member.

The central transport member 526, which is a single member, is provided in the first exemplary embodiment illustrated in FIG. 9B.

Part of the central transport member 526 is the cylindrical-portion inside portion 526E that functions as the upstream-side transport portion. In addition, another part of the central transport member 526 is the outside section 526F that functions as the downstream-side transport portion.

In the second exemplary embodiment illustrated in FIG. 17, the downstream-side section 586 is provided as described above. As described above, the downstream-side section 586 denotes a portion of the developer flow path 510 located on the downstream side of the filled section 511.

Here, it can be said that the downstream-side section 586 is provided also in the first exemplary embodiment illustrated in FIG. 9B.

A gas passes through the downstream-side section 586 also in the first exemplary embodiment. The gas moves toward the upstream side in the movement direction of the developer through the downstream-side section 586.

As described above, the gas first enters the inside of the supplying device 70 through the discharge port 74 of the supplying device 70 also in the first exemplary embodiment. The gas then moves toward the upstream side in the movement direction of the developer through the downstream-side section 586.

The downstream-side section 586 is constituted by the lateral flow path 513 and the vertical flow path 514 in the first exemplary embodiment illustrated in FIG. 9B.

The gas that has entered the inside of the supplying device 70 through the discharge port 74 passes through the downstream-side section 586 also in the first exemplary embodiment illustrated in FIG. 9B. The gas moves toward the upstream side in the movement direction of the developer through the downstream-side section 586.

The gas then enters the gas flow path 530 provided in a form branching from the downstream-side section 586 and moves leftward in FIG. 9B.

As described above, the gas then reaches the wall-portion inner space 556 (not illustrated in FIG. 9B). The gas next reaches the one-direction flow path 541 and then reaches the internal space of the protrusion 76. The gas then moves toward the openings 505.

As described above, the upstream-side transport portion and the downstream-side transport portion are constituted by a single member in the first exemplary embodiment. The upstream-side transport portion corresponds to the cylindrical-portion inside portion 526E in the first exemplary embodiment. In addition, the downstream-side transport portion corresponds to the outside section 526F.

As described above, the arrangement pitch P2 is larger than the arrangement pitch P1 in the first exemplary embodiment.

The arrangement pitch P1 is a size of the arrangement pitch of the inside protrusion provided on the cylindrical-portion inside portion 526E. The arrangement pitch P2 is a size of the arrangement pitch of the outside protrusion provided on the outside section 526F.

The transporting capacity of the downstream-side transport portion is larger than the transporting capacity of the upstream-side transport portion also in the first exemplary embodiment. A gas may smoothly pass through the portion where the downstream-side transport portion is installed also in the first exemplary embodiment.

The first exemplary embodiment illustrated in FIG. 9B will be described further.

Hereinafter, the developer transporting capacity of a portion of the central transport member 526 located in the filled section 511 is referred to as "filled-section transporting capacity". In other words, the developer transporting capacity of the cylindrical-portion inside portion 526E is referred to as the "filled-section transporting capacity".

In addition, the developer transporting capacity of a portion of the central transport member 526 located in the downstream-side section 586 is referred to as "after-passage transporting capacity". In other words, the developer transporting capacity of the outside section 526F is referred to as the "after-passage transporting capacity.

The after-passage transporting capacity is larger than the filled-section transporting capacity in the first exemplary embodiment.

In addition, the after-passage moving speed is higher than the filled-section moving speed in the first exemplary embodiment.

In this case, the height of the upper surface of the developer decreases in the lateral flow path 513 that constitutes part of the downstream-side section 586.

In this case, the cross-sectional area of the gas flow path 530 located above the lateral flow path 513 increases.

In the cross-section of the lateral flow path 513 that constitutes part of the downstream-side section 586, a situation in which the entirety of the cross-section is filled with the developer may be avoided.

In addition, when the after-passage transporting capacity is larger than the filled-section transporting capacity, the area of the developer occupying the cross-section of the vertical flow path 514 decreases. In this case, a gas may flow in the vertical flow path 514 smoothly.

Figure 18A:
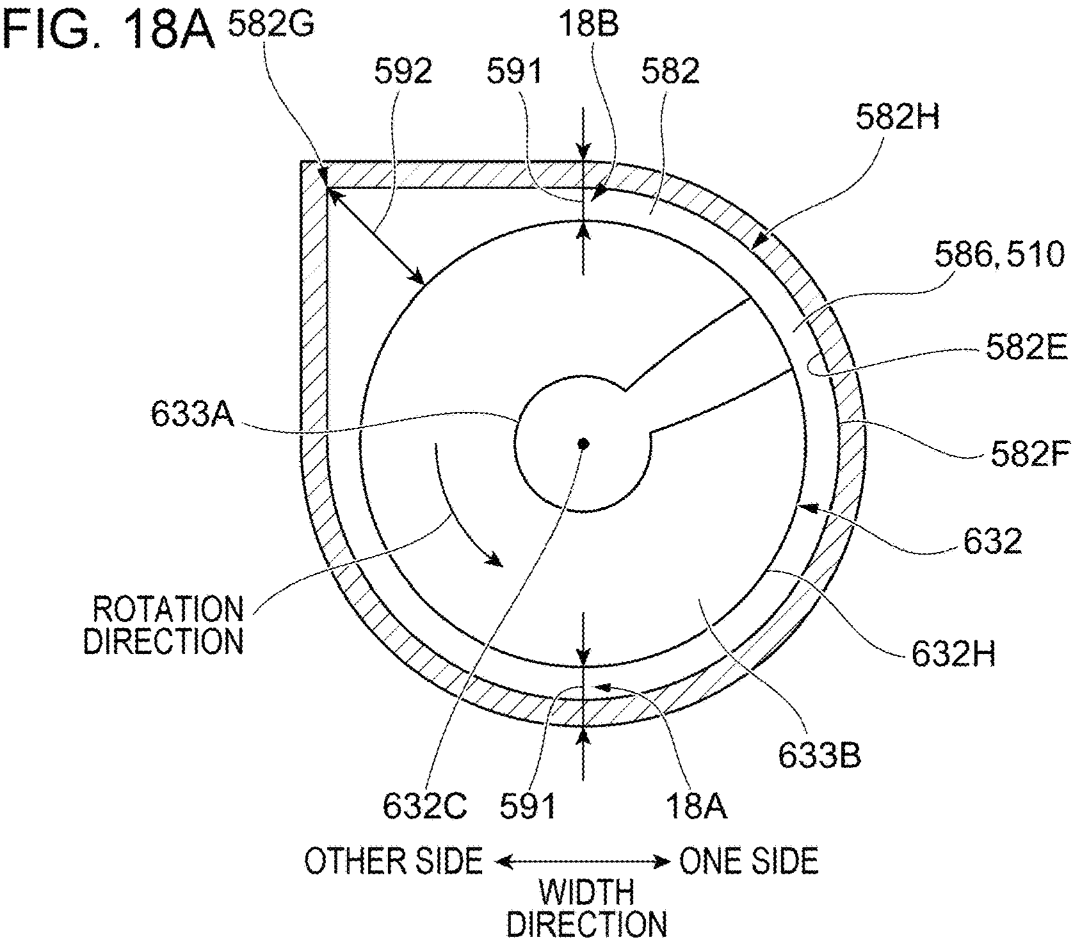
FIGS. 18A and 18B are explanatory views of a lower-side flow path.
Figure 18B:
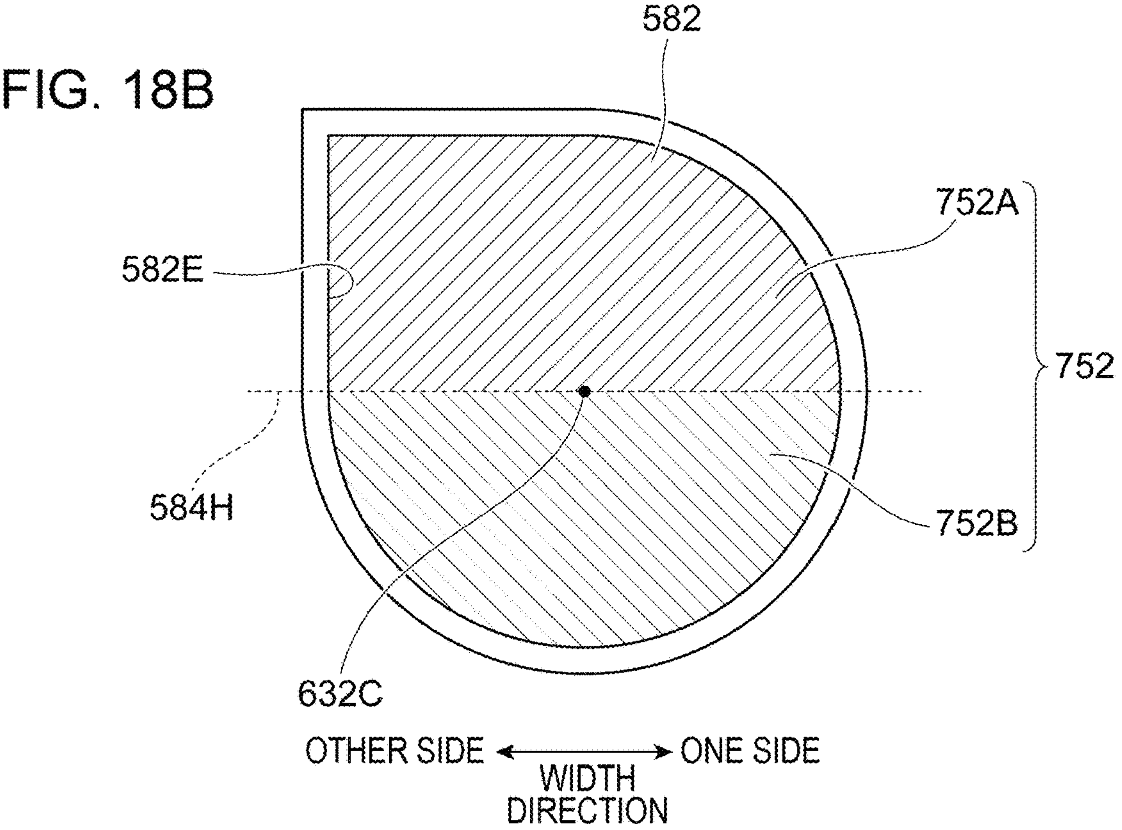

FIGS. 18A and 18B are explanatory views of the lower-side flow path 582.

FIG. 18A illustrates a cross-section of the lower-side flow path 582 along the line XVIIIA-XVIIIA in FIG. 17. In other words, FIG. 18A illustrates a cross-section of the downstream-side section 586 of the developer flow path 510.

FIG. 18B illustrates a cross-section of the lower-side flow path 582 in a state in which the lower-side transport member 632 is not illustrated.

As illustrated in FIG. 18A, the lower-side flow path 582 is provided with the lower-side transport member 632, as another example of the movement member.

The lower-side transport member 632 rotates about the rotary shaft 633A extending along the lower-side flow path 582. Consequently, the developer in the lower-side flow path 582 moves toward the downstream side.

As illustrated in FIGS. 18A and 18B, the shape of a cross-section of the lower-side flow path 582 is a non-circular shape in the present exemplary embodiment.

As illustrated in FIG. 17, the lower-side flow path 582 extends laterally. In other words, the lower-side flow path 582 extends horizontally. In other words, the lower-side flow path 582 is provided in a form extending in a direction intersecting the vertical direction.

A cross-section of the laterally extending lower-side flow path 582 is in the state illustrated in FIG. 18A.

A left upper portion 582G projects in a direction away from the rotary shaft 633A of the lower-side transport member 632 in the present exemplary embodiment. The left upper portion 582G is located at a left upper portion of an outer peripheral edge 582F of the lower-side flow path 582 in FIG. 18A.

With such a projecting portion being provided, a passage for a gas may be ensured easily compared with a case without the projecting portion. In this case, a gas may move along the lower-side flow path 582 smoothly.

The projecting portion is, however, not limited to the left upper portion 582G located at a left upper position in the outer peripheral edge 582F of the lower-side flow path 582. A right upper portion 582H located at a right upper position may project in a direction away from the rotary shaft 633A.

Other than the above, both of the left upper portion 582G and the right upper portion 582H may project. In other words, both of the left upper portion 582G and the right upper portion 582H may project in a direction away from the rotary shaft 633A of the lower-side transport member 632.

In addition, the cross-sectional shape of the lower-side flow path 582 may be a U-shape. In this case, both of the left upper portion 582G and the right upper portion 582H project.

FIG. 18B illustrates a cross-section of the lower-side flow path 582 in a state in which the lower-side transport member 632 is not illustrated.

The cross-section of the lower-side flow path 582 is in a state in which an inner side region 752, which is a region on the inner side of an inner peripheral surface 582E of the lower-side flow path 582, is present. The inner side region 752 is a region that is located on the inner side of the inner peripheral surface 582E of the lower-side flow path 582 and that is surrounded by the inner peripheral surface 582E.

Here, a horizontal line 584H that extends along the cross-section of the lower-side flow path 582 and that passes through a rotation center 632C of the lower-side transport member 632 is assumed.

The horizontal line 584H extends in a direction orthogonal to an extension direction of the lower-side flow path 582. The horizontal line 584H also extends in the radial direction of the lower-side flow path 582.

Further, an upper-side portion 752A that is a portion of the inner side region 752 located on the upper side of the horizontal line 584H is assumed. In addition, a lower-side portion 752B that is a portion of the inner side region 752 located on the lower side of the horizontal line 584H is assumed.

The area of the upper-side portion 752A is larger than the area of the lower-side portion 752B in the present exemplary embodiment.

In the cross-section of the lower-side flow path 582, part of the inner peripheral surface 582E of the lower-side flow path 582 protrudes in a direction away from the rotation center 632C. Specifically, part of a portion of the inner peripheral surface 582E located on the upper side of the horizontal line 584H protrudes.

The left upper portion 582G protrudes in a direction away from the rotation center 632C in the present exemplary embodiment. At a portion where the left upper portion 582G is located, part of the inner peripheral surface 582E protrudes in a direction away from the rotation center 632C.

Due to the protruding of the part of the inner peripheral surface 582E, the area of the upper-side portion 752A is larger than the area of the lower-side portion 752B in the present exemplary embodiment.

Figure 22:
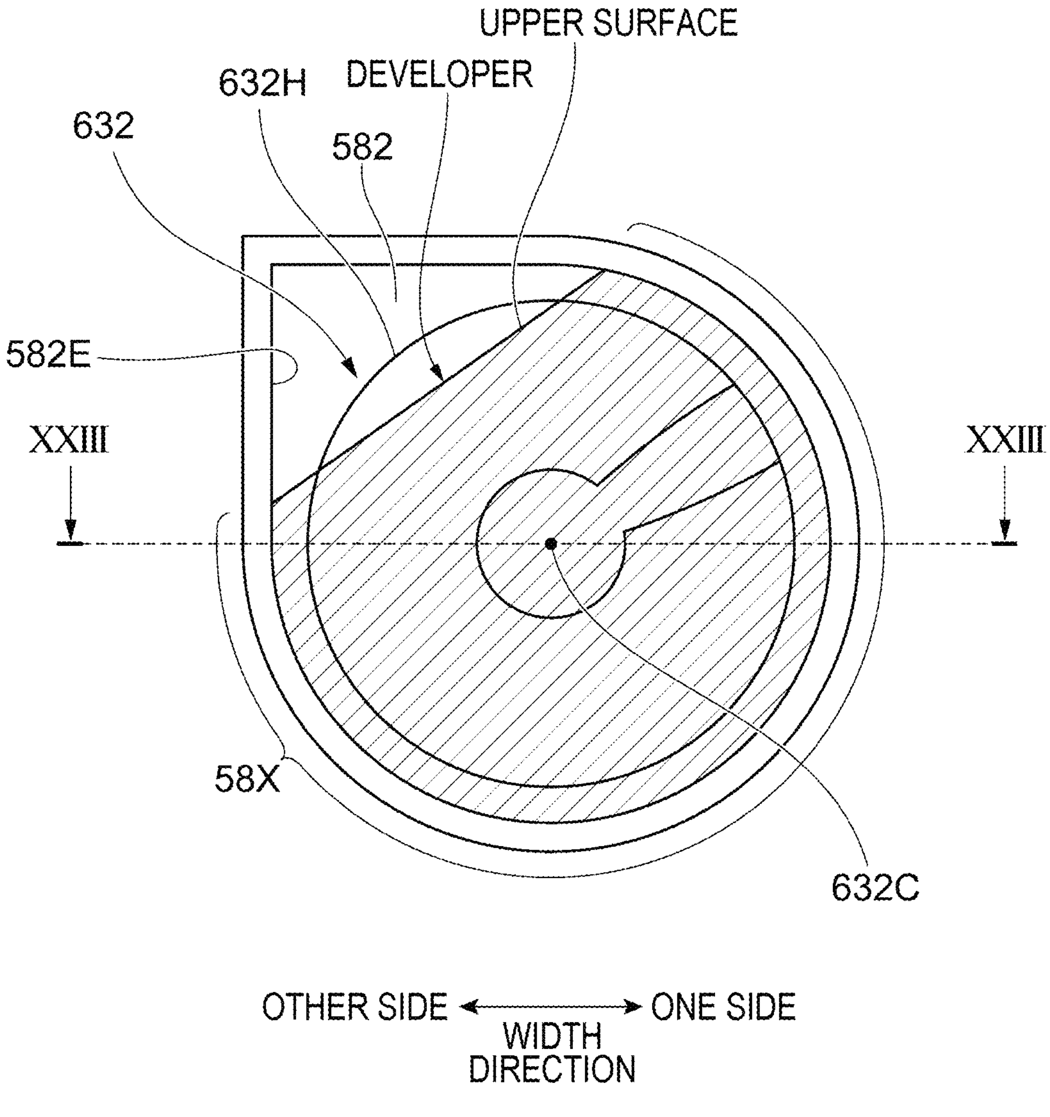
FIG. 22 illustrates a transported state of a developer in a lower-side flow path.

FIG. 22 illustrates a transported state of a developer in the lower-side flow path 582.

In the lower-side flow path 582, the developer is transported in a state of being gathered on one side in the width direction of the lower-side flow path 582. The width direction of the lower-side flow path 582 has the same meaning as a direction that is orthogonal to the extension direction of the lower-side flow path 582 and that is parallel to the horizontal direction.

The developer is transported in a state of being gathered on one side in the width direction of the lower-side flow path 582 in the present exemplary embodiment. In this case, the upper surface of the developer inclines in a cross-section of the lower-side flow path 582.

Figure 23:
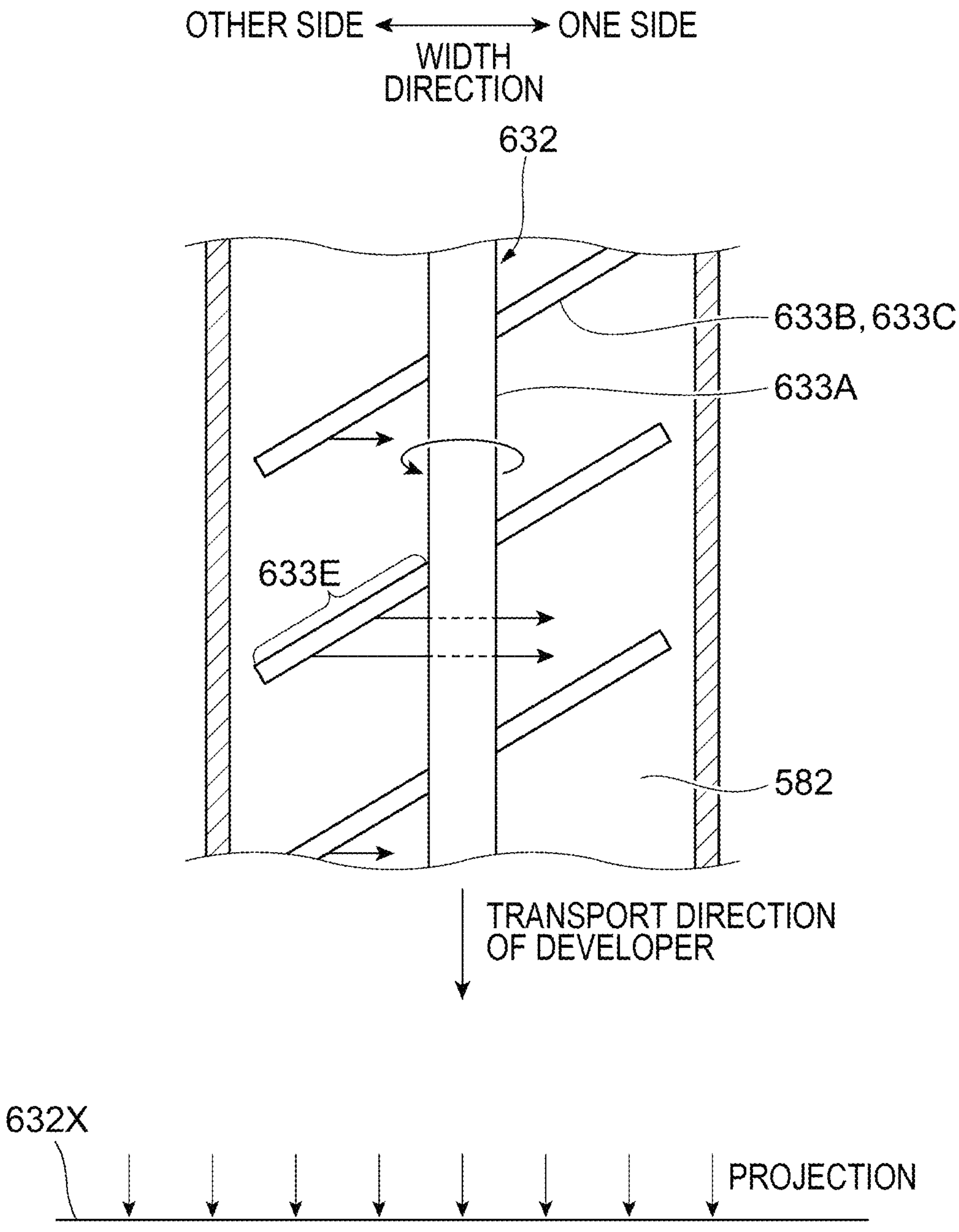
FIG. 23 is a sectional view of the lower-side flow path along the line XXIII-XXIII in FIG. 22.

FIG. 23 is a sectional view of the lower-side flow path 582 along the line XXIII-XXIII in FIG. 22.

In FIG. 23, a portion of the protrusion 633B that is provided on the lower-side transport member 632, the portion being located below the rotary shaft 633A, is illustrated. Hereinafter, the portion of the protrusion 633B located below is referred to as "lower-side portion 633C".

The lower-side portion 633C is disposed in a state of being inclined with respect to an axial direction of the lower-side transport member 632 and the radial direction of the lower-side transport member 632.

In addition, the lower-side portion 633C inclines toward the downstream side in the transport direction of the developer as the lower-side portion 633C approaches the other side.

Further, a portion 633E of the lower-side portion 633C located on the other side passes below the rotary shaft 633A toward the one side in the present exemplary embodiment. When the lower-side transport member 632 rotates, the portion 633E located on the other side moves toward the one side in the present exemplary embodiment.

In this case, the developer is transported in a state of being gathered on the one side in the width direction of the lower-side flow path 582.

Description will be continued with re-reference to FIG. 18B.

The protruding part of the inner peripheral surface 582E of the lower-side flow path 582 is located on the other side in the width direction of the lower-side flow path 582. In addition, this part is located on the upper side of the horizontal line 584H.

In other words, the left upper portion 582G illustrated in FIG. 18A is located on the other side in the width direction of the lower-side flow path 582. In addition, the left upper portion 582G is located on the upper side of the horizontal line 584H.

The left upper portion 582G located on the other side protrudes in a direction away from the rotation center 632C in the present exemplary embodiment.

As illustrated in FIG. 18A, a first gap 591 and a second gap 592 are further provided.

The first gap 591 is located between an outer peripheral portion 632H of the lower-side transport member 632 and the inner peripheral surface 582E of the lower-side flow path 582. The second gap 592 is also located between the outer peripheral portion 632H of the lower-side transport member 632 and the inner peripheral surface 582E of the lower-side flow path 582.

Here, as illustrated in FIG. 23, a projected surface 632X orthogonal to the axial direction of the lower-side transport member 632 is assumed.

In addition, it is assumed that the lower-side transport member 632 and the lower-side flow path 582 are projected toward the projected surface 632X. In this projection, projection is performed in the axial direction of the lower-side transport member 632 and toward the projected surface 632X.

The first gap 591 and the second gap 592 described above are generated on the projected surface 632X in the present exemplary embodiment.

As illustrated in FIG. 18A, the second gap 592 is larger than the first gap 591.

The position of the first gap 591 and the position of the second gap 592 differ from each other in the rotation direction of the lower-side transport member 632.

The second gap 592, which is a larger gap, is located above the rotation center 632C of the lower-side transport member 632. In addition, the second gap 592 is located above the horizontal line 584H (refer to FIG. 18B).

Meanwhile, the first gap 591 indicated by the sign 18A in FIG. 18A is located below the rotation center 632C of the lower-side transport member 632.

In addition, as indicated by the sign 18B, the first gap 591 is also located at a portion other than a portion below the rotation center 632C. The first gap 591 indicated by the sign 18B is located above the rotation center 632C of the lower-side transport member 632.

Meanwhile, the second gap 592 is located only above the rotation center 632C of the lower-side transport member 632. In other words, the second gap 592 is located only above the horizontal line 584H.

As described above, the cross-sectional shape of the lower-side flow path 582 is a non-circular shape in the configuration example illustrated in FIGS. 18A and 18B. In other words, the shape of the inner peripheral surface 582E is a non-circular shape.

As illustrated in FIG. 22, a portion of the inner peripheral surface 582E is in contact with the transported developer in the present exemplary embodiment. Hereinafter, the portion of the inner peripheral surface 582E in contact with the developer is referred to as a contact portion 58X.

The developer is not in contact with the entire region of the inner peripheral surface 582E in the circumferential direction. The developer is in contact with the contact portion 58X, which is a portion of the inner peripheral surface 582E in the circumferential direction.

In the configuration example, the contact portion 58X has a shape following the outer peripheral portion 632H of the lower-side transport member 632.

Consequently, accumulation of an untransported developer between the contact portion 58X of the inner peripheral surface 582E and the outer peripheral portion 632H of the lower-side transport member 632 may be suppressed.

It is assumed that a protrusion that protrudes in a direction away from the rotation center 632C is provided on the contact portion 58X. In this case, an untransported developer continues to accumulate at a portion where the protrusion is provided.

In contrast, the contact portion 58X has the shape following the outer peripheral portion 632H of the lower-side transport member 632 in the present exemplary embodiment. Specifically, the contact portion 58X of the inner peripheral surface 582E has a circular arc shape.

Consequently, an increase in the size of the gap between the contact portion 58X and the outer peripheral portion 632H of the lower-side transport member 632 may be suppressed. As a result, a situation in which the developer continues to accumulate between the contact portion 58X and the outer peripheral portion 632H of the lower-side transport member 632 may be less likely to occur.

Figure 24:
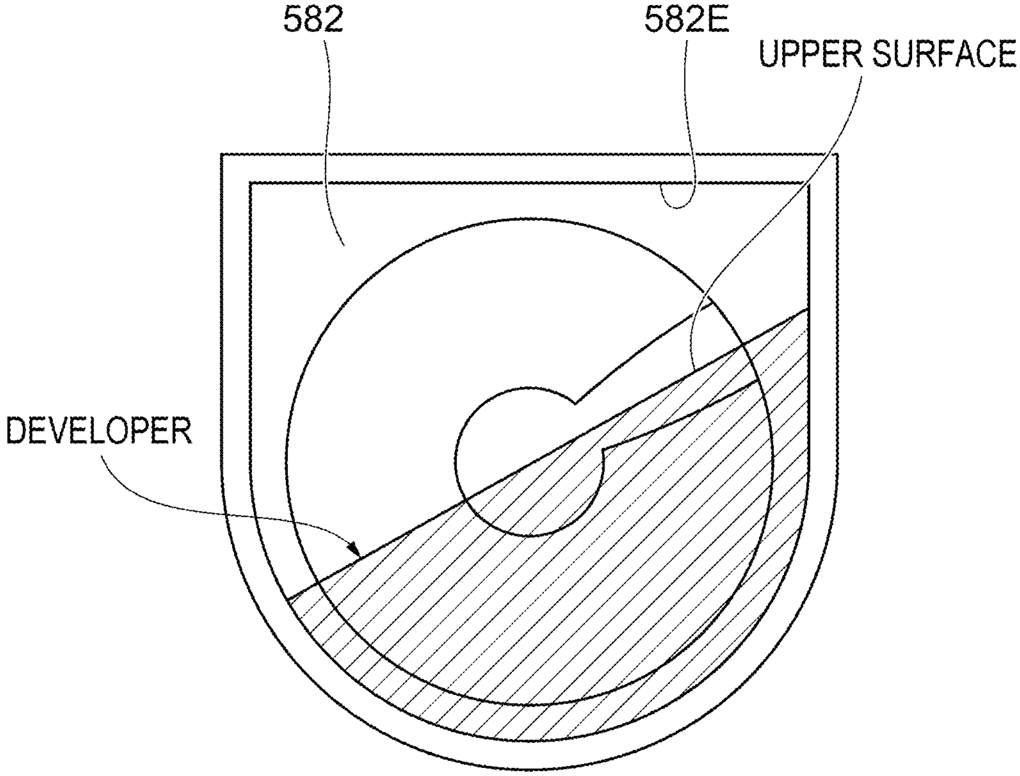
FIG. 24 illustrates another configuration example of a lower-side flow path.

FIG. 24 illustrates another configuration example of the lower-side flow path 582.

The shape of the inner peripheral surface 582E of the lower-side flow path 582 is a U-shape in the configuration example.

The upper surface of the transported developer is lower in this configuration example than that in the transported form illustrated in FIG. 22. In such a case, another portion of the inner peripheral surface 582E located at a right upper portion in FIG. 22 may also protrude.

The inner peripheral surface 582E is in a form of being provided with two protruding portions in the configuration example illustrated in FIG. 24. In this case, the area of a flow path along which a gas passes is increased compared with that in the configuration example illustrated in FIG. 22.

Figure 25:
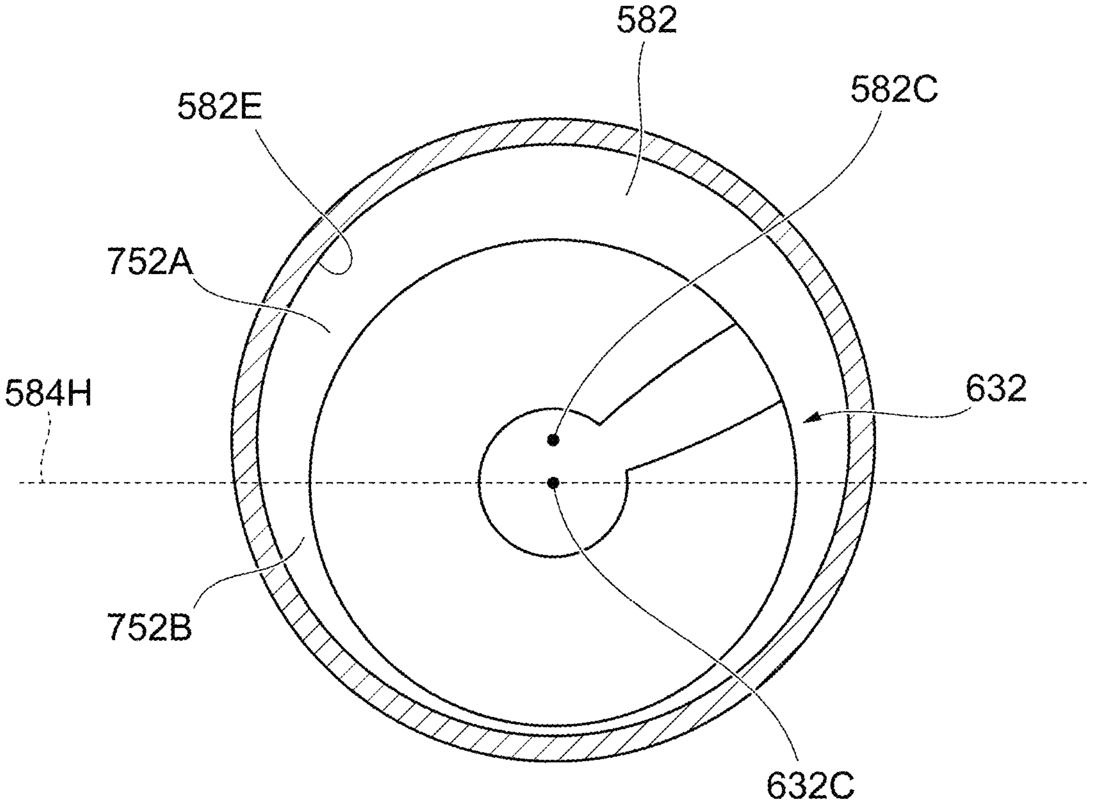
FIG. 25 illustrates another configuration example of a lower-side flow path and a lower-side transport member.

FIG. 25 illustrates another configuration example of the lower-side flow path 582 and the lower-side transport member 632.

The diameter of the inner peripheral surface 582E is larger than the diameter of the inner peripheral surface 582E illustrated in FIG. 22 in the configuration example.

Further, the rotation center 632C of the lower-side transport member 632 is located below a central portion 582C in the configuration example. The central portion 582C and the rotation center 632C are not disposed coaxially in the configuration example.

The "central portion 582C" denotes a central portion of the inner peripheral surface 582E in the radial direction.

As in the aforementioned exemplary embodiment, the area of the upper-side portion 752A is larger than the area of the lower-side portion 752B also in the configuration example.

The developer located on the lower side of the lower-side flow path 582 is transported toward the downstream side by the lower-side transport member 632 in the configuration example. In addition, a space through which a gas passes is generated on the upper side of the lower-side flow path 582.

With reference to FIGS. 18A and 18B and FIG. 24, configuration examples in which the shape of the inner peripheral surface 582E is devised have been described. In addition, with reference to FIG. 25, a configuration example in which the positional relationship between the inner peripheral surface 582E and the lower-side transport member 632 is devised has been described.

Other than the above, the lower-side transport member 632 may be devised to ensure a space through which a gas passes.

Figure 26:
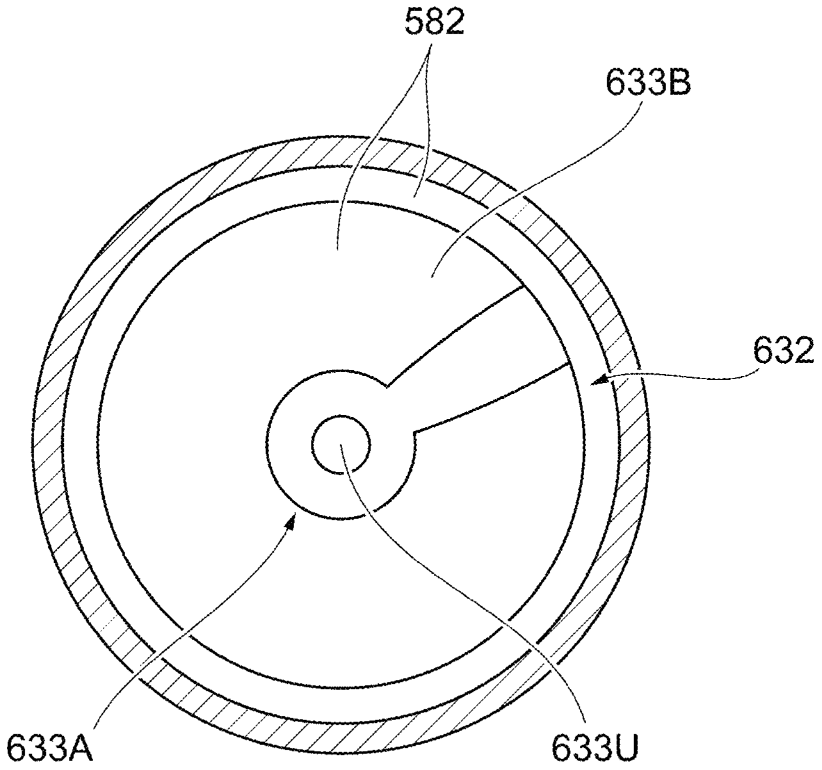
FIG. 26 illustrates another configuration example of a lower-side transport member.

FIG. 26 illustrates another configuration example of the lower-side transport member 632.

The lower-side transport member 632 is provided with a flow path 633U through which a gas passes in the configuration example. The flow path 633U is provided at a central portion of the rotary shaft 633A of the lower-side transport member 632 in the radial direction. The flow path 633U is also provided in a form extending in an axial direction of the rotary shaft 633A.

A gas from the developing device 14 moves along the flow path 633U formed in the rotary shaft 633A in the configuration example. The gas moves along the flow path 633U toward the upstream side in the transport direction of the developer.

Other than the above, a through hole or a notch may be formed in the protrusion 633B provided on the lower-side transport member 632. Specifically, a through hole or a notch extending between the front surface and the back surface of the protrusion 633B may be formed.

In this case, a gas moves toward the upstream side in the transport direction of the developer through the through hole or the notch.

Figure 19:
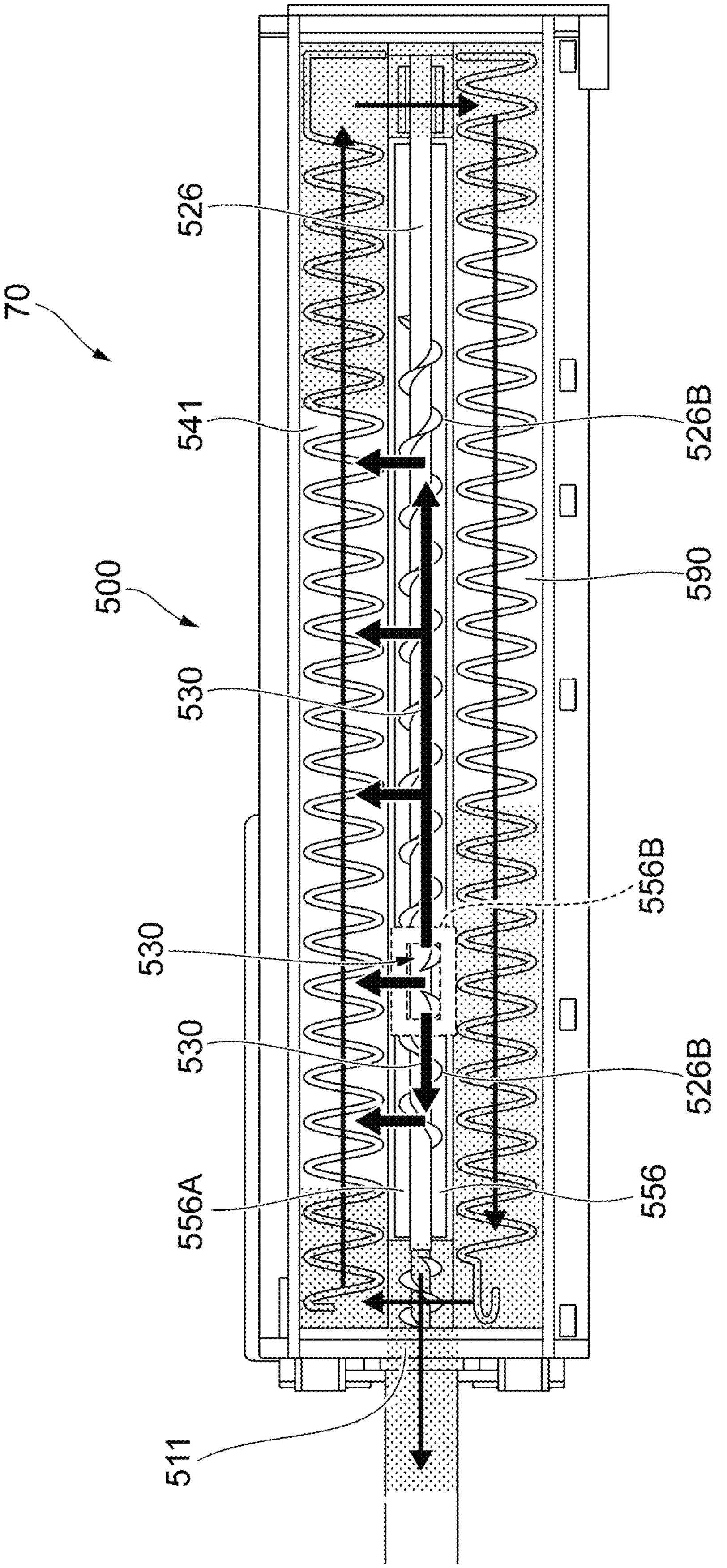
FIG. 19 is a top view of a developer accumulation unit according the second exemplary embodiment.

FIG. 19 is a top view of the developer accumulation unit 500 according the second exemplary embodiment.

The gas flow path 530 extends toward the wall-portion inner space 556 from below the wall-portion inner space 556 in the second exemplary embodiment. The gas flow path 530 is then connected to a bottom portion 556A of the wall-portion inner space 556.

The bottom portion 556A has an opening 556B through which the gas flow path 530 extends.

The gas flow path 530 enters the inside of the wall-portion inner space 556 from the side of the bottom portion 556A of the wall-portion inner space 556. Specifically, the gas flow path 530 enters the inside of the wall-portion inner space 556 through the opening 556B. The gas flow path 530 then extends in the longitudinal direction of the wall-portion inner space 556.

A gas moves along the gas flow path 530 and enters the wall-portion inner space 556. The gas enters the wall-portion inner space 556 from the bottom portion 556A of the wall-portion inner space 556. The gas enters the inside of the wall-portion inner space 556 through the opening 556B.

The gas then moves in the longitudinal direction of the wall-portion inner space 556. The gas then passes above the one-direction flow path 541, as in the aforementioned exemplary embodiment, toward the internal space of the protrusion 76 (not illustrated in FIG. 19).

After passing through the internal space, the gas is discharged to the outside of the supplying device 70 through the openings 505 provided in a side portion of the protrusion 76.

As described above, the gas flow path 530 extending toward the wall-portion inner space 556 from below the wall-portion inner space 556 extends through the opening 556B. The gas flow path 530 extends toward the opening 556B from below the opening 556B and then extends through the opening 556B.

The gas flow path 530 enters the inside of the wall-portion inner space 556 from the bottom portion 556A of the wall-portion inner space 556.

After extending through the opening 556B, the gas flow path 530 extends in the left and right directions in FIG. 19. A portion of the gas flow path 530 extending in the left and right directions extends through the inside of the wall-portion inner space 556.

A developer gradually accumulates at the portion of the gas flow path 530 extending through the inside of the wall-portion inner space 556. The developer is moved in a direction away from the opening 556B by the central transport member 526, which is one example of the movement member.

In the configuration example illustrated in FIG. 19, the developer that accumulates on the right side of the opening 556B in FIG. 19 moves rightward in FIG. 19. In addition, the developer that accumulates on the left side of the opening 556B in FIG. 19 moves leftward in FIG. 19.

The central transport member 526 is provided with the protrusions 526B of two types that differ from each other in terms of turning directions.

The protrusion 526B of one of the two types is provided on the left side of the opening 556B in FIG. 19. The protrusion 526B of the other type is provided on the right side of the opening 556B in FIG. 19.

Consequently, the developer located on the right side of the opening 556B in FIG. 19 and the developer located on the left side of the opening 556B in FIG. 19 move in directions opposite to each other.

The developer located on the right side of the opening 556B in FIG. 19 moves rightward in FIG. 19 in the configuration example. Meanwhile, the developer located on the left side of the opening 556B in FIG. 19 moves leftward, which is opposite to rightward, in FIG. 19.

The developer that has moved rightward in FIG. 19 moves to the outside of the wall-portion inner space 556. Specifically, the developer that has moved rightward in FIG. 19 moves to the circulation flow path 590.

The developer that has moved leftward in FIG. 19 also moves to the outside of the wall-portion inner space 556. Specifically, the developer that has moved leftward in FIG. 19 also moves to the circulation flow path 590.

The central transport member 526 is provided also at a position facing the opening 556B in the present exemplary embodiment. Consequently, the developer that accumulates at the opening 556B also moves to the right side of the opening 556B and to the left side of the opening 556B.

Figure 20:
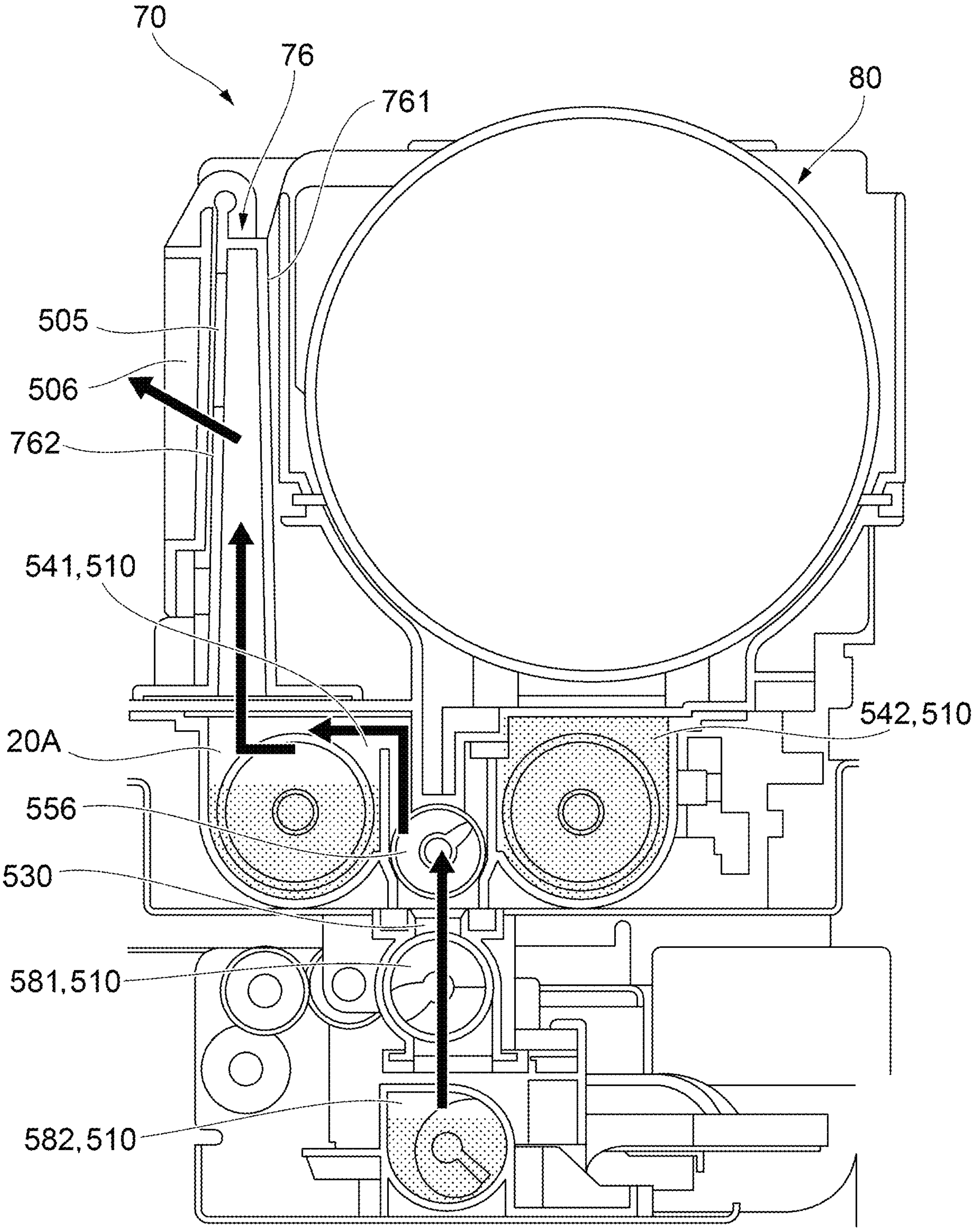
FIG. 20 is a sectional view of the supplying device along the line XX-XX in FIG. 17.

FIG. 20 is a sectional view of the supplying device 70 along the line XX-XX in FIG. 17. FIG. 20 illustrates a state of the supplying device 70 viewed from the side of the one end portion 71 (refer to FIG. 17) of the supplying device 70.

The developer flow path 510 is provided below the developer storage container 80 also in the second exemplary embodiment. A developer from the developer storage container 80 passes along the developer flow path 510.

Part of the developer flow path 510 is located at a portion away from directly under the developer storage container 80 in the second exemplary embodiment. Specifically, the part of the one-direction flow path 541 indicated by the sign 20A is located at a portion away from directly under the developer storage container 80.

The protrusion 76 that extends upward is provided above the one-direction flow path 541 in the configuration example.

As in the first exemplary embodiment illustrated in FIG. 7 to FIG. 16, the internal space of the protrusion 76 illustrated in FIG. 20 is connected to the one-direction flow path 541.

Part of the developer flow path 510 is located at a portion away from directly under the developer storage container 80 in the second exemplary embodiment. The protrusion 76 that extends upward is provided above this part in the second exemplary embodiment.

This part is a portion of the one-direction flow path 541 away from directly under the developer storage container 80.

As in the aforementioned exemplary embodiment, the inside of the protrusion 76 is a cavity. A space through which a gas passes is present inside the protrusion 76.

A gas that has reached a portion above the one-direction flow path 541 passes through the internal space of the protrusion 76. The gas then moves toward the openings 505 provided in the side portion of the protrusion 76. The gas is then discharged to the outside of the supplying device 70 through the openings 505 for discharge of the gas.

The gas flow path 530 eventually reaches the openings 505 in the present exemplary embodiment. The gas that has passed along the gas flow path 530 is eventually discharged through the openings 505.

The openings 505 provided in the protrusion 76 are provided in the opposite surface 762, as in the aforementioned exemplary embodiment.

The protrusion 76 has the facing surface 761 facing the developer storage container 80 and the opposite surface 762 located opposite to the facing surface 761. The openings 505 are provided in the opposite surface 762 of the protrusion 76.

The openings 505 are provided above the wall-portion inner space 556, which is one example of the non-flow-path section.

The supplying device 70 has the openings 505 through which the gas supplied along the gas flow path 530 to the inside of the wall-portion inner space 556 is discharged. The gas is discharged to the outside of the supplying device 70 through the openings 505 in the present exemplary embodiment.

Figure 27:
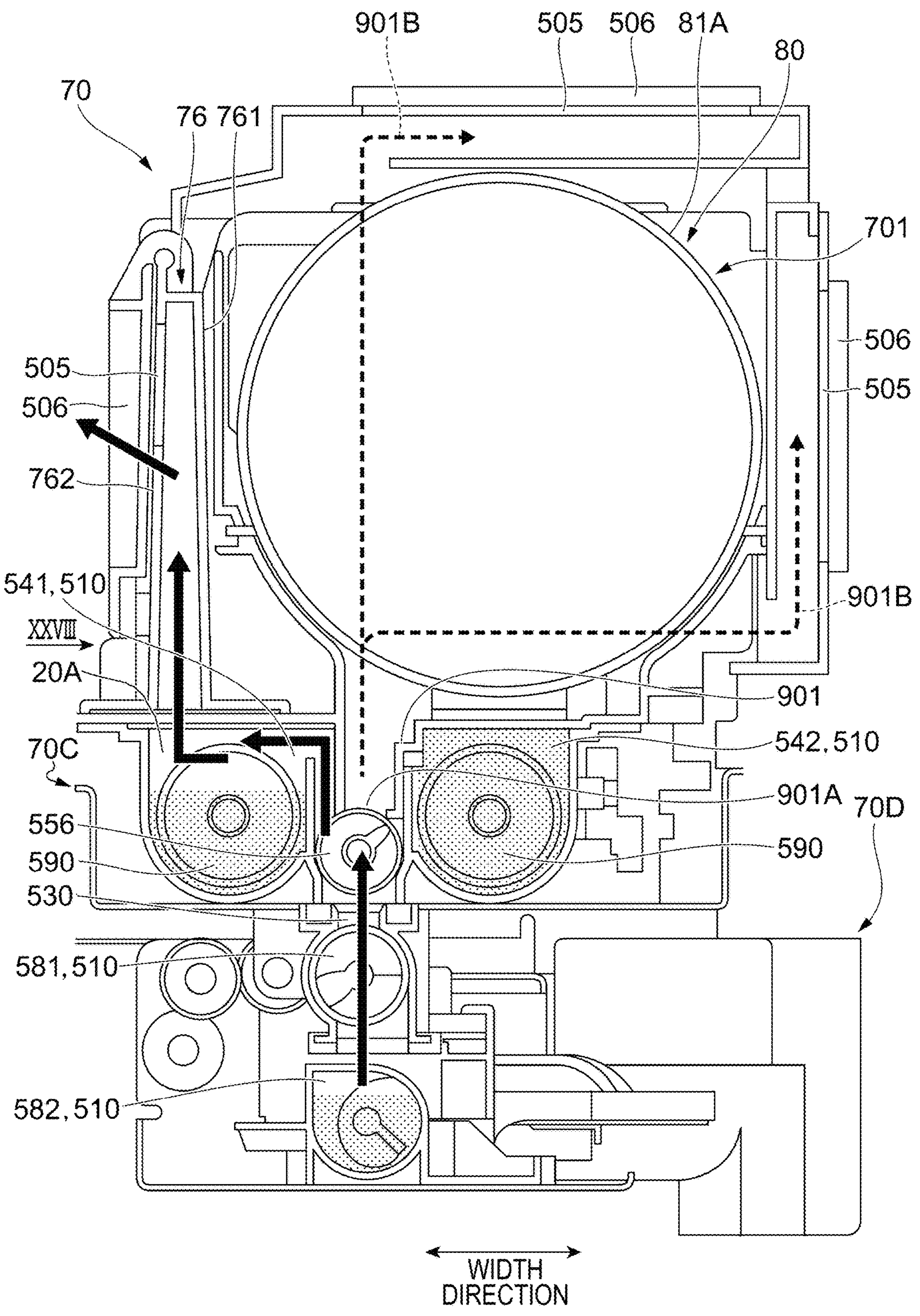
FIG. 27 illustrates another configuration example of a supplying device.
Figure 28:
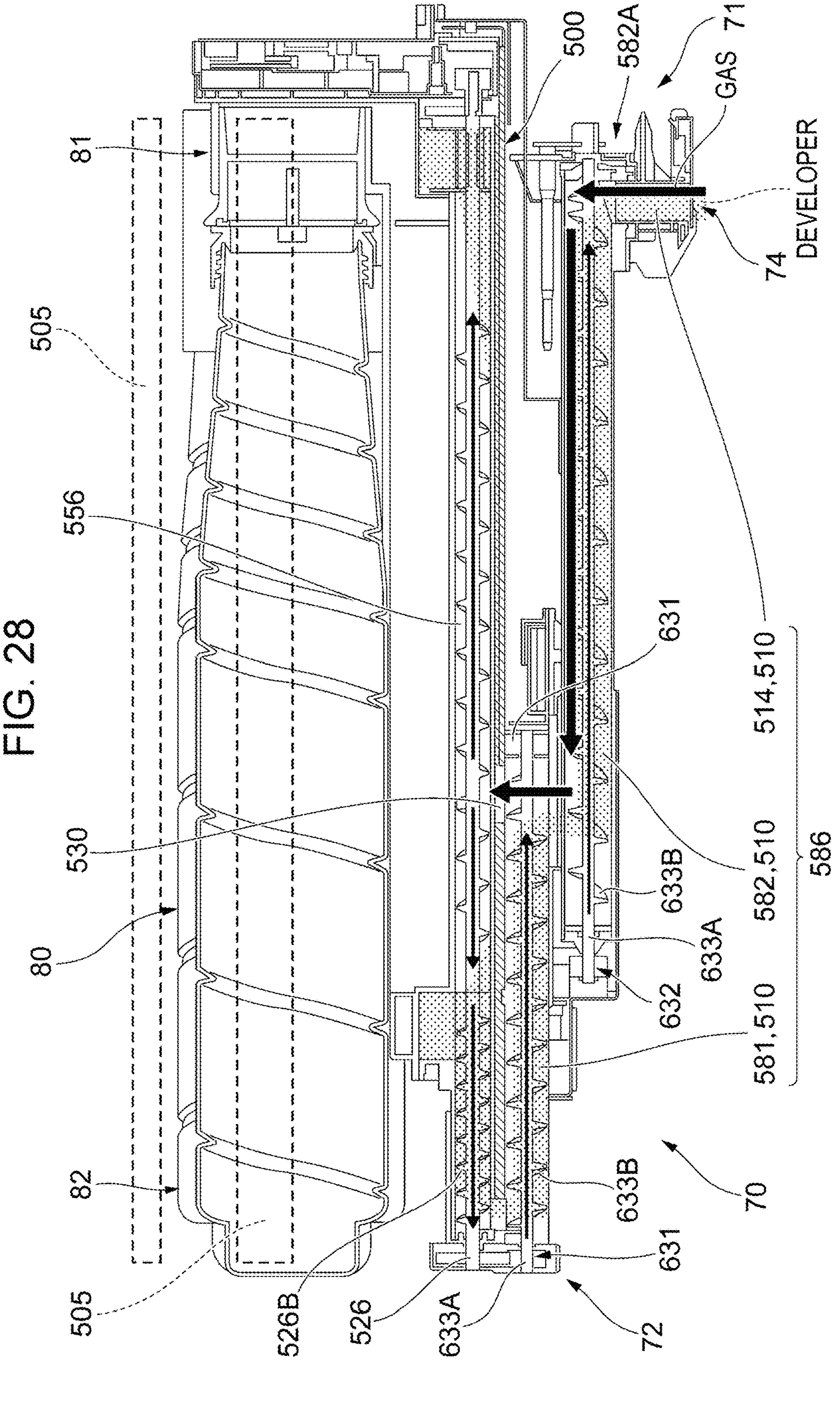
FIG. 28 illustrates another configuration example of a supplying device.

FIG. 27 and FIG. 28 illustrate another configuration example of the supplying device 70. FIG. 28 illustrates the supplying device 70 viewed in the direction indicated by the arrow XXVIII in FIG. 27.

As illustrated in FIG. 27, the multiple openings 505 are provided in the configuration example.

The multiple openings 505 are each disposed, as in the aforementioned exemplary embodiment, at a position facing the outer peripheral surface 81A of the developer storage container 80 mounted on the mount portion 701.

The multiple openings 505 are provided in a form in which the positions of the openings 505 in the circumferential direction of the developer storage container 80 are different from each other.

In addition, as illustrated in FIG. 28, each of the multiple openings 505 is provided in a form extending in the axial direction of the developer storage container 80.

As illustrated in FIG. 28, each of the openings 505 is provided to extend from a position facing the one end portion 81 to a position facing the other end portion 82.

Here, the one end portion 81 denotes one end portion of the developer storage container 80 in the axial direction. The other end portion 82 denotes the other end portion of the developer storage container 80 in the axial direction.

In this case, the area of each of the openings 505 is larger than that in a case where the length of each of the openings 505 is smaller than the distance between the one end portion 81 and the other end portion 82.

A form in which one or some of the multiple openings 505 are each provided to extend from a position facing the one end portion 81 to a position facing the other end portion 82 may be employed. Then, the other opening 505 or openings 505 may have a shorter length than the one or some of the openings 505 mentioned above.

As illustrated in FIG. 27, each of the openings 505 is directed, as in the aforementioned exemplary embodiment, to a side opposite to the side where the developer storage container 80 is installed. Each of the openings 505 is provided with the filter 506.

A configuration other than a configuration in which all of the multiple openings 505 are directed to the side opposite to the side where the developer storage container 80 is installed may be employed.

For example, a configuration in which only one or some of the multiple openings 505 are directed to the opposite side may be employed. Then, the other opening 505 or openings 505 may be directed to the side where the developer storage container 80 is installed.

The number of the openings 505 is not limited to three and may be one or two. Alternatively, the number of the openings 505 may be four or more.

As described above, the arrangement form of the openings 505 in the present exemplary embodiment is the following arrangement form.

"Each opening 505 is provided to extend from a position facing the one end portion 81 to a position facing the other end portion 82"

This arrangement form includes a form in which multiple openings 505 are arranged side by side from a position facing the one end portion 81 to a position facing the other end portion 82.

The arrangement form is not limited to a form in which a single opening 505 is provided to extend from a position facing the one end portion 81 to a position facing the other end portion 82.

As illustrated in FIG. 7, the multiple openings 505 may be disposed side by side in the axial direction of the developer storage container 80. A configuration in which the multiple openings 505 arranged side by side as described above are provided from a position facing the one end portion 81 to a position facing the other end portion 82 may be also employed.

The multiple openings 505 are provided between one end portion 70C and another end portion 70D in the configuration example illustrated in FIG. 27.

The one end portion 70C and the other end portion 70D are end portions of the supplying device 70. The position of the one end portion 70C and the position of the other end portion 70D differ from each other in the width direction of the supplying device 70.

Downsizing of the supplying device 70 may be easily addressed in this configuration.

It is assumed that some or all of the multiple openings 505 are each located at a portion away from between the one end portion 70C and the other end portion 70D. Compared with this case, downsizing of the supplying device 70 may be easily addressed in the configuration illustrated in FIG. 27.

Here, positions in the width direction of the supplying device 70 are compared. The multiple openings 505 are located on the other end portion 70D side of the one end portion 70C in the configuration example illustrated in FIG.

27. In addition, the multiple openings 505 are located on the one end portion 70C side of the other end portion 70D.

All of the openings 505 are located on the other end portion 70D side of the one end portion 70C in the configuration example illustrated in FIG. 27. In addition, all of the openings 505 are located on the one end portion 70C side of the other end portion 70D.

Here, the one end portion 70C denotes a portion furthest from the other end portion 70D in the width direction of the supplying device 70. The other end portion 70D denotes a portion furthest from the one end portion 70C in the width direction of the supplying device 70.

The width direction of the supplying device 70 is a direction orthogonal to the axial direction of the developer storage container 80 and is a direction identical to a direction extending in the horizontal direction.

As illustrated in FIG. 27, a cover member 901 is provided at an upper portion of the wall-portion inner space 556, which is one example of the surrounded space. The cover member 901 has an opening 901A.

A flow path 901B connected to the opening 901A is further provided.

The flow path 901B is connected to the opening 505 located on the upper side of the developer storage container 80. The flow path 901B is also connected to the opening 505 located on the right side of the developer storage container 80.

The flow path 901B is provided in a form extending through a position facing an end surface 89A of the developer storage container 80 (refer to FIG. 17).

Hereinafter, the opening 505 located on the upper side of the developer storage container 80 (refer to FIG. 27) is referred to as the upper-side opening 505 in the present specification. The opening 505 located on the right side of the developer storage container 80 is referred to as the right-side opening 505. The opening 505 located on the left side of the developer storage container 80 is referred to as the left-side opening 505.

A gas moves from the wall-portion inner space 556 to the outside of the wall-portion inner space 556 through the opening 901A in the configuration example illustrated in FIG. 27.

The gas that has moved to the outside of the wall-portion inner space 556 moves along the flow path 901B toward the upper-side opening 505 and the right-side opening 505.

The gas that moves toward the upper-side opening 505 moves toward the upper-side opening 505 without passing along the circulation flow path 590. The gas that moves toward the right-side opening 505 also moves toward the right-side opening 505 without passing along the circulation flow path 590.

The gas is then discharged to the outside of the supplying device 70 through the upper-side opening 505 and the right-side opening 505.

The gas that moves from the wall-portion inner space 556 toward the left-side opening 505 moves toward the left-side opening 505 by passing along the same paths as the aforementioned paths. In other words, the gas that moves toward the left-side opening 505 passes above part of flow paths that constitute the circulation flow path 590 toward the left-side opening 505.

Figure 29:
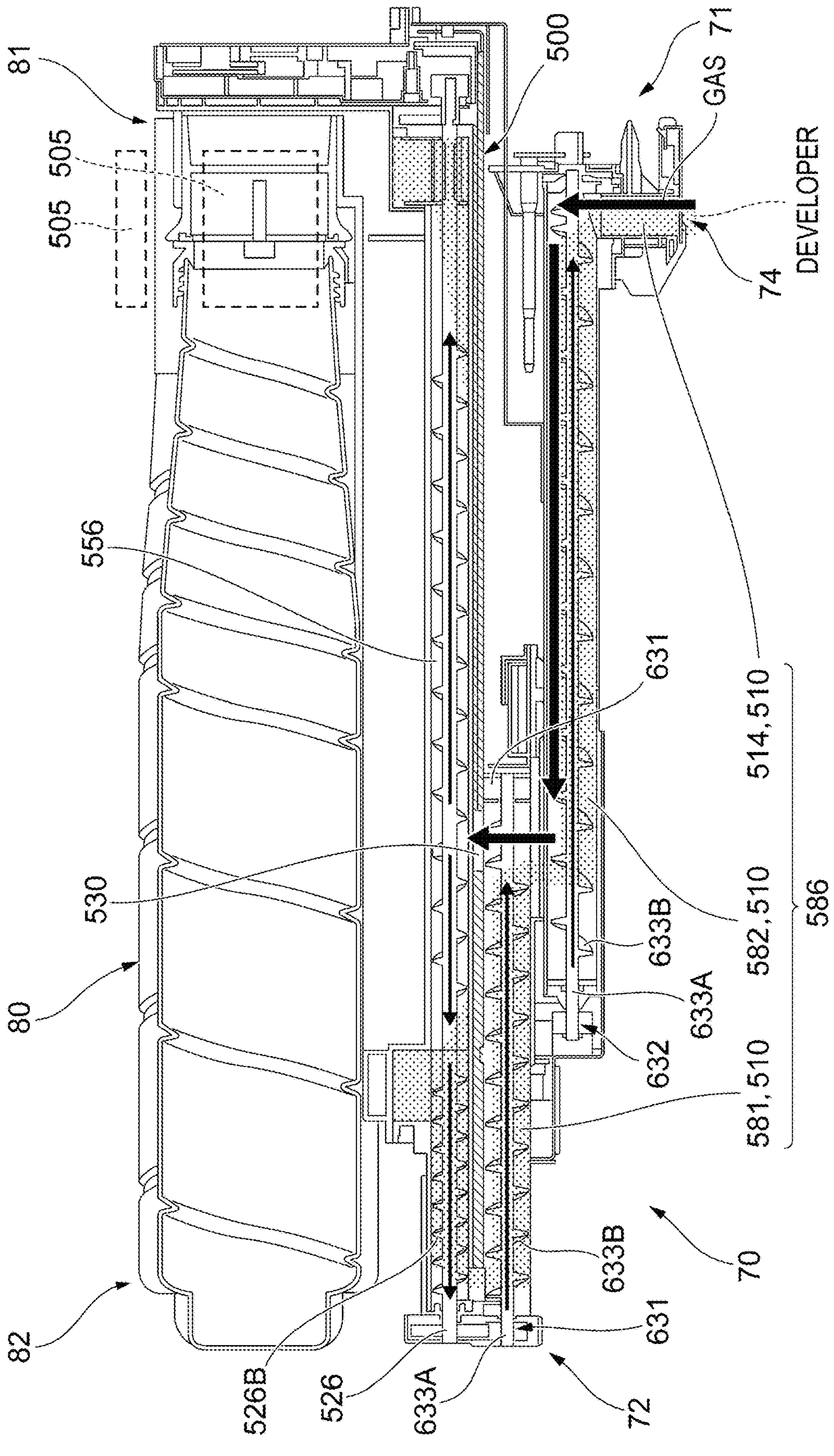
FIG. 29 illustrates another configuration example of a supplying device.

FIG. 29 illustrates another configuration example of the supplying device 70.

The multiple openings 505 are each provided at only a position facing a small-diameter portion of the developer storage container 80 in the configuration example. The one end portion 81 of the developer storage container 80 has a smaller diameter than the other end portion 82.

The multiple openings 505 are each provided at only a position facing the one end portion 81, which is the small-diameter portion of the developer storage container 80, in the configuration example illustrated in FIG. 29.

When the openings 505 are each provided at a position facing the one end portion 81, which is the small-diameter portion, each of the openings 505 may be positioned close to the axis of the developer storage container 80. In this case, downsizing of the supplying device 70 may be easily addressed compared with a case where the openings 505 are each provided at a position facing the other end portion 82, which is a large-diameter portion.

When multiple openings 505 are provided, all of the openings 505 may be each provided at only a position facing the one end portion 81, which is the small-diameter portion.

Other than the above, only one or some of the multiple openings 505 may be each provided at a position facing the one end portion 81. The other opening 505 or openings 505 may be each provided, for example, from a position facing the one end portion 81 to a position facing the other end portion 82 as described above. The other opening 505 or openings 505 also may be each provided, for example, at a position facing the other end portion 82, which is the large-diameter portion.

Figure 30:
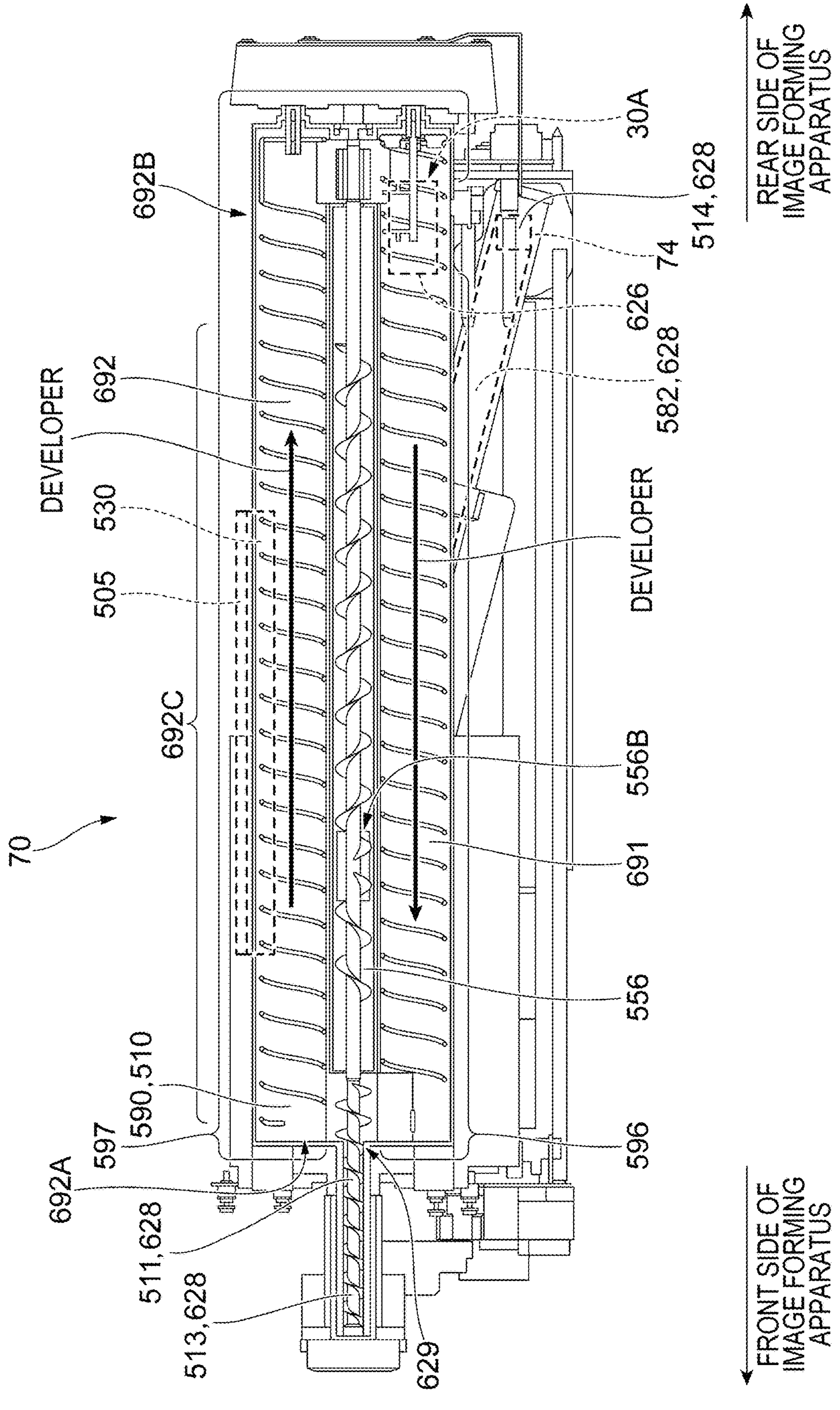
FIG. 30 illustrates another configuration example of a supplying device.

FIG. 30 illustrates another configuration example of the supplying device 70.

FIG. 30 illustrates a state of a cross-section of the supplying device 70 at a horizontal plane. Specifically, a state of a cross-section of the supplying device 70 at a horizontal plane crossing the wall-portion inner space 556 is illustrated.

The supplying device 70 illustrated in FIG. 30 also has the discharge port 74 that is to be used for discharge of a developer.

Further, the circulation flow path 590 that constitutes part of the developer flow path 510 is further provided, as in the aforementioned exemplary embodiment. A developer circularly moves along the circulation flow path 590 also in the configuration example.

A portion of the circulation flow path 590 indicated by the sign 30A serves as a supplied portion 626 in the configuration example. A reception port (not illustrated) through which the developer from the developer storage container 80 is received is provided above the supplied portion 626.

A new developer from the developer storage container 80 is supplied to the supplied portion 626 of the circulation flow path 590.

The position of the supplied portion 626 in the configuration example illustrated in FIG. 30 differs from the position thereof in the exemplary embodiment described above.

In the exemplary embodiment described above, for example, the portion indicated by the sign 10X in FIG. 10 is the supplied portion 626.

In the exemplary embodiment illustrated in FIG. 10, the supplied portion 626 is provided in the flow path on the left side in FIG. 10.

When viewed from the front side of the image forming apparatus 100 (refer to FIG. 1), the supplied portion 626 is provided in the flow path on the left side in FIG. 10. Specifically, the supplied portion 626 is provided in the opposite-direction flow path 542 located on the left side.

In contrast, in the configuration example illustrated in FIG. 30, the supplied portion 626 is provided in the flow path located on the right side. The supplied portion 626 is provided in the flow path located on the right side when viewed from the front side of the image forming apparatus 100.

The position of the supplied portion 626 is not limited. The supplied portion 626 may be provided in the flow path located on the left side, and the supplied portion 626 may be provided in the flow path located on the right side.

In the configuration example illustrated in FIG. 30, a connection flow path 628 that is a flow path connected to the circulation flow path 590 is provided.

The connection flow path 628 is connected at a connected portion 629 to the circulation flow path 590.

The connection flow path 628 extends from the connected portion 629 of the circulation flow path 590 to the discharge port 74.

The connection flow path 628 is constituted by the filled section 511, the lateral flow path 513, and the intermediate flow path 581 (not illustrated in FIG. 30). The connection flow path 628 is also constituted by the lower-side flow path 582 and the vertical flow path 514.

The developer in the circulation flow path 590 moves along the connection flow path 628 toward the discharge port 74.

As in the aforementioned exemplary embodiment, the opening 505 that is to be used for discharge of the gas in the supplying device 70 is further provided. The opening 505 is connected to the circulation flow path 590, as in the aforementioned exemplary embodiment.

In the circulation flow path 590, a first portion 596 that is a portion in which the amount of the transported developer is large is present. In addition, a second portion 597 that is a portion in which the amount of the transported developer is small is present in the circulation flow path 590.

The first portion 596 is located on the downstream side of the supplied portion 626 and located on the upstream side of the connected portion 629 in the movement direction of the developer.

The second portion 597 is located on the upstream side of the supplied portion 626 and located on the downstream side of the connected portion 629 in the movement direction of the developer.

The "movement direction of the developer" here denotes the movement direction of the developer in the circulation flow path 590.

The developer supplied to the supplied portion 626 necessarily passes through the first portion 596. Part of the developer that has passed through the first portion 596 then moves toward the connection flow path 628. The remaining developer that has not moved toward the connection flow path 628 is supplied to the second portion 597.

In this case, the amount of the transported developer is large in the first portion 596. The amount of the transported developer is smaller in the second portion 597 than that in the first portion 596.

The opening 505 is connected to the second portion 597 of the circulation flow path 590. The opening 505 is connected to the second portion 597, in which the amount of the transported developer is small, of the circulation flow path 590.

A gas that has entered the second portion 597 through the opening 556B moves toward the opening 505 without passing through the first portion 596 in the present exemplary embodiment.

It can be said that "the opening 505 is connected to the second portion 597" is a form in which the gas in the second portion 597 moves toward the opening 505 without passing through the first portion 596.

The circulation flow path 590 is provided with a first linear portion 691 that is formed linearly. A developer that moves toward the side where the connected portion 629 is provided passes through the first linear portion 691.

The circulation flow path 590 is also provided with a second linear portion 692 that is formed linearly. A developer that moves toward the side opposite to the side where the connected portion 629 is provided passes through the second linear portion 692.

The supplied portion 626 is provided at the first linear portion 691. The opening 505 is connected to the second linear portion 692.

The second linear portion 692 constitutes part of the second portion 597.

The second linear portion 692 includes one end portion 692A located on the side where the connected portion 629 is provided. The second linear portion 692 also includes an opposite-side end portion 692B located on the side opposite to the side where the connected portion 629 is provided.

The opening 505 is connected to a portion of the second linear portion 692 located away from the opposite-side end portion 692B.

Here, a developer movement direction that is the movement direction of the developer that passes through the second linear portion 692 is assumed.

The second linear portion 692 includes an upstream-side portion 692C that is a portion located on the upstream side of the opposite-side end portion 692B in this developer movement direction.

The opening 505 is connected to the upstream-side portion 692C of the second linear portion 692. The gas flow path 530 is provided in a form extending from the upstream-side portion 692C toward the opening 505 in the present exemplary embodiment.

A developer tends to accumulate at the opposite-side end portion 692B of the second linear portion 692. At the opposite-side end portion 692B of the second linear portion 692, the height of the upper surface of the developer tends to increase.

In contrast, the developer may be less likely to accumulate at the upstream-side portion 692C of the second linear portion 692.

The opening 505 is connected to the upstream-side portion 692C, at which the developer may be less likely to accumulate, of the second linear portion 692.

As in the configuration example illustrated in FIG. 10, the opening 505 is provided above the circulation flow path 590 also in the configuration example illustrated in FIG. 30.

In addition, as in the aforementioned exemplary embodiment, the protrusion 76 is provided also in the configuration example illustrated in FIG. 30. As in the configuration example illustrated in FIG. 14, the protrusion 76 is provided also in the configuration example illustrated in FIG. 30.

The gas flow path 530 extends through the inside of the protrusion 76 also in the configuration example illustrated in FIG. 30.

A gas that moves from the circulation flow path 590 toward the opening 505 moves along the gas flow path 530 toward the opening 505. A gas that moves from the upstream-side portion 692C toward the opening 505 moves along the gas flow path 530 toward the opening 505.

The gas flow path 530 reaches the opening 505 also in the configuration example. The gas flow path 530 extends upward from the upstream-side portion 692C and is connected to the opening 505.

Figure 31:
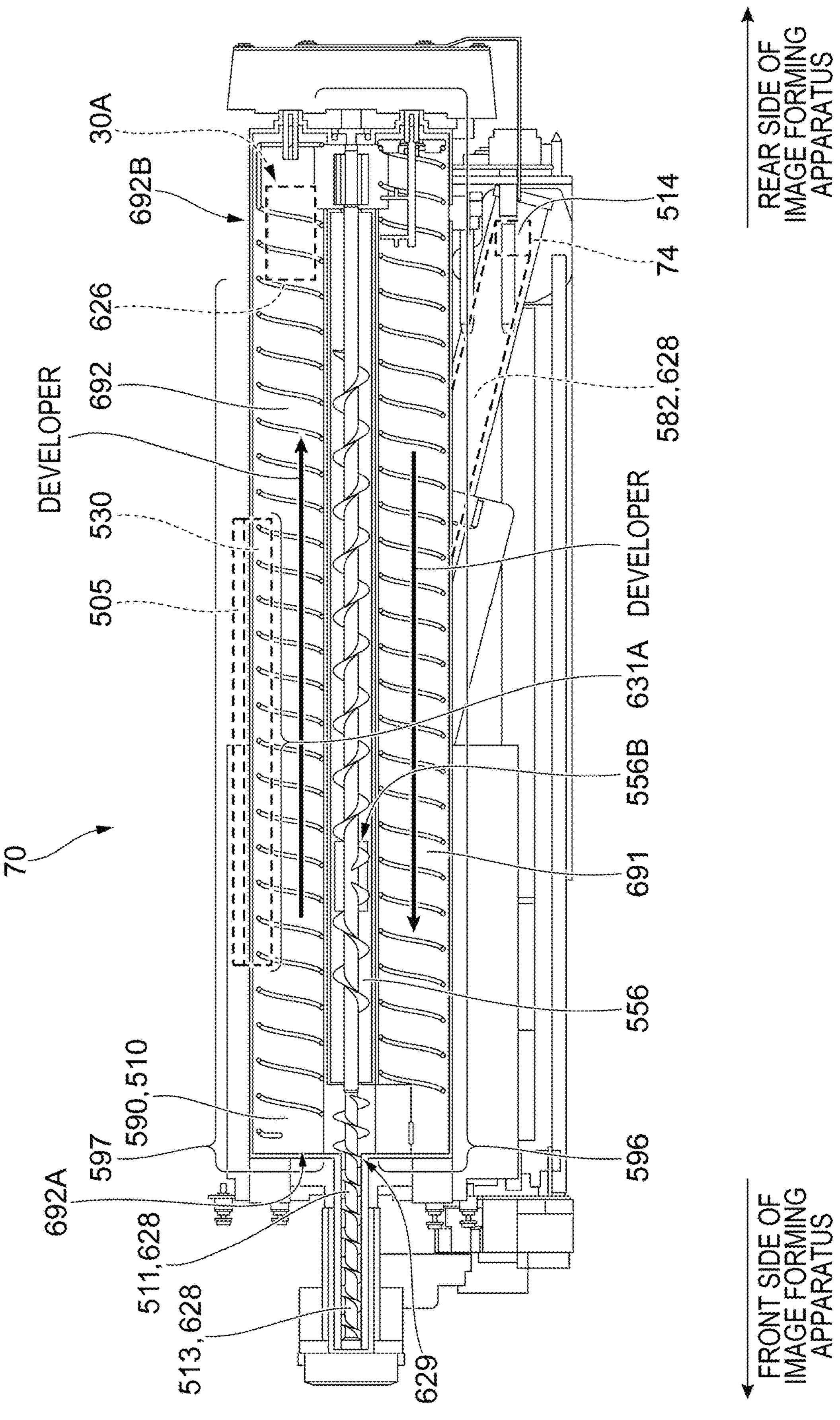
FIG. 31 illustrates another configuration example of a supplying device.

FIG. 31 illustrates another configuration example of the supplying device 70.

In the configuration example illustrated in FIG. 31, the supplied portion 626 is provided at the second linear portion 692, which is a single linear portion. Further, the opening 505 is connected to the second linear portion 692, which is the single linear portion, in the configuration example.

The linear portion at which the supplied portion 626 is provided and the linear portion to which the opening 505 is connected are identical to each other in the configuration example.

As in the aforementioned exemplary embodiment, the opening 505 is connected to the second linear portion 692 of the circulation flow path 590 also in the configuration example. In addition, the supplied portion 626 is provided at the second linear portion 692 in the configuration example.

Hereinafter, a portion of the second linear portion 692 to which the opening 505 is connected is referred to as "opening connection portion 631A".

In the movement direction of the developer, the supplied portion 626 is located on the downstream side of the opening connection portion 631A in the configuration example. The "movement direction of the developer" here denotes the movement direction of the developer in the second linear portion 692.

Further, as in the aforementioned exemplary embodiment, the opening 505 is connected to the second portion 597, in which the amount of the transported developer is small, of the circulation flow path 590 in the configuration example. As in the aforementioned exemplary embodiment, the amount of the developer that moves toward the opening 505 decreases also in the configuration example.

Figure 32:
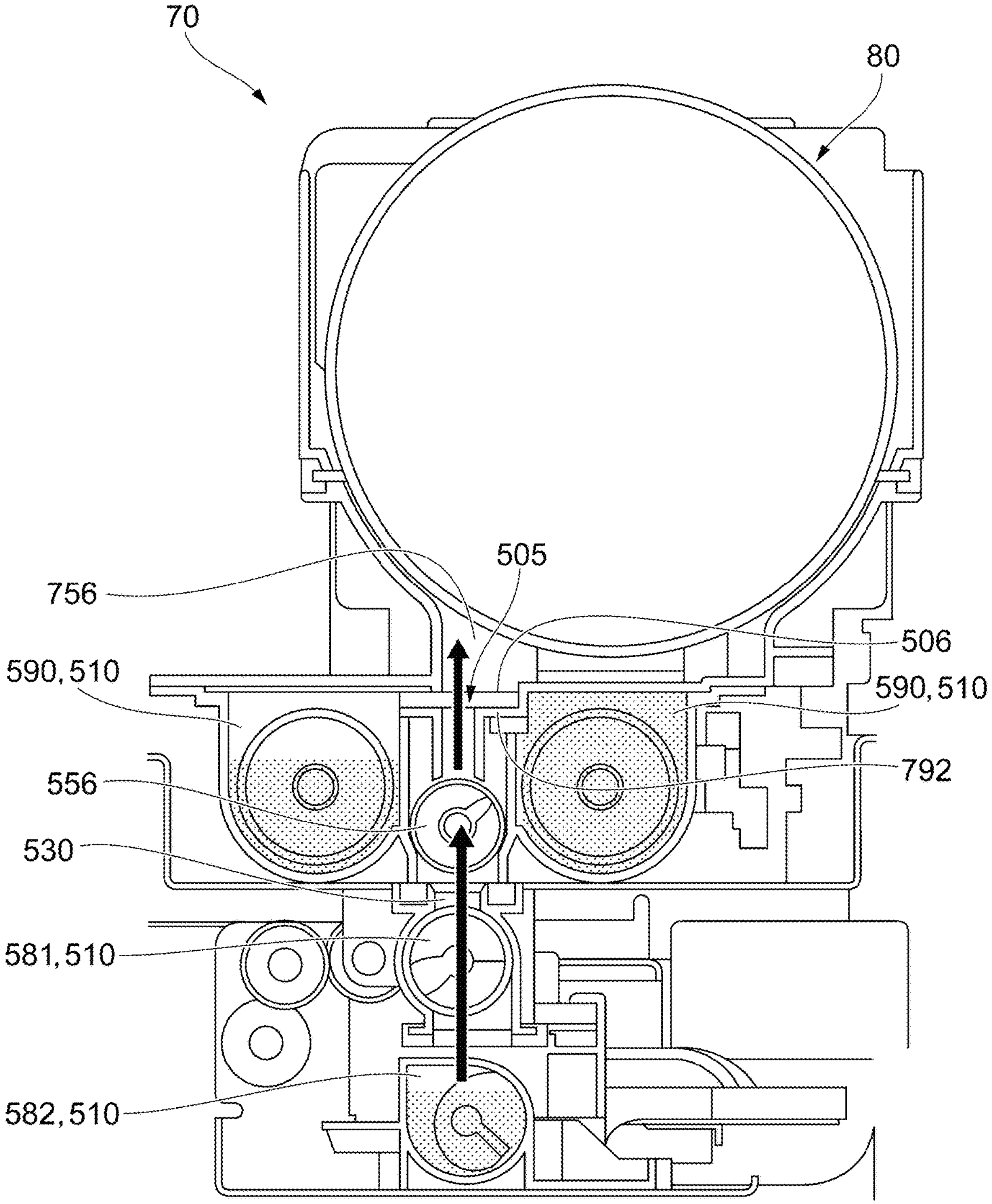
FIG. 32 illustrates another configuration example of a supplying device.

FIG. 32 illustrates another configuration example of the supplying device 70.

In the configuration example, a basic configuration except the position of the opening 505 is the same as the configuration illustrated in FIG. 20.

As in the aforementioned exemplary embodiment, a gas delivered from the developing device 14 is supplied to the wall-portion inner space 556, which is one example of a supply space, also in the configuration example.

The opening 505 is provided in an upper portion of the wall-portion inner space 556 in the configuration example. The opening 505 is provided in a wall portion 792 that is for formation of the wall-portion inner space 556. The filter 506 is installed at the opening 505.

A gas supplied to the wall-portion inner space 556 is discharged to the outside of the supplying device 70 through the opening 505.

As in the aforementioned exemplary embodiment, the opening 505 is an opening through which the inside and the outside of the supplying device 70 are connected to each other. A gas supplied to the wall-portion inner space 556 moves to the outside of the supplying device 70 through the opening 505.

The opening 505 is provided to extend in the longitudinal direction of the wall-portion inner space 556.

The gas in the wall-portion inner space 556 moves toward the opening 505 without passing along the circulation flow path 590 in the configuration example. In other words, the gas in the wall-portion inner space 556 avoids the circulation flow path 590 to move toward the opening 505.

The gas is then discharged to the outside of the supplying device 70 through the opening 505. The gas in the wall-portion inner space 556 is discharged to the outside of the supplying device 70 without passing along the circulation flow path 590.

The gas in the wall-portion inner space 556 does not pass along the circulation flow path 590. In this case, a situation in which the developer in the circulation flow path 590 is contained in the gas may be suppressed.

The gas in the wall-portion inner space 556 passes through the opening 505 and then enters a gap 756 located between the wall portion 792 and the developer storage container 80. The gas then moves in the axial direction of the developer storage container 80 through the gap 756.

An end portion of the gap 756 in the axial direction of the developer storage container 80 is open. The gas that moves through the gap 756 moves to the end portion of the gap 756.

As in the aforementioned exemplary embodiment, the wall-portion inner space 556, which is a space to which a gas that has flowed from the developing device 14 is supplied, is provided also in this configuration example.

Further, as in the aforementioned exemplary embodiment, the circulation flow path 590, along which the developer circularly moves, is provided around the wall-portion inner space 556 also in the configuration example.

The gas in the wall-portion inner space 556 moves toward the opening 505 without passing along the circulation flow path 590 located around the wall-portion inner space 556 in the configuration example.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An image forming apparatus comprising:

an image carrier;

a developing device that applies a developer to the image carrier; and a supplying device that supplies a developer to the developing device, the supplying device having a developer flow path along which a developer passes, the image forming apparatus having a gas flow path along which a gas discharged from the developing device passes, the gas flow path being connected to the supplying device, wherein the gas flow path is connected to a non-flow-path section of the supplying device, the non-flow-path section being a section that is not the developer flow path.

(((2)))

The image forming apparatus according to (((1))), wherein, as part of the developer flow path, an annular flow path that is a flow path having an annular shape is provided, and wherein the gas flow path is connected to a surrounded space included in an internal space of the supplying device, the surrounded space being a space surrounded by the annular flow path.

(((3)))

The image forming apparatus according to (((2))), wherein the annular flow path is disposed on an imaginary plane extending in a direction intersecting a vertical direction, and wherein the gas flow path is connected to the surrounded space from a bottom side of the surrounded space or from an upper side of the surrounded space.

(((4)))

The image forming apparatus according to any one of (((1))) to (((3))), wherein the supplying device has an opening for discharge of a gas that has been supplied along the gas flow path to the non-flow-path section, and wherein the opening is provided above the non-flow-path section.

(((5)))

The image forming apparatus according to any one of (((1))) to (((4))), wherein a movement member that moves a developer in the non-flow-path section to the developer flow path is provided in the non-flow-path section.

(((6)))

The image forming apparatus according to (((5))), wherein part of the movement member is provided in the developer flow path, and wherein the part of the movement member moves a developer in the developer flow path.

(((7)))

An image forming apparatus comprising: an image carrier; a developing device that applies a developer to the image carrier; and a supplying device that supplies a developer to the developing device, the supplying device having a gas flow path that is a flow path along which a gas that has flowed from the developing device to the supplying device passes, the supplying device including a movement member that moves a developer in the gas flow path.

(((8)))

The image forming apparatus according to (((7))), wherein the supplying device has a developer flow path that is a flow path along which a developer passes, and wherein the movement member moves a developer in the gas flow path to the developer flow path.

(((9)))

The image forming apparatus according to (((8))), wherein the movement member extends to the developer flow path, and the movement member also moves a developer in the developer flow path.

(((10)

The image forming apparatus according to any one of (((7))) to (((9))), wherein the gas flow path is provided to extend through an opening provided in the supplying device, and wherein the movement member moves a developer in the gas flow path in a direction away from the opening.

(((11)))

The image forming apparatus according to (((10))), wherein the movement member is also provided at a position facing the opening.

(((12)))

The image forming apparatus according to any one of (((7))) to (((11))), wherein the supplying device has a developer flow path that is a flow path along which a developer passes, wherein, as part of the developer flow path, a flow path that has an annular shape is provided, wherein the gas flow path is provided to extend through a surrounded space included in an internal space of the supplying device, the surrounded space being a space surrounded by the flow path having the annular shape, and wherein the movement member is provided in the surrounded space.

What is claimed is:

1. An image forming apparatus comprising:
an image carrier;
a developing device that applies a developer to the image carrier; and
a supplying device that supplies a developer to the developing device, the supplying device having a developer flow path along which a developer passes,
the image forming apparatus having a gas flow path along which a gas discharged from the developing device passes, the gas flow path being connected to the supplying device,
wherein the gas flow path is connected to a non-flow-path section of the supplying device, the non-flow-path section being a section that is not the developer flow path,
wherein, as part of the developer flow path, an annular flow path with a tubular shape that circulates around a surrounded space that connects to the gas flow path is provided, and
wherein the surrounded space is included in an internal space of the supplying device, the surrounded space being a space that is surrounded by the tube of the angular flow path.

2. The image forming apparatus according to claim 1,
wherein the annular flow path is disposed on an imaginary plane extending in a direction intersecting a vertical direction, and
wherein the gas flow path is connected to the surrounded space from a bottom side of the surrounded space or from an upper side of the surrounded space.

3. The image forming apparatus according to claim 1,
wherein the supplying device has an opening for discharge of a gas that has been supplied along the gas flow path to the non-flow-path section, and
wherein the opening is provided above the non-flow-path section.

4. The image forming apparatus according to claim 1,
wherein a movement member that moves a developer in the non-flow-path section to the developer flow path is provided in the non-flow-path section.

5. The image forming apparatus according to claim 4,
wherein part of the movement member is provided in the developer flow path, and
wherein the part of the movement member moves a developer in the developer flow path.

6. An image forming apparatus comprising:
an image carrier;
a developing device that applies a developer to the image carrier; and
a supplying device that supplies a developer to the developing device, the supplying device having a gas flow path that is a flow path along which a gas that has flowed from the developing device to the supplying device passes, the supplying device including a movement member that moves a developer in the gas flow path, wherein the supplying device has a developer flow path that is a flow path along which a developer passes, and wherein the movement member moves a developer in the gas flow path to the developer flow path.

7. The image forming apparatus according to claim 6, wherein the movement member extends to the developer flow path, and the movement member also moves a developer in the developer flow path.

8. The image forming apparatus according to claim 6, wherein the gas flow path is provided to extend through an opening provided in the supplying device, and wherein the movement member moves a developer in the gas flow path in a direction away from the opening.

9. The image forming apparatus according to claim 8, wherein the movement member is also provided at a position facing the opening.

10. The image forming apparatus according to claim 6, wherein the supplying device has a developer flow path that is a flow path along which a developer passes, wherein, as part of the developer flow path, a flow path that has an annular shape is provided, wherein the gas flow path is provided to extend through a surrounded space included in an internal space of the supplying device, the surrounded space being a space surrounded by the flow path having the annular shape, and wherein the movement member is provided in the surrounded space.

* * * * *